United States Patent
Avetisov et al.

(10) Patent No.: US 11,178,148 B2
(45) Date of Patent: Nov. 16, 2021

(54) OUT-OF-BAND AUTHENTICATION TO ACCESS WEB-SERVICE WITH INDICATION OF PHYSICAL ACCESS TO CLIENT DEVICE

(71) Applicant: HYPR Corp., New York, NY (US)

(72) Inventors: George Avetisov, New York, NY (US); Bojan Simic, New York, NY (US); Roman Kadinsky, New York, NY (US)

(73) Assignee: HYPR Corp., New York, NY (US)

( * ) Notice: Subject to any disclaimer, the term of this patent is extended or adjusted under 35 U.S.C. 154(b) by 0 days.

(21) Appl. No.: 17/234,737

(22) Filed: Apr. 19, 2021

(65) Prior Publication Data

US 2021/0258308 A1 Aug. 19, 2021

Related U.S. Application Data

(63) Continuation-in-part of application No. 16/783,028, filed on Feb. 5, 2020, now Pat. No. 11,063,944, which is a continuation of application No. 16/270,255, filed on Feb. 7, 2019, now Pat. No. 10,601,828.

(60) Provisional application No. 62/720,609, filed on Aug. 21, 2018, provisional application No. 62/720,590, filed on Aug. 21, 2018.

(51) Int. Cl.
*H04L 29/06* (2006.01)
*H04L 9/08* (2006.01)
*G06F 21/45* (2013.01)

(52) U.S. Cl.
CPC .......... *H04L 63/0884* (2013.01); *G06F 21/45* (2013.01); *H04L 9/088* (2013.01); *H04L 63/18* (2013.01)

(58) Field of Classification Search
None
See application file for complete search history.

(56) References Cited

U.S. PATENT DOCUMENTS

| | | | | |
|---|---|---|---|---|
| 8,627,438 | B1 * | 1/2014 | Bhimanaik | G06F 21/36 726/9 |
| 9,396,376 | B1 * | 7/2016 | Narayanaswami | G06K 19/10 |
| 10,133,861 | B2 * | 11/2018 | Guionneau | H04L 9/3263 |
| 2012/0311723 | A1 * | 12/2012 | Britt, Jr. | G06F 21/6218 726/28 |

(Continued)

*Primary Examiner* — Maung T Lwin
(74) *Attorney, Agent, or Firm* — Pillsbury Winthrop Shaw Pittman, LLP; Joshua Tucker

(57) ABSTRACT

Provided is a process that affords out-of-band authentication for confirmation of physical access or when a device utilized for out-of-band authentication lacks connectivity to a network. An asymmetric cryptographic key-pair is established, a first device obtaining a key operable to decrypt data. A remote server obtaining a key operable to encrypt data and associating that key with an identifier of an identity or account associated with a user. An access attempt from the second device is received in association with the identifier of the identity associated with the user. A notification including data encrypted by the encryption key is generated by the remote server and transmitted to the second device. The first device obtains the notification data from the second device and decrypts the data to determine a notification response which is returned to the remote server for verification to permit or deny the access attempt of the second device.

30 Claims, 7 Drawing Sheets

(56) References Cited

U.S. PATENT DOCUMENTS

| | | | | |
|---|---|---|---|---|
| 2013/0015236 A1* | 1/2013 | Porter | .................... | G06Q 10/08 |
| | | | | 235/375 |
| 2013/0191640 A1* | 7/2013 | Bloomer | ................. | G06F 21/60 |
| | | | | 713/172 |
| 2014/0223577 A1* | 8/2014 | Lee | ......................... | G06F 21/44 |
| | | | | 726/27 |
| 2015/0082390 A1* | 3/2015 | Flink | ................... | H04W 12/068 |
| | | | | 726/4 |
| 2015/0200936 A1* | 7/2015 | Kim | ....................... | H04L 9/321 |
| | | | | 713/171 |
| 2016/0191244 A1* | 6/2016 | Claes | ................. | H04L 63/0861 |
| | | | | 713/155 |
| 2016/0357954 A1* | 12/2016 | Guionneau | ........... | H04L 9/0866 |
| 2017/0230361 A1* | 8/2017 | Toth | .................... | H04W 12/068 |

* cited by examiner

OUT-OF-BAND AUTHENTICATION TO ACCESS WEB-SERVICE WITH INDICATION OF PHYSICAL ACCESS TO CLIENT DEVICE

CROSS-REFERENCE TO RELATED APPLICATIONS

The present application is a continuation-in-part of U.S. application Ser. No. 16/783,028, filed 5 Feb. 2020, which is a continuation of U.S. application Ser. No. 16/270,255, filed on 7 Feb. 2019, now U.S. Pat. No. 10,601,828, which claims the benefit of U.S. Provisional Patent Application 62/720, 609 filed on 21 Aug. 2018 and claims the benefit of U.S. Provisional Patent Application 62/720,590 filed on 21 Aug. 2018, titled FEDERATED IDENTITY MANAGEMENT WITH DECENTRALIZED COMPUTING PLATFORMS; the entirety of each aforementioned patent filing is incorporated herein by reference.

BACKGROUND

1. Field

The present disclosure relates generally to cybersecurity and, more specifically, to out-of-band authentication of a user accessing a web service on a first computing device with network access by using a mobile computing device of the user without network access as an authentication factor.

2. Description of the Related Art

In a variety of scenarios, it can be useful to authenticate a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to solicit additional credentials from the user. In this manner, such systems may supply additional factors by which additional confidence may be obtained regarding a user's identity, as merely compromising a user's username and password would not by itself afford access to secured resources.

SUMMARY

The following is a non-exhaustive listing of some aspects of the present techniques. These and other aspects are described in the following disclosure.

Some aspects include a process executed by a mobile computing device, the process comprising: obtaining, on a mobile computing device of a user, a decryption key of an asymmetric cryptographic key-pair associated with the mobile computing device, the key-pair comprising an encryption key corresponding to the decryption key; transmitting, by the mobile computing device, registration information to cause a remote server to associate the encryption key of the key-pair with a record of an identity of the user for accessing an online resource on a network; obtaining, by the mobile computing device, notification data from an optical code displayed by a client computing device attempting to access the online resource on the network under the identity of the user, the client computing device being different from the mobile computing device and the notification data comprising an encrypted portion generated by the remote server based on the encryption key of the key-pair and an authentication string for verification of the client computing device attempt to access the online resource; authenticating, by the mobile computing device in response to obtaining the notification data, the user of the mobile device based on one or more established credentials indicative of, or corresponding to, the user by which utilization of the decryption key to decrypt data is governed; decrypting, by the mobile computing device after the authentication of the user by the mobile computing device, the encrypted portion of the notification data based on the decryption key to obtain the authentication string in plaintext; determining, by the mobile computing device based on values of the authentication string in plaintext, a notification response comprising a set of values based on the authentication string, the set of values being indicative of the decryption of the encryption portion of the notification data based on utilization of the decryption key upon the authentication of the user; and presenting, by the mobile computing device, the notification response for conveyance to the remote server to permit the client computing device to access the online resource on the network under the identity of the user.

Some aspects include a process executed by a mobile computing device, the process comprising: obtaining, on a mobile computing device of a user, a private key of a key-pair associated with the mobile computing device, the key-pair comprising a public key distributed to at least one remote server for association with an identity of the user; obtaining, by the mobile computing device, and in some aspects wirelessly by the mobile computing device without utilizing an internet connection, notification data from a client computing device attempting to access an online resource on a network under the identity of the user, the client computing device being different from the mobile computing device and the notification data comprising a code generated by the remote server, for conveyance to the remote server via the client computing device and/or based in part on the public key of the key-pair, for verification of the client computing device attempt to access the online resource; obtaining, by the mobile computing device, at least one input credential value corresponding to an established credential indicative of, or corresponding to, the user by which utilization of the private key is governed; authenticating, by the mobile computing device, the user of the mobile device based on the input credential value matching the established credential; processing, by the mobile computing device after the authentication of the user by the mobile computing device, the code based on the private key to determine a resulting authentication value; generating, by the mobile computing device, a notification response based on the resulting authentication value, the notification response being indicative of utilization of the private key by the mobile computing device; and presenting, by the mobile computing device, the notification response for conveyance to the remote server to permit the client computing device to access the online resource on the network under the identity of the user.

Some aspects include a process executed by a server-side computing system that supports a client-side role in out-of-band authentication on a first device different from a second device requesting access to a secure asset, the process comprising: establishing a user record associated with a user permitted to access the secure asset, the user record comprising a user identifier associated with the user; and establishing, in association with the user record, a device record for the first device in response to receiving, from the first device, an encryption key of an asymmetric key-pair, the first device retaining the decryption key of the asymmetric key-pair; receiving information corresponding to attempt to access the secure asset from the second device, the information comprising the user identifier; identifying the user record responsive to the user identifier; selecting the device record for the first device associated with the user record to access the encryption key; generating notification data comprising a portion of data encrypted based on the encryption key and operable to be decrypted by the encryption key retained by the first device; determining a set of verification values based on the portion of data in unencrypted form; transmitting, to the second device, the notification data; receiving a notification response comprising a set of values; verifying the set of values based on the set of verification values, the verifying being indicative of the first device successfully decrypting the encrypted portion of notification data based on the decryption key retained by the first device; and transmitting, based on the verifying, an authentication result to grant the access attempt by the second device.

Some aspects include a tangible, non-transitory, machine-readable medium storing instructions that when executed by a data processing apparatus cause the data processing apparatus to perform operations including one or more of the above-mentioned processes.

Some aspects include a system, including: one or more computing devices with one or more processors; the one or more computing devices including at least one memory storing instructions that when executed by the processors cause the processors to effectuate operations including one or more of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
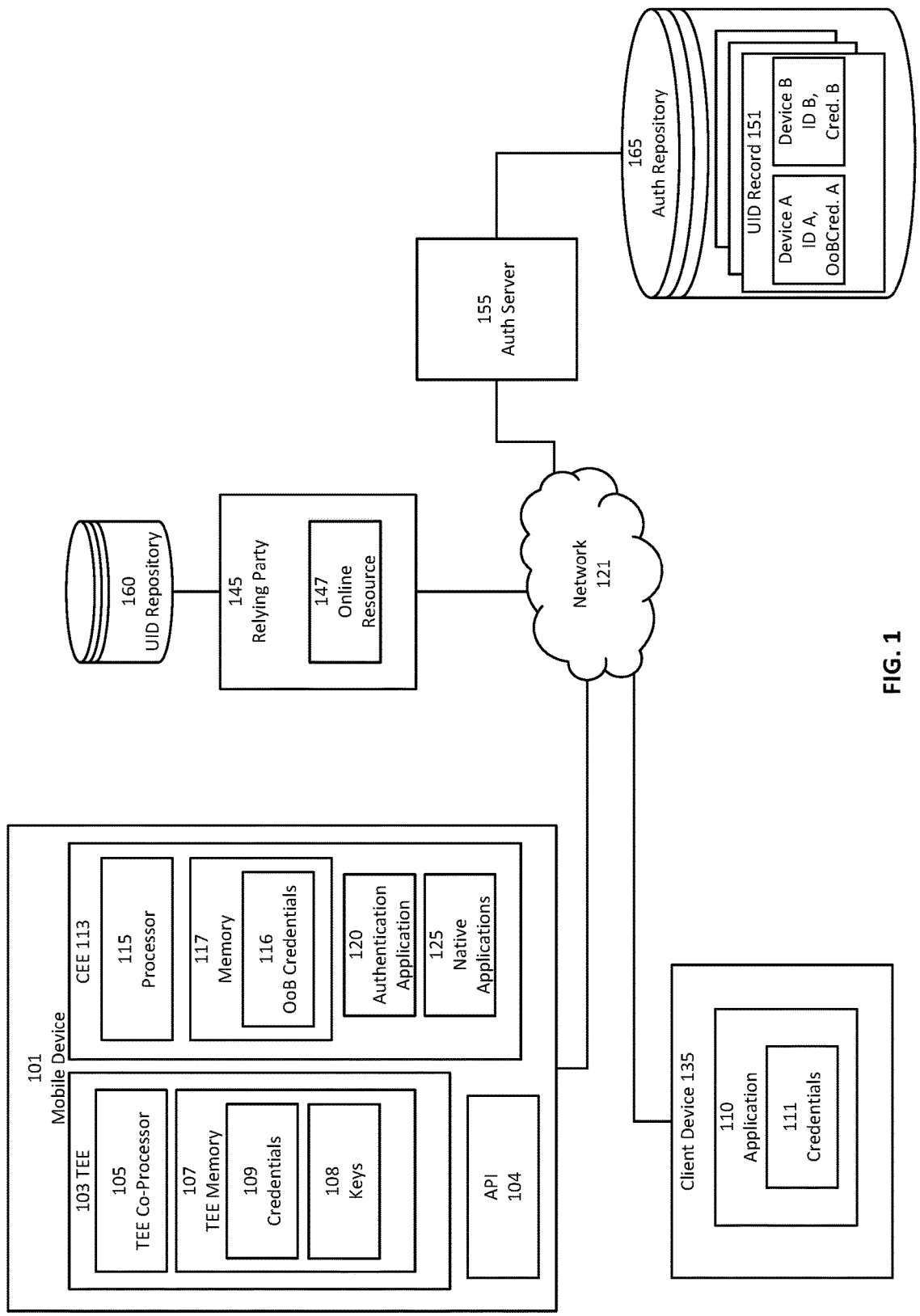
FIG. 1 is a block diagram showing an example of a computing environment by which the present techniques for user authentication may be implemented, in accordance with some disclosed embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many existing out-of-band authentication techniques are potentially subject to vulnerabilities. Examples include attacks that compromise the device by which the user supplies the supplemental credentials in the out-of-band channel. Some existing systems are potentially vulnerable to malicious code executing on the user's mobile device that, for example, capture user supplied credentials from system memory allocated to client-side authentication applications. Additionally, such techniques can fail where the device by which the user supplies the supplemental credentials in the out-of-band channel lacks network access. Moreover, under existing out-of-band authentication techniques a user may intentionally, or inadvertently, permit a malicious access attempt by another user simply by suppling the supplemental credentials in the out-of-band channel in response to the notification.

The patent filings incorporated by reference above describe various approaches to mitigate some of these issues in some embodiments. Some of these approaches rely on network access of a mobile computing device (like a smartphone) when seeking to authenticate a user on another computing device, like their laptop or desktop computer. This can be an issue in scenarios where the mobile computing device does not have network access, even if the other computing device does. For example, when traveling on an airline or when using certain hotel WiFi services in the absence of cellular service, users may only be permitted to connect one computing device to the network, leaving them with, for example, a laptop connected to the Internet, and a smartphone that is not. This scenario can frustrate certain approaches using the smartphone or other mobile computing device to supply an authentication factor (like a second factor in a multi-factor authentication protocol, or a credential in a passwordless authentication protocol), because the smartphone or other mobile computing device is unable to communicate via the Internet with a remote authentication server. None of which is to suggest that embodiments are limited to systems that do not suffer from the above-described issues, or that any other description is limiting, as various inventive aspects are described, and those inventive aspects can be used independently to address other issues or only a subset of the above-described issues.

Some embodiments mitigate these issues by conveying a high-entropy, single-use value from the authentication server, to the user's smartphone (or other computing device serving a similar role, like an augmented reality headset or other wearable computing device) via (e.g., wirelessly, like with an optical code) the user's network-connected computing device upon which the user seeks to be authenticated and, then, causing the user's smartphone (or other computing device serving a similar role) to perform a transformation on that high-entropy value that produces an output demonstrating proof of possession of a cryptographic key. The output may then be returned to the authentication server via the user's network-connected computing device.

For example, a user may connect their laptop to in-flight WiFi on an airplane, exhausting their available wireless connections, and leaving their smart phone in airplane-mode, unconnected to the Internet. The user may then seek to authenticate themselves on the laptop to a web service, which may cause a remote authentication server to send a QR code that is displayed in the user's laptop browser. The user may then scan that QR code (in a user-friendly, low-friction manner, with the smartphone's camera) with an authentication native application installed and previously registered (e.g., when they had network access on the smartphone) on their smartphone to ingest the value encoded in the QR code. Various embodiments of the authentication native application may perform different transformations on this value to demonstrate proof of possession of a secret value (like a cryptographic key, such as a private cryptographic key).

a. In some embodiments, the QR code may encode a ciphertext of a challenge code, for example, one encrypted with a public key of an asymmetric cryptographic key pair corresponding to the user. And the authentication native application may decrypt the ciphertext to return the plaintext (or value based thereon, like a cryptographic hash).
 b. In some embodiments, the ciphertext may be encrypted with a symmetric encryption protocol, using a member of a set of single-use one-time codes previously cached on the smartphone by the authentication native application, and a member of that set may be used to decrypt the ciphertext to return the plaintext (or value based thereon, like a cryptographic hash).
 c. In some embodiments, the QR code may encode a challenge code like a random or other high-entropy (e.g., more than 30 or more than 50 bits of entropy) value in plaintext form. The native application may compute a value, like a digital signature based on the challenge code and a private key of a cryptographic key pair unique to the user among a population of users, and that digital signature (or other value demonstrating proof of concurrent possession of the private key and the challenge code) may then returned.

The returned value may be entered as a challenge-response value by the user into a text input box in the browser to be sent by the laptop via the in-flight WiFi to a remote authentication server that verifies the entered value does in fact demonstrate proof of concurrent possession of the private key and the challenge code. In some cases, this is done without revealing the private key of the user to the remote authentication server or the web browser, and in some cases, the private key resides exclusively in a trusted execution environment of the smartphone and is not made available to even the memory space allocated by the smartphone's OS to the authentication native application. A wide array of variations on this workflow are contemplated, as described below (e.g., near-field communication, Bluetooth, bar-codes, or ultra-wideband signals may be used in place of the QR code or to return the challenge-response value entered in the textbox, and the laptop may also be authentication the user on a special purpose native application rather than in a web browser, among other examples below).

Some of the above-described issues with out-of-band authentication techniques are mitigated by various embodiments described herein. Some embodiments described herein provide improvements in computer security that mitigate the capture of user supplied credentials from system memory allocated to client-side authentication applications, even in cases where the capture of such credentials is attempted by intercepting inter-process communication on the client device between the client-side authentication application and security infrastructure on the client device. Some embodiments described herein provide improvements in computer security that mitigate highly sophisticated methods for the capture of user supplied credentials, and some of embodiments incorporate use of and improve upon trusted execution environments, like Secure Enclave, ARM Trust-Zone, or various other trusted platform modules, like those compliant with ISO/IEC 11889 (the contents of which are hereby incorporated by reference), to provide enhanced client-side security. Moreover, the techniques described in relation to some of those embodiments for mitigating capture of user supplied credentials on client devices may be implemented in connection with various embodiments described herein to configure robust out-of-band authentication systems apt to prevent unauthorized access to secure assets, like protected data, programs, etc., even in instances where a malicious party has access to a device (or multiple devices) of an authorized party.

Additionally, various embodiments described herein provide improvements in computer security that mitigate authentication failures or concessions in security where the device by which the user supplies the supplemental credentials in the out-of-band channel lacks network access without increasing friction on users. For example, where traditional out-of-band techniques fail in instances where the device by which the user supplies the supplemental credentials in the out-of-band channel lacks network access or resolve those failures by implementing a less secure authentication processes, disclosed embodiments resolve such issues by offline-capable and low friction out-of-band authentication techniques based on knowledge proofs that maintain robust authentication principles. Moreover, various embodiments of offline-capable and low friction out-of-band authentication techniques disclosed herein for authentication the user on the device by which the user supplies the supplemental credentials are apt to enforce physical access control protocols previously out of reach to existing techniques, such as confirmation of physical access of a user to a device being permitted to access a resource by out-of-band authentication of the user on another device.

Embodiments may confer one or more of the aforementioned benefits or other benefits, some of which will be self-evident to those of ordinary skill in the art and may remain unstated. Some embodiments may protect the credentials a user supplies in an out-of-band authentication exchange with zero knowledge techniques. Moreover, the zero knowledge techniques may enable a user to assert credentials for authentication in a variety of ways. For example, some embodiments may keep the out-of-band credentials on a mobile computing device, without those credentials leaving the mobile computing device (e.g., in plain-text or ciphertext form). In some embodiments, the credential, and cryptographic hash values based thereon, or various private cryptographic keys of asymmetric encryption protocols may be stored, for example exclusively, within a trusted execution environment, for instance, in a secure memory of a trusted execution environment implemented with a secure co-processor that is separate (e.g., on different silicon, or implemented by different logical blocks connected to different physical memory address spaces) from a central processing unit of the mobile computing device by which an operating system and native applications of the mobile computing device are executed. In some embodiments, the zero knowledge techniques may be applied to prevent even the central processing unit of the mobile computing device from accessing such credentials and keys. In some embodiments, a secure channel (or session) may be established between an authentication application executing on that central processing unit and the trusted execution environment. In some cases, the secure channel may impede attempts by threat actors to extract cryptographic keys or other credentials by impersonating the trusted execution environment or the authentication application in communications with one or the other of these computational entities. In addition, the secure channel may be implemented with a secure session, in that it may be closed (e.g., expire), such as after a predetermined number of communications between the trusted execution environment and the authentication application.

In some embodiments, the mobile computing device is a portable device (e.g., having a battery or other integrated power source) that a user frequently carries on or near their person throughout the course of their daily activities. Example mobile computing devices may be a smartphone or smartphone-like devices such as phablets, wearable computing devices, on-board computing devices of automobiles, or tablets with wireless data access. In various examples, such devices are portable smartphone-like devices, and in various example embodiments, such devices may lack wireless data access (e.g., temporarily) when a user seeks to access a resource via another device, like a client device, such as a laptop or desktop or tablet computing device. Thus, a traditional out-of-band authentication process may be inapplicable for authentication of the user because the out-of-band device, such as the mobile device of the user, does not have wireless data access to receive a notification to authenticate access of the resource via the laptop, desktop or tablet computing device. For example, in various remote-access scenarios, such as those where users pay-per-device for wireless data access, or network access is otherwise restricted, the client device may have access to a network (e.g., the internet) while the mobile device does not have wireless (or wired) data access. Canonical examples include paid wireless data access (e.g., from an airline) that is granted on an individual device basis while the user is traveling and, thus, the client device may have access to a network while the mobile device of the user does not.

Accordingly, embodiments provide out-of-band authentication methods which are apt to authenticate a user, such as via the mobile device of the user, even when that device does not have network access. In some example cases, authentication results may be determined within a trusted execution environment of the mobile device and thus may convey a high degree of security even in offline login processes. However, applications of the disclosed techniques are not so limited. For example, disclosed out-of-band authentication methods applicable to offline out-of-band authentication may be incorporated in, or otherwise function in association with other improvements on credential security and federated identity management systems disclosed herein, such as to confer an indication of physical access to a client device (which is not to suggest that disclosed out-of-band authentication processes are not compatible with other identity management and credentialing systems).

Some embodiments may be implemented in a distributed physical architecture that includes client computing devices controlled by diverse entities (e.g., more than 10,000, or more than 100,000 different end users, each using a different pair of client devices). In some embodiments, users may operate client computing devices, like a laptop or desktop computer, which a user may use to log into an online account to access online resources. Other devices may also be suitable for this purpose, such as tablets, netbooks, and the like. These may be referred to as "primary" devices to distinguish them from the secondary device (e.g., like a mobile device, like a smartphone) by which out-of-band authentication is implemented during an authentication session.

In some example embodiments, a user may input credentials via a client computing device by which access to an online resource is governed. For example, a user may input credentials via a client computing device for an online account at a log-in page of a website via a browser or similar log-in interface within a native application executed on the client device. Thus, for example, a user may utilize a client computing device to present credentials corresponding to an attempt to access online resources, like a web-service, which may include various websites, web applications, or services accessible by or utilized via a web-browser, native application, or which may be supportive of a native application, web application, website, and the like.

In some cases, a reduced set of credentials may be presented (e.g., initially), which may or may not require user input of a full set of traditional log-in credentials (e.g., like a username and a password in combination), in at least some example embodiments. For example, in some cases, an identifier of the user or the client device, which may differ from a username by which the user might otherwise access the online resources, may be supplied as a credential instead of a username and password combination.

The client computing device may submit (e.g., in response to a user election to log-in) one or more credentials (which may be sent by submitting proof of possession of the credential, like cryptographic hash values based thereon) to a remote server, which may include an authentication system to authenticate user access via the client computing device to those online resources or the remote server may engage an authentication system and receive a response authenticating user access via the client computing device to those online resources. In some example embodiments, a tokening system may be implemented, and in such examples the client computing device may engage an authentication system to obtain a token to present to the remote server (which may authenticate the token upon receipt (either based on received data associated with generation of the token as provided by the authentication system or signature verification) or may engage the authentication system to authenticate the token).

The authentication system may verify whether the user inputs valid credentials, if those credentials are authenticated (i.e., verified as corresponding to the user-account of the user seeking access) the client computing device may be granted access to the online resources provided by the remote server, such as granting the client computing device access to a user account of a website, services utilized by a native application or by the client computing device, other various web-based services (web services), and the like. Conversely, if the user inputs invalid credentials, authentication fails (i.e., not verified) and the client computing device may be restricted from accessing the online resources provided by the remote service (e.g., denying access to a user account of a website or denying access to services utilized by a native application or by the client device, or other web services).

In some embodiments, that remote server engages an authentication service of an authentication system. For example, the remote server may transmit the credentials received from the client computing device to an authentication server. In turn, the authentication server, rather than the remote server, may authenticate the credentials, and provide the authentication result (e.g., verified or not verified) to the remote server. The remote server may then grant the client computing device access to the online resources or restrict the client computing device from access to the online resources. In some cases, the remote server and the authentication system communicate directly via an application program interface, or in some cases, the systems communicate via the client device, e.g., by passing parameters in query strings of redirect commands.

In some embodiments, the authentication process of an authentication session may occur when (e.g. in response to an event in which) the user attempts to access a native application, or more generally, a software asset. In other words, such assets may be secured, and access to those assets may be granted conditionally upon authentication of the user attempting to access the asset. A recent development in an era where network access, such as to the Internet, is prolific, digital rights management (DRM) techniques have been implemented to protect native applications, software assets, and other media from unauthorized access. DRM can include authentication checks that occur at time of access of an asset, periodically (e.g., every few minutes or hours while the asset is being accessed (e.g., read or executed), or continuously such as over a connection with a server while the asset is being accessed, sometime referred to as always-online. Authentication may protect an asset like a native application or feature thereof rather than (or in addition to) a specific online resource. Another example of an asset may be a media file. By way of example, a native application, like a native application for creating 3D models, may require user authentication upon launch (e.g., for a license) to access the application itself (which may require periodic re-authentication), or user authentication may be required for the native application to access an online resource (e.g., a repository of data), like a repository of 3D models. Sometimes both instances of authentication may be required. In either instance, a user may supply credentials (which may differ for each instance) and a remote server (or servers) may determine or receive an authentication result. In the case of the native application requiring user authentication (e.g., upon launch), a remote server may provide the result or data indicative of the result to the native application. In the case where user authentication is required for the native application to access an online resource, a remote server may grant the native application to access the online resource based on the result.

In some embodiments, the authentication process includes one or more authentication steps in addition to (or instead of) verifying credentials (e.g., initially) received from the client computing device. In some examples, the client computing device initially provides a reduced set of credentials, which may be a single credential, by which a record corresponding to the user (e.g., like a user account) may be identified and authentication of the user is performed based on other data, such as one or more values determined by the out-of-band device (which may be conveyed via the client computing device rather than the out-of-band device in at least some examples where the out-of-band device lacks access to a network such as the internet). For example, in some embodiments, the credentials received from the client computing device need only identify a particular user, account, or other entity. As such, the authentication process may not require any verifying of user credentials initially received from the client computing device. In either instance, based on the received credentials, a server may identify account information of a user associated with those credentials. In some embodiments, the received credentials include a user identifier operable to identify associated user account information. For example, a credential, like an identifier (which may be a username, phone number, email, etc. or hash thereof) may be operable to identify a corresponding user record. As authentication of the user includes an out-of-band process, conveyance of a password in connection with the identifier may be omitted in some examples.

User account information may include information about different computing devices used by the user (e.g., including a mobile computing device different from the client computing device attempting to access an online resource). The information about the different computing devices may include one or more identifiers for the respective computing devices, e.g., unique identifiers that distinguish the device from other computing devices and map to records in a push notification service like those mentioned below. Example of identifiers may include a network address identifier or a monitored address identifier. Example network address identifiers may include one or more of an IMEI number, telephone number, MAC and IP address, and/or other identifiers suitable to uniquely reference a given computing device. An example of a monitored address identifier may be a location (e.g., on a network) which a given computing device monitors for data published to that location and/or a key-value pair like a location and an identifier which a given computing device monitors for at that location. In some example embodiments, the monitored address identifier may be an address of a given computing device on a notification network or service, like a push notification network, to which the computing device has registered, e.g., without the sending party having access to an IP address or physical layer address of the recipient before causing the message to be sent, as such information may not be forthcoming in some mobile use cases where such addresses change frequently as the user moves through different areas. In turn, the given computing device may receive data published to that address on the notification service. In some embodiments, a monitored address identifier may be a network address identifier of the computing device. In some cases, such as those described herein in accordance with some embodiments, push notifications may be unavailable to a mobile computing device, however, a record corresponding a mobile computing device may still be selected as such a record, like a device record, may include information by which a user may authenticate as described herein even in the absence of a network connection.

One or more of the different computing devices, such as a mobile computing device, may register with a remote server, such as via an authentication application. In turn, those registered devices, like mobile computing devices, may be utilized during periods where a network connection is unavailable in addition to periods where the device obtains network access. For example, a mobile computing device may register with the server via an authentication application by downloading the application from the server or an application repository (or application store), executing the application, and performing one or more steps in a registration process. Obtaining the application may be performed by downloading and installing, or accessing an existing install without re-downloading and installing. The server may determine which ones of the different computing devices, such as those including the authentication application, are operable to receive a notification of the access attempt to the secure asset, or which may process a notification in an offline out-of-band authentication process. In many cases, a user registers a mobile computing device (e.g., like a mobile phone of the user) as a primary device for selection in an out-of-band authentication process. Some embodiments may permit the user to select which registered mobile computing device by which the user wishes to authenticate in an offline out-of-band authentication process. Operations of the offline out-of-band authentication process may be implemented in instances where the device is online (e.g., can receive data, like wireless data, from a network, like the internet) to confer additional benefits. Accordingly, applications of disclosed embodiments extend beyond instances where a mobile computing device does not have network access.

In some example embodiments, the server may select one of the different computing devices registered with the server and cause a notification, such as a push notification, to be sent to the one of the different computing devices, like a mobile computing device registered as being associated with the user identifier. The server may send a notification such as a push notification over a service like via Firebase Cloud Messaging service, Apple's push notification service, Google Cloud Messaging, or another push notification service to which the different computing device is subscribed. Such messages may be relayed over other servers (e.g., other server systems) accessed via the Internet. An example of another notification service may be a notification service subscribed to by the authentication application on the different computing device, such as a feed, on which the server may push or otherwise transmit a notification. In either instance, the server transmits the notification such that one of the different computing devices may receive the notification. In some embodiments, an authentication server of an authentication system performs one or more of these steps in response to receiving credentials operable to identify associated user account information from a remote server. In some embodiments, an authentication service of an authentication system performed one or more of these steps in response to receiving credentials operable to identify associated user account information from the client computing device, such as by a redirection of the client computing device to the authentication server (e.g., by the remote server), or other configuration by which the client computing device may transmit credentials to the authentication server (e.g., via applet or other embedded content, such as within a log-in page, via application, etc.).

In some example embodiments, the sever may select a computing device, like a mobile computing device, registered with the server and configured to process notification information transmitted to the client device requesting access to a secure asset (e.g., rather than via a notification service to the mobile computing device via a notification server). For example, notification information may include encoded information, like in a signal, image, or alphanumeric text that is conveyed (e.g., by the client computing device requesting access the secure asset) to the mobile computing device. In some example embodiments, the notification information may be a quick response (QR) code that may be displayed on a screen of the client computing device and subsequently captured by the mobile computing device for processing. The notification information may include data by which authentication of the user on the mobile computing device may verified by the server. In one example, a random string (e.g., alphanumeric characters) may be encrypted by the server with a public key of a key-pair. The mobile computing device may maintain the private key of the key-pair by which information encrypted with the public key may be decrypted. The above note registration process may include generation of the key-pair. For example, the mobile computing device may generate the key-pair in association with the registration process and convey the public key of the key-pair to the remote server and retain the private key. In some embodiments, the mobile computing device may utilize an existing key-pair and convey the public key of the key-pair to the remote server. In some embodiments, a remote server may generate the key-pair and provide the private key to the mobile computing device. Thus, the mobile computing device may maintain (e.g., store in memory) a private key of the key-pair and the remote server may maintain (e.g., store in memory) a public key of the key-pair, where such keys correspond to respective keys of an asymmetric encryption protocol. The mobile computing device may be configured to permit utilization of the private key subject to authentication of the user of the mobile computing device, such as via one or more credentials. In turn, the mobile computing device, after authentication of the user via the one or more credentials, may process data based on (or utilizing) the private key of the key-pair, such as to decrypt data encrypted by the public key of the key-pair. In the above example, decryption of the notification information may yield data corresponding to or by which the mobile computing device may determine a response to a notification response.

In some embodiments, the mobile computing device may execute an authentication application that includes an event handler configured to respond to such a push notification received from a server, such as an authentication server of an authentication system. The event handler of the authentication application may register with the operating system to receive such events and, in response to an event, interface with the mobile computing device to present, on the display, one or more user interface elements responsive to the notification. One or more of the user interface elements may be operable to solicit credentials from the user of the mobile computing device, or otherwise execute a process to solicit credentials. For example, the event handler/authentication application may request one or more native applications of the mobile computing device to present user interface elements configured to solicit the additional credentials via one or more interfaces of the mobile computing devices configured to obtain a corresponding credential input from the user. In some embodiments, the native applications selected to solicit credentials are configured to interface with a trusted execution environment of the client computing device, such that those credentials are obtained within the trusted execution environment. Alternatively, or in addition to interfacing with native applications, the authentication application may interface with the trusted execution environment of the mobile computing device to request solicitation of the additional credentials. In either instance, the user may be prompted to provide solicited credentials (or confirm a providing of the credentials) via one or more user interface elements or components and provided credentials may be obtained within the trusted execution environment when supplied by the user. For example, the user may then supply the additional credentials, like a password, Fast ID Online (FIDO) universal second factor (U2F) dongle near field communication (NFC) output, pin code, or biometric "print" measurement (like a fingerprint sensor reading, image sensor reading such as a faceprint (e.g., sensed with a time-of-flight sensor, structured light, or stereoscopic or light-field imaging), an iris reading such as an eyeprint, a voiceprint, or the like). The authentication application may obtain representations of the supplied credentials. In turn, the authentication application may transmit the additional credentials obtained from the user to the authentication server of the authentication system.

Thus, for example, access to the online resources (or other asset like a native application) from the computing device may be granted by virtue the different computing device authenticating with the additional credentials. In practice, for non-nefarious access requests, the user of the computing device is typically the same user as the one requesting access to the online resource with the different computing device, and the supplying of the additional credentials verifies both the user's intent and identity to access the online resources (e.g., such as where access to the online resources is controlled on a per-individual user basis). Other and/or additional factors may also be considered, examples of which are explained in detail below.

Before or after user input to supply a credential via a mobile device (or other device different from a client computing device requesting access to an online resource), an authentication application may establish a secure channel with a trusted execution environment on the mobile computing device using the techniques described below. The secure channel may be established during a lifetime of a secure session between the authentication application and the trusted execution environment. Should the session expire, such as after a predetermined number of requests and/or response or threshold amount of time has elapsed, a new session may be established to permit communication by secure channel. Supplied credential values, e.g., a cryptographic hash value based thereon, may be obtained (e.g., accessed or computed) within the trusted execution environment. Representations of those credentials (e.g., representations that demonstrate proof of possession of the credential, like a cryptographic signature that indicates proof of possession of a private key in an asymmetric protocol or a cryptographic hash value that demonstrates possession of a cryptographic key in a symmetric protocol) may be generated (e.g., within the trusted execution environment and may be passed through the secure channel to the authentication application. In some embodiments, the trusted execution environment may determine whether supplied credential values match previously obtained credential values stored within the trusted execution environment. For example, the trusted execution environment may determine whether supplied credentials values or a cryptographic hash value corresponding to supplied credential values match a valid credential stored within the trusted execution environment. The valid credentials stored within the trusted execution environment may have been generated during a prior registration process by the authentication application, and representations of the valid credentials may have been provided to the authentication application for transmission to an authentication service during the prior registration process. Representations of valid credentials may be a cryptographic hash or encrypted version of valid credentials or valid credentials and some other value, even though valid credentials may also be cryptographically hashed or encrypted themselves. Only representations may be passed outside of the trusted execution environment such that valid credentials need not be altered to generate new representations (e.g., by changing an encryption key or changing a value operable to alter cryptographic hash output values).

Results may be cryptographically signed with a private encryption key held within the trusted execution environment (e.g., not accessible in the memory address space of the operating system of the mobile computing device in which the authentication and native applications execute, and in some cases not accessible on a memory bus of the central processing unit of the mobile computing device), for instance, in memory outside a physical memory address space defined by a memory bus coupled to a memory controller integrated with the CPU of the mobile device. For example, some embodiments may cryptographically sign (e.g., in the trusted execution environment) various outputs of the trusted execution environment used for authentication (e.g., verification and matching by an authentication system). Example outputs may be one or more of a verification results as determined by the mobile device, a representation of a credential value, and/or other information described herein. For signed data (e.g., a signature of the data using a key, like a private key), the signature may be verified based on the input data and a corresponding key (e.g., the public key corresponding to the private key).

In some embodiments, a remote server is configured to receive the cryptographically signed data, verify that the cryptographically signed data was signed by an entity (e.g., a specific mobile computing device of a user) with access to a private cryptographic key corresponding to a public cryptographic key associated with the user's account (e.g., demonstrate that the received value demonstrates possession of a secret value), and then, determine whether the signed data indicates that the user-supplied credential matches that previously supplied during registration. For instance, a server may recompute a cryptographic hash of a shared secret value and confirm that it matches the received value. The remote server may verify that user-supplied credentials match (e.g., in the sense that they demonstrate possession of the same secret) those previously supplied during registration where the data is a representation of the user-supplied credential. In some embodiments, a different cryptographic key pair in an asymmetric encryption protocol (e.g., Diffie-Hellman, Digital Signature Standard, ElGamal, RSA, etc.), may be applied for each of a plurality of different credentials to generate representations, such as a plurality of different biometric measurements, required by a policy applied in a given authentication process. Alternatively, or additionally, different representations may be generated using different inputs to a cryptographic hashing function (e.g., SHA-256, SHA-512, BLAKE2, etc.) to demonstrate possession of the credential values without revealing their content. Some embodiments may implement a hybrid cryptographic protocol by which a shared secret is established with asymmetric encryption and then the shared secret is used in a symmetric encryption protocol. In configurations that use credential-specific keys (e.g., the client may have multiple credentials for different online resources, and each credential may have a different associated key), embodiments may mitigate key distribution issues that arise when an entity (e.g., a company) disables a particular type of credential for accessing an online resource or asset while leaving the others in place. Representations may also be generated in different ways for different ones of parties utilizing an authentication system. Thus, for example, a set of credentials used for a company A may have different representative values than when that same set of credentials are used for a company B. Additionally, in some embodiments, different key may be used for the same credential, e.g., as backups or one-time keys. In some embodiments, an authentication server of an authentication system performs one or more of these steps in response to receiving credentials from a remote server (a term which is used herein to refer to a remote server-side application that may be implemented on one or more computing devices, e.g., in a micro-services architecture, or a monolithic server-side application).

FIG. 1 illustrates an example computing environment 100 within which an out-of-band authentication system with a client-side role in out-of-band authentication may be implemented. In some embodiments, the computing environment 100 may include a mobile device 101, a client device 135 (e.g. a primary device in a device pair used in an authentication session by the user), a relaying party computing system 145, and an authentication server 155. These components may communicate with one another via a network 121, such as the Internet and various other local area networks. In addition, embodiments of the example computing environment 100 may include a mobile computing client device, such as mobile device 101, that supports client-side out-of-band authentication based on a secure channel to a trusted execution environment.

In some embodiments, the techniques described herein may be implemented within the computing environment 100 (e.g., including each of the illustrated components) shown in FIG. 1 by executing processes described below with reference to FIGS. 2-6 upon computing devices like those described below with reference to FIG. 7. In some embodiments, computing devices like those described with reference to FIG. 7 may include additional and/or other components specific to configurations discussed herein. For example, a mobile computing device 101 may include components similar to those described with reference to FIG. 7 that support the client execution environment 113 and additional components supporting a trusted execution environment 103, which may include a subset of like components (e.g., processor, memory, bus, etc.) configured to perform operations of the trusted execution environment. Similarly, client devices 135, servers 145, 155, and repositories 160, 165 may include some additional and/or other components than those illustrated in FIG. 7. However, each of these devices may operate in accordance with principles similar to those discussed below and with reference to FIG. 7, such as by loading instructions and other data into a memory and executing those instructions by a processor to perform various operations.

One pair of mobile device and client device is shown, but embodiments are expected to include substantially more, e.g., more than 10 or more than 100 concurrently participating in authentication sessions. The mobile device 101 may be a mobile computing client device to which a user has access to and may utilize to authenticate a request to access a secure asset like online resources. Notably, as is often the case, the request to access online resources may not originate from the mobile device 101. Rather, the mobile device 101 serves a client-side role in an out-of-band authentication process for that request to access online resources. By way of example, the request to access online resources may originate from a different computing device, such as client computing device 135. A common context for the above scenario might include an employee using a work or personal computer (e.g., a laptop or desktop computer), represented by client device 135, to request access to online resources (e.g., a web application) hosted on a remote server by their employer, and using a work or personal mobile device (e.g., a smartphone or tablet), represented by mobile device 101, to provide data utilized to authenticate the request to access the online resources. Other example contexts may include other online resources, which may include various web-services, which may include web-applications, in addition to various websites, services supporting applications or client devices, and the like. For example, a user may utilize a client device 135 to access an online resource 147 provided by the relying party 145 and may authenticate that access attempt via their mobile device 101.

Accordingly, while the mobile device 101 may be any client device, the mobile device may optionally include a trusted execution environment which, in some cases, may be an external, portable device capable of being coupled via a bus, like USB, to any client device including a suitable interface. Example devices including highly portable smartphones and tablet type devices carried by users during their day-to-day activities are common representative embodiments. Moreover, smartphone and tablet type devices, given their portability, are more likely to include integration of trusted execution environments for purposes beyond out-of-band authentication, such as for secure payments, digital currency wallets, and the like. The above should not be construed to rule out other portable mobile computing devices, such as wearables, like watches or bracelets, that as they become more prevalent may be as equally suited as a smartphone or tablet device to collect credentials from users. For example, some of those wearable devices are operable to collect different user credential inputs which may be utilized for authentication processes. In fact, devices such as wearables, may be suitable to reduce intrusion on users while providing robust out-of-band authentication.

Generally, embodiments of a trusted execution environment 103 may include any isolated execution environment, which may run in parallel (e.g., concurrently with) with a client execution environment 113 (CEE), e.g., a process executed in the context of the OS and having a distinct virtual address space assigned within the physical address space of the memory to which the CPU is connected via a memory bus. Compared to a user-facing client execution environment 113, which may execute the mobile device operating system and most user-facing mobile applications, the trusted execution environment 103 is expected to be more secure and may execute a subset of specific applications (e.g., applications, services, and/or software modules) on the mobile device, like trusted applications or modules for authentication operations, which may include user authentication, payments, digital rights management, and the like. Some of those authentication operations may be performed in an out-of-band (e.g., external to a channel by which the primary computing device requests authentication) authentication process, such as for granting user access to online resources and other assets, payments, digital rights management, and the like. Additionally, the trusted execution environment 103 may store within and/or cryptographically sign data associated with those applications or modules within the trusted execution environment, such as to protect the data from being tampered with, read, and/or modified by an unauthorized entity.

In some embodiments, the out-of-band authentication process includes one or more operations which may be performed by a mobile device 101 even where that mobile device 101 lacks connection to a network by which notifications might otherwise be received. Some embodiments may implement aspects of one or more of those processes even when a connection to a network is available to the mobile device 101 to confirm physical access to a client device 135 requesting access to an online resource. In such examples, notification information may be transmitted to, or otherwise obtained by, the client device 135 and displayed or otherwise conveyed for processing by the mobile device 101.

In some embodiments, the trusted execution environment 103 may perform one or more operations responsive to requests received at an interface by which one or more applications within a user-facing client execution environment 113 may request data from and/or provide data to the trusted execution environment, such as to utilize one or more of the modules within the trusted execution environment 103 for authentication operations. Thus, in some embodiments, a client execution environment 113 may include an application programming interface (API) by which those requests are communicated from the CEE 113 to the TEE 103, and responses thereto are communicated from the TEE 103 to the CEE 113. In some embodiments, the TEE 103 may include an API like that above for facilitating the above communication of data, or may additionally include another API (e.g., in addition to either aforementioned API) or secure operating system for facilitating communication of data between elements within the TEE 103. Thus, for example, once the TEE 103 receives a request or other data for processing, that data can be processed exclusively within (or securely by) the TEE (e.g., without revealing secure data to the CEE). The structure of the trusted execution environment 103 may be logical, implemented in hardware, or a mix of both.

Some embodiments of the trusted execution environment 103 may include a TEE co-processor 105 and TEE memory 107, which may be physically separate from the processor 115 and memory 117 of the client execution environment. For example, some implementation of the TEE memory 107 may include a physically distinct memory address bus from the main processor 115, but which is coupled to the TEE co-processor 105 to support secure communications between them. This is not to suggest that both the co-processor 105/processor 115 and/or TEE memory 107/memory 117 may not be incorporated in a same package or die or that the co-processor 105 and/or TEE memory 107 cannot make use of at least some or all of the capabilities of the processor 115 and/or memory 117 in a secure fashion. In some examples, embodiments of the trusted execution environment 103 may include a TEE co-processor 105 and/or TEE memory 107 which can be physically separate from but have available the full processing power of the processor 115 and/or memory 117 of the client execution environment 113. In some embodiments, the TEE co-processor 105 and/or TEE memory 107 are partially or wholly logically separate, such as by way of a reserved or additional processing core and/or reserved address space. For example, embodiments of the trusted execution environment 103 may include a TEE co-processor 105 and/or TEE memory 107, which are logically separated from the processor 115 and memory 117 of the client execution environment, such as by cryptographic isolation of one or more processes, threads, processing cores, and/or address space, or as secure elements within respective components. Within the trusted execution environment 103, the different trusted applications or modules may also be isolated from one another, such as by cryptographic isolation or other software isolation techniques.

Oftentimes, the trusted execution environment 103 includes at least one keyed hardware component. Keyed hardware components can include a unique cryptographic key or keys for isolating trusted applications and/or data within the trusted execution environment or to otherwise prevent tampering from the client execution environment 113 or other entity. Keyed hardware components can be substantially tamperproof. For example, the design of the keyed hardware component can be immune to software attacks, and an attacker might have to go to exceptional lengths in physically examining the keyed hardware component (e.g., with highly specialized tools) to even possibly be able to read the key. In some cases, the key may even be stored in a memory configured such that attempts to read the key of the hardware component is destructive to the memory (e.g., causes stored values to change or the memory to change stored values). Thus, under even the most extreme of circumstances, the keyed hardware components can be configured to prevent divulging of their key or keys.

In some embodiments, one or more components operable to solicit credentials from a user may be configured to communicate with the TEE co-processor 105 and/or memory 117 in ways similar to those described above to provide enhanced security. For example, one or more of the components operable to solicit credentials may be logically and/or physically isolated from the CEE 113 to support secure communications with the TEE 103. For example, one or more of those components may be physically isolated by couplings through a system bus different from a main system bus. The isolation may also be logical, such as by cryptographic isolation, which may utilize keys associated with those hardware components operable to solicit credentials. Accordingly, data communications by one or more of those components that is secured by one or more cryptographic keys may, in some configurations, logically flow through and/or be accessible from the CEE 113 and still be considered isolated as the TEE 103 securely stores a key operable to decrypt the data and that key is not accessible by the CEE 113. As an example, the memory 117 of the TEE 103 may securely store one or more keys operable to decrypt information received from the respective components. In some cases, isolation of one or more components may only be partial, such as where the component also serves a function with the CEE 113. For example, a given component may communicate securely via a separate system bus, cryptographic isolation, or in another secure way (e.g., on a request/response path between the TEE and component) described herein for communications pertaining to the TEE 103 and in an unsecured fashion via a main system bus and/or without encryption for communications pertaining to the CEE 113.

In some embodiments, the trusted execution environment 103, with the TEE co-processor 105, may execute a process to generate or otherwise store one or more encryption keys 108, which may include one or more keys from a key-pair, such as a pairing of a private encryption key and a public encryption key. One or more generated keys 108, such as generated private keys, may be protected within the trusted execution environment, such as within the TEE memory 107. For example, generated private keys may be isolated from trusted applications within the trusted execution environment by cryptographic isolation. In some embodiments, generated private keys may be encrypted (e.g., for storage)

based a cryptographic key of a hardware component, such as a key of one of the TEE co-processor 105 or component associated with the TEE co-processor 104, so that only the TEE co-processor 105 can utilize a generated private key. For example, a process of the TEE co-processor 105 may access an encrypted version of the generated private key stored within the TEE memory 107 and then decrypt the encrypted version of the generated private key based on a cryptographic key of the hardware component prior to another process utilizing the private key). In this way, a generated private key may be afforded a substantially similar degree of security as that of a cryptograph key of the hardware component. In other words, a malicious actor must cause the hardware component to divulge a key for decrypting an encrypted version of the generated private key prior to being able to use the generated private key (e.g., for a signature). Similarly, the TEE co-processor 105 may encrypt other data stored within the trusted execution environment, either with a generated key, received key, a cryptographic key of a hardware component, or combination thereof. Likewise, the TEE co-processor 105 may decrypt other data, such by decrypting that data with a generated key, received key, a cryptographic key of a hardware component, or combination thereof (such as in instances where some data is encrypted based on a generated private key and stored subsequent to further encryption based on a cryptographic key of a hardware component).

In some embodiments, the TEE 103 may be configured to isolate different data within the TEE 103. For example, some embodiments of the TEE 103 may encrypt different data (e.g., different keys or other data associated with different applications or modules) based on a function that takes as input a cryptographic key, such as a key 108 in TEE memory 107, (which may be a generated key, hardware key, or other stored key) and a value that is altered for the different data. Alternatively, the cryptographic key itself may differ for different data, for example, a function may take as input a cryptographic key of a hardware component and a value that is altered to generate different cryptographic keys for different data. In turn, a function may utilize different cryptographic keys to encrypt different data within the TEE 103. The value that is altered may be altered deterministically (an operation referred to as incrementing or decrementing herein, depending on the direction in which alterations occur along a deterministic sequence), selected deterministically, generated randomly, output from a linear shift register, or by other method, and the alteration of the value ensures that one module or application within the TEE 103 cannot utilize a key or data stored within the TEE memory 107 to which it is not authorized.

In contrast to a generated private key of a key pair, which may be maintained solely within the trusted execution environment 103, a public key of the key pair may be shared by the trusted execution environment 103 with the client execution environment 113. In example embodiments where the mobile device 101 receives a key-pair or private key of a key-pair, the private key may be similarly maintained after receipt. Elements outside the trusted execution environment 103 may utilize the public key of the key pair to encrypt data, which can then only be decrypted with the private key stored within the TEE 103. Similarly, the TEE may sign results or other data output with a function utilizing a private key of a key pair, stored within the TEE 103, and an element outside the TEE 103 may utilize a disseminated public key of the key pair to verify the signature, and thus verify that the result or other data output was generated by the TEE 103. Thus, for example, the trusted execution environment 103 may execute a process to sign some data with a private encryption key, and a disseminated public encryption key can used to verify that the trusted execution environment 103 signed the data. In the context of authentication, the data may be a credential value or a cryptographic hash value of the credential value and representative of a user authenticating a request to access online resources.

In some example out-of-band processes, the mobile device 101 may obtain data encrypted by the public key, like encrypted notification data corresponding to an attempt to access an online resource by a client device 135. The encrypted data may be decrypted by the mobile device 101, such as by the private key, to determine a response to the notification. Access to the private key may thus be predicated upon user authentication to access (e.g., unlock) the mobile device 101 and, optionally, one or more additional authentication steps with the mobile device to utilize the private key (e.g., based on a policy governing access to utilize the private key). For example, upon unlocking the mobile device 101, the user may access the authentication application 120 and access to utilize a private key 108 maintained within the TEE 103 for processing data associated with the authentication application 120 may be governed by a policy implementing one or more additional authentication steps. For example, the private key may be encrypted based on another credential by which the user authenticates to utilize the private key.

In some embodiments, the TEE 103 and CEE 113 communicate information by way of one or more application programming interfaces, such as an API 104. Some embodiments of the API 104 are implemented in or by firmware stored to non-volatile memory of the mobile device 101, which can sometimes be a memory space separate from the TEE Memory 107 and/or Memory 117 and specify underlying functions available to the CEE 113 for communicating with the TEE 103 (e.g., like a Basic Input/Output System "BIOS"). Some embodiments of the API 104 may include one or more drivers to facilitate communications with hardware components, such as of the CEE 113 and/or TEE 103. In some embodiments, the API 104 and drivers may be considered separate, but may be layered, like in a stack, whereby the API 104 provides higher level functions and the drivers facilitate operations associated with those functions. Different configurations may include the example API 104 or other elements supporting API functionality, like drivers, in different locations. Some embodiments may include the API 104 within the CEE 113, within the TEE 103, within an element having a physical interface with the TEE 103 and/or CEE 113, in firmware of the mobile device 101 (e.g., in a BIOS), or combination thereof. Some embodiments of the TEE 103 may include a monitor to monitor a system bus for requests from an API 104 (or driver). Oftentimes, the location of the API 104, drivers, and/or other elements depends on the physical and/or logical structure of the TEE and CEE, which can vary between different implementations. However, regardless of the specific implementation, an API 104 may be configured to provide an interface by which at least some data or results determined within the TEE 103 may be passed to the CEE 113 and by which at least some functions performed within the TEE 103 may be requested by the CEE 113. Further, requests for at least some of those functions may include data or arguments for performing at least some of those functions on the data.

An example API, such as API 104, may be configured to receive requests from elements (e.g., a given application, module or interface) within the CEE 113 and communicate those requests to an appropriate element (e.g., a given application, module, or interface) within the TEE 103. In some embodiments, the API 104 translates a received request from a schema compatible with the CEE 113 to a schema compatible with the TEE 103. In some cases, that may include translating a request in one schema into multiple lower-level requests in another schema. In some embodiments, the API 104 may communicate one or more requests in a schema compatible with the TEE 103 over a system bus, which the TEE 103 may include an interface or monitor to detect those requests for processing within the TEE 103. Example requests may include a request to generate a cryptographic key or key pair, solicit credentials, verify credentials, or otherwise perform a function provided within the TEE 103, such as the various operations of the TEE described herein. In turn, one or more elements within the TEE 103 may process a request and optionally return a result of processing the request to the API 104. In some embodiments, the TEE 103 processes a received request in a schema compatible with the TEE 103 and returns result according to that schema. For example, the TEE 103 may include an interface or monitor to provide results back to the API 104, such as over a system bus. The API 104 may translate results received from the TEE 103 into a schema compatible with the CEE 113. In some cases, that may include receiving multiple results from the TEE 103, some of which may be utilized in subsequent requests to the TEE 103, prior to returning a result in a schema compatible with the CEE 113 in response to a request received from the CEE. The API 104, in turn, may communicate a result to an element having initiated a request or other specified element.

In some embodiments, one or more elements within the TEE 103 may communicate with one or more elements within the CEE 113 via the API 104 over a secure channel. In some embodiments, the secure channel substantially protects communication sessions between the authentication application 120 and the TEE 103. More specifically, a secure channel prevents other applications, like native applications 125, from accessing data communicated between the authentication application 120 and the TEE 103 in a communication session. In some embodiments, different ones of the native applications 125 may also communication with the TEE 103 over a secure channel such that other applications cannot access the communicated data. In some embodiments, the secure channel extends to communication sessions within the TEE 103. For example, the secure channel may protect communications between a trusted application or module within the TEE 103 and the API 104 such that other trusted applications or modules within the TEE 103 are prevented from accessing data communicated between the authentication application 120 and the trusted application or module which the communication session was established via the API 104.

Cryptographic systems (like those discussed above for encrypting data) generally rely on cryptographic algorithms based on mathematic problems for which there currently exist no efficient solution. The use of asymmetric encryption algorithms, like those utilizing key exchanges, can afford secure communications without requiring a secure channel. One example of such an asymmetric encryption algorithm generates a key-pair for an entity, where a first key of the key-pair is a private key (e.g., held securely by the entity) operable to decrypt data encrypted with a second key of the key-pair and the second key is a public key made available to other entities for encrypting data to be transmitted to the entity having the private key. However, such asymmetric encryption algorithms are computationally intensive and inefficient for high frequency communications and/or communications of increasing data size. Thus, in many instances, it is preferable to communicate securely, but also efficiently, such as over a secure channel, using symmetric encryption algorithms that are less computationally intensive than asymmetric ones. The secure channel may be initiated utilizing asymmetric encryption to encrypt and pass an identifier or session key that may subsequently be used as a symmetric key or basis therefor in asymmetric encryption algorithms. In some embodiments, an asymmetric key, like a public key, may be used to encrypt an identifier (e.g., by a first entity). The encrypted identifier, in turn, can be decrypted with a private key (e.g., by a second entity) corresponding to the public key and the second entity may return a secure channel to the first entity for a communication session utilizing a shared (e.g., symmetric) encryption key. Additionally, the secure channel may be bound to the identifier such that keys or data created in sessions over the secure channel are not accessible from other application sessions.

In addition to the trusted execution environment 103, the mobile device 101 includes a client execution environment 113. The client execution environment 113 may include a processor 115 and memory 117 configured to perform operations within the client execution environment. For example, the client execution environment 113 may include an operating system (not shown) and one or more applications. Some of the applications may be native applications 125, which generally, are developed for use on a particular platform or device, such as the mobile device 101. Thus, for example, a native application 125 may be loaded into memory 117 and executed by the processor 115 within the client execution environment 113.

One or more of these native applications 125 may be configured to provide services such as notification services, and optionally generate elements within a user interface on the mobile device 101 in response to the receipt of a notification. In addition, some of these native applications 125 may detect, collect, or otherwise support user inputs, such as a selection of a user interface element, and cause an operation corresponding to the selection. In some cases, a native application 125 may prompt the user to provide a specific input in response to the receipt of a notification. In other cases, a native application 125 may evaluate continuously provided inputs (such as from a biometric sensor) in response to the receipt of a notification. In some example embodiments, a native application 125 may evaluate, prompt, or otherwise obtain multiple different user inputs. In either case, example native applications 125 may interface with (or provide an interface on) one or more different components of the mobile device 101 or communicatively coupled devices, such as fingerprint sensors, image sensors, display of software and/or interface with hardware keyboards, etc. as well as other types of components and/or biometric sensor devices operable to obtain corresponding user input types. In some embodiments, the TEE 103 may interface via an API with such native applications 135 to securely collect input credentials.

Examples of user input can include selection of one or more characters or digits on a keyboard (e.g., displayed within an interface on a screen of the device or coupled to the device) and receipt of selected characters or digits, which may correspond to a personal identification number, password, or other keyed input. Other similar examples may include input/selection of a pattern or other combination of user interface elements on a screen. Further examples of user input can include selection of a user interface element to capture an external input indicated by the element, such as inputs pertaining to the user, which may include image data from an image sensor or other sensor, like a finger print sensor, or other biometric sensor operable to collect biometric input pertaining to the user when the user interacts with the sensor. User input may not be explicit, but rather involve detection of and capturing the input, such as by requesting the user position their face or component performing facial recognition in a position that enables capture of the input. In some embodiments, a native application 125 may communicate with one or more external devices to capture external input, like a wearable device comprising one or more biometric sensors operable to collect biometric input pertaining to the user when the user interacts with the sensor. In some embodiments, some types of biometric input (e.g., heart rhythm, blood pressure, body temperature, etc.) may be evaluated on a continual basis or for a trailing duration of time from a current time of notification where those biometric inputs may be individually or a collection thereof indicative of a particular user after a sufficient period of time; and other types of biometric input (e.g., facial image, fingerprint, eyeprint, etc.) may be evaluated upon receiving particular sensor input requested from the user that are indicative of a particular user at time of collection.

Some example native applications 125 may interface, via the API 104, with the TEE 103 to securely collect and subsequently store, in the TEE 103, various ones of valid representations of user credentials 109 for authenticating user input received from the various ones of the native applications. In some embodiments, the secure collection includes one or more secure communications between the TEE 103 and a component operable to collect the credential, and that process may be initiated by a native application 125 through a request to the API 104. In turn, a user may establish valid representations of different user credentials 109 when setting up their mobile device 101 upon purchase, activation, or update thereof, such as by inputting a password, setting up a faceprint, fingerprint, eyeprint, etc. or otherwise setting up or permitting different types of credentials for protecting data on the mobile device 101. In many cases, an operating system of the mobile device 101 or various ones of the native applications 125 request that a user input various credentials during set-up the device or upon installation or use of the application. Accordingly, one or more valid representations of user credentials 109 may be established and/or updated within the TEE 103. As described above, the user credentials 109 as they pertain to different applications may be isolated within the TEE 103. Thus, storage of a valid credential may be specific to a given application (e.g., by encryption with a key different from other keys for other applications), even where the credential itself may be the same for some other applications.

Similarly, a native application 125 and/or operating system of the mobile device 101 may interface, via the API 104, with the TEE 103 to securely authenticate a user based on the user providing input that matches a valid representation of a corresponding credential 109. In some embodiments, the authentication includes one or more secure communications between the TEE 103 and a component operable to collect the credential to receive user input for the credential within the TEE, and that process may be initiated by a native application 125 through a request to the API 104. The received user input may be processed within the TEE 103 for a comparison to a valid representation of the corresponding credential 109 and the native application 125, via the API 104, may receive a result indicating whether the user was authenticated based on the user input. As described above, the user credentials 109 as they pertain to different applications may be isolated within the TEE 103. Thus, authentication of user input with a valid credential may be specific to a given application (e.g., by encryption with a key different from other keys for other applications), even where the credential itself may be the same for some other applications.

Examples of user input may also correspond to inputs corresponding to notification data for authenticating an access attempt. For example, a user may select one or more characters or digits on a keyboard (e.g., displayed within an interface on a screen of the device or coupled to the device) corresponding to notification data by which the mobile device 101 receives the selected characters or digits, which may correspond to encrypted data, like a code, or other keyed input. Examples of such inputs may be received by the TEE 103 or received by the CEE 113 and conveyed to the TEE 103. Other similar examples may include input/ selection of a pattern or other combination of user interface elements on a screen. Further examples of user input corresponding to notification data can include selection of a user interface element to capture an external input indicated by the element, such as inputs corresponding to notification data, which may include image data from an image sensor, such as to capture notification data via an image captured by the sensor. In some example, the notification data may be an optical code, like a QR code, or bar code, or other optical code, which encodes alphanumeric characters or other data in a pattern that may be translated in accordance with a schema based on properties of the optical code. Such optically collected inputs may not require explicit user input for capture, but rather involve detection of and capturing the input, such as by detecting the presence of an optical code, like a QR code, within image data and prompting the user to confirm whether the user would like to process the optical code that is detected. In some example, such detection occurs within the live-image data collected by the image sensor upon its activation (e.g., selection by the user via an interface element) and displayed to the user as indication that the sensor is ready for collection of image data. In various example use cases, collection of notification data (which may be encrypted, or include an encrypted data portion) via an image sensor or other user input may be performed based on the display of such notification data on a client computing device 135, such as in association with an attempt of the client device to access an online resource 147, and thus may be implemented by the mobile device 101 in the absence of a connection to a network. In some additional use cases, such as for physical presence confirmation (which may be implemented in instance even where a connection to a network is available to the mobile device 101), a notification, like a push notification, may be received by the mobile device 101 and prompt the collection of (e.g., additional) notification data. For example, in response to processing (or upon receipt) of a push notification, the mobile device 101 may prompt collection of a code, like an optical code via an image sensor of the mobile device, or via user input on the mobile device, which may be a code that is displayed by the client device 135 (e.g., for confirmation of physical user access to the client device 135 that is requesting access to an online resource 147). Some embodiments of the mobile device 101 may be configured to receive notification data, like a code, via means other than alphanumeric input or image capture. For example, a mobile device 101 may obtain notification data from a client device 135 via a signal generated by the client device, like a NFC or Bluetooth signal, or an audio signal, or the like. Thus, for example, the mobile device 101 may include a sensor, like an NFC or ultrawideband antenna or Bluetooth for obtaining a respective wireless signal, a microphone for obtaining audio signals like an ultrasonic signal, for obtaining notification data via a corresponding signal emitter of the client device. A notification response may similarly be obtained by the client device that is emitted from the mobile device over the same or different communication means. Additionally, a user may provide voice or other input indicate of values of a code and the like. In turn, notification data obtained by the mobile device 101 may be processed, such as based on authentication of the user upon one or more credentials, such as to utilize a private key to process the obtained notification data.

In some embodiments, use of one or more of those credentials may be subject to policies implemented by a remote server, like an authorization server 155 providing authentication services and/or relying party 145 providing access to secured assets, such as online resources, subject to authentication by the authentication service. For example, the authentication server 155 and/or relying party 145 may accept or deny use of the different ones of the user credentials 109 or specify requirements for acceptance of different ones of the user credentials 109 for authentication for different secure assets. As an example, passwords not meeting certain criteria (e.g., length, randomness, number of unique characters, etc.) specified by a policy to access a given secure asset may be denied. As a result, the user may choose to establish new credentials 109 meeting the policy or a different credential 109 (e.g., of a different type) that meets criteria of the policy may be utilized. In another specific example, a policy for accessing a given secure asset may dictate that facial recognition credentials may be denied for a subset of mobile device 101 models, brands, or operating systems that are determined to provide insufficient results in securing the device against attack methods (e.g., are easily thwarted by a printed picture or model of a user's face). As a result, for users of devices belonging to that subset of mobile devices, different credentials 109 that meet criteria of the policy may be utilized. In some example embodiments, a policy may be stored on the mobile device 101 and govern the utilization of a key, like a private key, subject to authentication of the user by one or more of the credentials. Accordingly, processing of notification data obtained via an image sensor, user input, or signal may be governed subject to authentication of the user on the mobile device 101 in accordance with a policy. Embodiments of codes, like optical codes, or alphanumeric codes, may include an encrypted data portion (e.g., encrypted by a remote server with a public key of a key-pair) that the mobile device 101 decrypts with a corresponding key of the key-pair, like a private key, to determine a valid response to the notification. Utilization of the private key may thus be subject to valid authentication of the user on the mobile device 101, such as based on the policy. In some embodiment, an unencrypted data portion of the notification data may indicate to which relying party (or online resource) to which the encrypted notification data pertains (e.g., where different key-pairs are utilized) or policy information or other requirements for processing the notification data to determine a valid notification response.

In some embodiments, an example native application 125 provides a native notification service configured to post or store received notifications (e.g., to a location in memory 117) such that other applications may detect receipt of a notification to which that application pertains. For example, a native notification application may post a received notification (e.g., in a location in memory) such that an authentication application 120 may automatically detect and subsequently access the notification. The native application may generate a user interface element alerting the user of receipt of the notification. In turn, selection of the user interface element may call or launch the authentication application 120, which may then access the notification. Alternatively, the authentication application 120 may detect or otherwise receive the notification and generate a user interface element alerting the user of receipt of the notification. Specific implementation may vary depending on mobile device 101 capabilities, such as by operating system version or type, available notification services, and the like.

In some embodiments, a native application 125 providing a notification service, such as Firebase Cloud Messaging service, Apple's push notification service, Google Cloud Messaging, etc., may receive a notification on the service, such as push notification, and post the notification to a location in memory 117. One or more other applications (either within the client execution environment 113 or the trusted execution environment 103) may monitor that location in memory 117 for posted notifications. The one or more applications may be configured to identify posted notification to which they pertain, and in turn, perform one or more actions in response to the notification and any data which the notification includes. In some embodiments, a notification service posts notifications for different ones of the applications to different locations in memory 117, such as to different locations specified for the different ones of the applications or different locations specified by the different ones of the applications. In some embodiments, a notification service, in response to receiving a notification, passes the notification or a location in memory 117 of the notification to the application to which the notification pertains.

In some embodiments, a native application 125, like an authentication application 120, may include a module, like an event handler, configured to provide notification service capability when executed on the mobile device 101. In some embodiments, the module may be provided separately, such as in a lightweight companion application to the authentication application 120, depending on the configuration on the client execution environment 113. In either instance, the module may be configured to provide notification service capability when loaded into memory 117 and executed by the processor 115 as a background service or process within the client execution environment 113. In turn, the module configured to provide notification service capability may receive notifications from the network 121 by subscription of the module and/or mobile device 101 to a notification service. For example, the module may monitor a port of the mobile device 101 configured to receive data from the network 121 and identify notifications received at the port, such as based on header information (e.g., sender/recipient information) of one or more data packets containing notification data. In response to identifying a notification, the module may post the notification to a location in memory 117 or otherwise provide the notification to the authentication application 120 by a process like one of the processes described above in terms of a native notification service. Similarly, a native notification service may monitor a port of the mobile device 101 to identify notifications received at the port from the network in a fashion similar to that described above.

Different embodiments may rely on one or more of the different example notification service implementations described herein. For example, in some embodiments, a native notification service executing on the mobile device 101 may receive a push notification pertaining to the authentication application 120 on a notification service to which the mobile device 101 and/or notification service are subscribed and post the push notification to a location in memory 117. The authentication application 120 may monitor the location in memory 117 for posted notifications that pertain to the authentication application and, in turn, access the push notification posted by the notification service. In some embodiments, the authentication application 120 includes a module configured to monitor for posted notifications. In some embodiments, the module may be provided separately, such as in a lightweight companion application to the authentication application 120, depending on the configuration on the client execution environment 113. In either instance, the module may be configured to monitor for posted notifications pertaining to the authentication application 120 when the module is loaded into memory 117 and executed by the processor 115 as a background service or process within the client execution environment 113. In another example, in some embodiments, the native notification service may receive a push notification pertaining to the authentication application 120 on a notification service to which the mobile device 101 and/or notification service are subscribed and pass the notification, or information indicative of a location in memory 117 thereof, to the authentication application 120. The authentication application 120, in turn, may receive the notification or retrieve the notification.

Depending on the embodiment, the mobile device 101 may receive push notifications pertaining to an authentication application 120 following one or more of a user's attempt to access a secure asset. For example, a user may attempt to access (e.g., log on to) an internal website by supplying a username (and optionally a password) to that website, access an online or installed application with another device, make a payment with a credit card or other means, attempt a firmware/software update (e.g., code signing), access other accounts and resources (e.g., consumer across banking, finance, shared credential use, etc.), access shared employee solutions like payment portals, stock or other market trading, etc., download a secured file or other data, open a secured program or file therewith, and the like. More generally, a push notification pertaining to the authentication application 120 may be received by the mobile device 101 following a user's attempt to access or modify a secured asset (e.g., an online resource) via a client computing device. Often, such access attempts are performed with a client computing device other than the mobile device 101 and, as such, the notification causes authentication application 120 to prompt the user of the mobile device 101 to provide credentials for out-of-band authentication of the access attempt. Notably, the secured asset need not be an online resource or necessarily correspond to an access attempt from a client computing device different from the mobile device 101. For example, the secured asset may be a secured program or file on either another client computing device or the mobile computing device. In implementations where the secured asset is a resource that may be accessed offline, there may exist a reasonable expectation that devices that typically access the asset include or can obtain network 121 access such that an authenticating entity may be notified of a user's attempt to access the asset, like a secured program of file stored on the device. In some cases, the secured asset may not require authentication upon every access attempt, but rather require authentication when a network connection 121 exists or require authentication after a period of time, like 1-30 days. In the case of a device accessing secured assets that correspond to online resources, e.g., over a network 121, such access may be inherent (e.g., to a client device attempting to access the asset).

In some embodiments, the mobile device 101 may obtain notification data pertaining to an authentication application 120 following detection of an optical code by an image sensor. For example, the optical code may include an identifier corresponding to the authentication application 120 to trigger processing of the optical code. One example of such a code may be a QR code, and detection of a QR code including the encoded identifier may cause the mobile device 101 to launch the authentication application 120 or prompt the user to confirm launch of the authentication application to process the QR code. In various embodiments, the authentication application 120 may be accessed by the user, e.g., launched, and provide a selectable user interface element to request access to an image sensor via a corresponding API to capture image data, like an optical code, or other image data (e.g., alphanumeric text within an image, another image, etc.), for processing. In some embodiments, an API 104 may provide functionality to securely capture image data for processing within the TEE 103, however, there is no requirement to do so, as a portion of notification data may be encrypted and thus processing thereof may be governed by access to a key (e.g., which may be stored within the TEE 103, or otherwise encrypted) by which that portion of notification data can be decrypted.

The authentication application 120 may be an application, like a native application 125, configured to execute within the CEE 113. The authentication application 120, like other native application applications 125, may be downloaded to the mobile device 101 and subsequently installed, such as by a user of the mobile device 101. Alternatively, the authentication application and one or more other applications, like some other native applications 125, may be preloaded on the mobile device 101 or included in an operating system of the mobile device.

Once installed on the mobile device 101, the authentication application 120 may be loaded into a memory and executed by a processor to perform operations like those discussed herein. For example, instructions corresponding to processes of the authentication application 120 may be loaded into example memory 117 and executed by example processer 115 within the client execution environment 113 to perform one or more of the operations described herein. In some embodiments, the authentication application 120, when executed by a processor, includes instructions by which a registration process is implemented to register the authentication application 120 with a remote server (e.g., server 145 and/or server 155). During the registration process, the authentication application 120 may communicate or otherwise establish identifying information about the user and the mobile device 101 with the remote server. Example communicated information and data may include one or more keys 108, a digital signature of data based on a key 108, cryptographic hashes of credentials 109 or other user or device 101 specific information. In some embodiments, such data may be processed within the TEE 103, and one or more values, like private keys of key-pairs, or credential values, may be maintained within or by the TEE while a public key of a key-pair, representations of credential values, and signatures may be conveyed to a remote server. Example communicated information may also include information about notification services available to the authentication application 120 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) and/or credentials the user is willing to utilize (e.g., password, faceprint, fingerprint, etc.). Example communicated information may further include policy information governing use of different credentials and properties thereof. Policy information may be stored on the mobile device 101 and/or the server. Policy information may be updated for different relying parties or even different secured assets (e.g., like different online resources) of a relying party.

In some embodiments the authentication application 120 includes one or more modules, such as an event handler, which may be loaded into memory 117 and executed by the processor 115 as a background service. In some embodiments one or more of those modules, such as the event handler, or other functions ascribed to the authentication application 120, may be included in or as separate companion applications that are executed (e.g., as background services) to provide similar functionality.

The authentication application 120, as described above, may be configured to detect or otherwise receive notifications pertaining to a user's attempt to access a secured asset, such as an online resource. In many cases, the access attempt is initiated from a device different from the mobile device 101, such as via a client device 135. In some cases, an out-of-band authentication process may be implemented by the authentication application 120 to obtain an indication of physical access to the client device 135 or to generate an indication of authentication of the user when the mobile device 101 lacks network access. In such example embodiments, the authentication application 120 may be configured to obtain notification data, or additional notification data, via one or more available interfaces, such as via user input or via an image capture device, NFC device, Bluetooth device, or the like. In various example embodiments described herein, an image capture device, like an image sensor, of the mobile device 101 may be utilized to capture an optical code including notification data.

In response to receipt or otherwise obtaining a notification, the authentication application 120 may be configured to interface with the TEE 103, such as via the API 104. The authentication application 120 may also be configured to interface with one or more native applications 125. For example, the authentication application 120 may query the API 104 or a native application 125 to solicit or otherwise collect a credential input from a user. In turn, the authentication application 120 may interface with the TEE 103 to obtain a result for the credential input by the user. The credential input, whether biometric, pin, alphanumeric password or other, may be processed within the TEE 103 to determine a result. The TEE 103 may process the credential input responsive to one or more requests or commands received from the authentication application 120 via the API 104. In some cases, the result may include an indication of whether the input credential matches a stored valid representation of the credential 109 or does not match the stored credential.

In some example embodiments, if the input credential matches the valid representation within the TEE 103, the result may be cryptographically signed within the TEE 103 and transmitted to the server. In turn, the server may verify the result responsive to the signature indicating the user authenticated with the device 101. In some cases, the result may include a cryptographically signed input credential or hash (which may be a cryptographic hash) thereof for remote matching and verification by the server. For example, the TEE 103 may sign a cryptographic hash of the input credential within the TEE 103. The TEE 103 may output data, such as a representation of the input credential and identifying data for the notification for which the credential was collected, and signed data, where the signed data may be a signature of a data string comprising the input credential and the identifying information for the notification. The server may receive the result and may compare a cryptographically hashed input credential from the output data to a valid representation of the credential, where the valid representation of the credential was hashed with a same cryptographic hash function, in addition to verifying a signature, such as with a public key received in a prior registration process. Thus, the authentication application 120 may transmit a given result received from the TEE 103 to a server in accordance with the different implementations described herein. In cases where the input credential does not match the stored credential, solicitation or collection of credential input may be performed again, as described above. In the case of remote verification failure, a subsequent notification may be received and processed by the authentication application 120.

In some embodiments, the mobile device 101 may cryptographically sign or transmit other data to the server or generate other data either for offline out-of-band authentication or as indication of physical access. In some example embodiments, a result of processing notification data on the mobile device 101 may be displayed for input on the client device 135 or otherwise conveyed to the client device. In some example embodiments, indication of physical presence may be conveyed in connection with other data transmitted to the remoted server by the mobile device 101, such as by including a determined result of processing notification data for indication of physical presence in the data that is signed to generate the signature, or the determined result may be transmitted in association with the signature by the mobile device 101. In some other example embodiments, a determined result of processing notification data for indication of physical presence may be input or otherwise conveyed to the client device 135 requesting access to an online resource 147 and received by the server from the client device. Similarly, a determined result of processing notification data for authentication of the user when the mobile device 101 lacks access to a network may be input or otherwise conveyed to the client device 135 requesting access to an online resource 147 and received by the server from the client device. In some example embodiments, the determined result may be a code, like an alphanumeric string of characters, indicative of successful processing of the notification data by the mobile device 101. Some embodiments may truncate a determined result, or select characters therefrom based on a given schema to generate the code, such that the code may be fewer characters than the determined result but reliant on successful determination of the result. The desired amount of entropy in the code may be configurable for different relying parties or different assets available from relying parties. In other words, a number of characters corresponding to a length of the code may be configurable, like a 4-character code or 8 or 16 or other number of characters. The higher the number of characters, the greater degree of entropy, and thus the more difficulty of a random input (or a guess) correctly matching the code. As referenced herein, such as above an elsewhere, a code, string, or value may comprise multiple values, or symbols. For example, a code, string, or value may comprise multiple numbers, characters, alphanumeric characters, or symbols. In some cases, a symbol may be representative of multiple numbers, characters, or alphanumeric characters—such as based on an encoding of such symbols which in some cases may be represented, such as visually, by a single element (e.g., like an emoji, or pi (π), Lambda (k), and the like). Symbols may include forms of punctuation, or other characters, which may be utilized within a given formal language, or which may be defined formally within the context of communicating data between entities for authentication operations, and thus need not be restricted to a (or any one) pre-existing formal language, like English or Mandarin, or the pre-existing encoding thereof utilized by computing devices, but rather may be based on or comingle such existing formals language symbols, or include other bespoke symbols as defined formally for exchange between participant entities. In other words, a set of values may be a set of symbols, and in some cases, may differ in length, such as depending on encoding (e.g., where a symbol is represented individually in one encoding, but is represented by multiple symbols in accordance with a different encoding), or may include additional entropy (e.g., punctuational marks, or mathematical symbols, or the like) when incorporated. In various embodiments herein, additional symbols may be utilized in connection with alphanumeric text, and alphanumeric texts may include symbols, like punctuation or other symbols, such as those within the American Standard Code for Information Interchange (ASCII), or other encoding standards for electronic communications, such as Unicode for emojis, and the like, and in some cases multiple such standards or a bespoke set of symbols may be supported or utilized. Thus, in some example embodiments, symbols may be utilized to increase entropy during data exchange (e.g., by virtue of representation of a symbol in a first encoding by multiple symbols in accordance with a different encoding) while minimizing amount of user input (e.g., by selection of a reduced set of symbols in a first encoding that is then communicated via the different encoding with higher entropy). Embodiments may also increase entropy in other ways, such as by configurations implementing case-sensitivity (e.g., for letters of an alphabet), and thus increasing the number of possible combinations for a valid entry without increasing code length. Accordingly, implementation of a relatively short code (e.g., having 4, 8 or 16 values) may confer a relatively high degree of security with minimal fatigue on the user (e.g., where the user inputs such values). Rate limiting code input/number of possible attempts and time-out (e.g., after 2, 5 or 10 minutes) for acceptance of a valid code may substantially mitigate possibility of abuse. In some embodiment, deterministic functions, like hash functions, like a SHA-256 or other hashing function, may be implemented to increase entropy. Some embodiments may implement a hashing function to generate a code based on multiple values, but which does not reveal those values. For example, notification data may be obtained and decrypted to determine a first value, like a plaintext value indicative of successful decryption with the private key that corresponds to the public key by which the first value was encrypted, which may be concatenated with a second value, like a value corresponding to a credential (like a representation thereof) by which the user authenticate with the mobile device to permit utilization of the private key to obtain the first value. In turn, the hashing function may take as input the first value and the second value to generate a hash from which values of a code are then selected. A remote server, which may generate the first value in association with an access attempt by the client device 135, encrypt that value with the public key of the key-pair for which the mobile device 101 retains the private key, and stores representations of credentials previously received from the mobile device, may thus verify a received code in response to the notification data (e.g., by generation of a hash and selection of values of the code for verification of the received code in accordance with the same schema and based on the expected values).

The authentication application 120 may be configured to establish a session defining a secure channel with the TEE 103 to protect data communications between the authentication application and the TEE. For example, the authentication application 120 may be configured to generate an identifier and provide the identifier to the TEE 103, such as via the API 104. The identifier may be tied to the authentication application 120, determined at random, selected deterministically (e.g., based on a register value, system time, etc.), or a combination thereof, such as concatenation of an identifier tied to the authentication application 120 and a current system time. Further, the identifier may be determined by a processing of the data described above, such as by input of the data into a cryptographic hashing function or key generation algorithm to generate the identifier. In turn, the TEE 103 may return a session bound to the identifier such that other applications cannot access data transmitted between the authentication application 120 and the TEE 103, which can include data created during the session. The data created and transmitted during the session may include one or more keys, results, and/or other requests and responses generated during the session. For example, during a session, the user may establish one or more credentials 109 in TEE memory 107 for use with the authentication application 120. The established credentials 109 may include cryptographic hashes or other ciphertext of credential values whether biometric or alphanumeric, such that those representations may be passed to a sever, like authentication server 155, for authentication operations without divulging actual credential values. In addition, or alternatively, the established credentials 109 may include unique signature information from the TEE 103 (such as a public key) that is passed to the authentication server 155 such that signed data (with a corresponding private key) output by the TEE can be verified as originating from the TEE. Moreover, in some embodiments, the remote server may encrypt data that is decryptable by a key maintained on the mobile device 101, such as within the TEE 103. Thus, for example, the remote server may encrypt data, such as by a public key, which may be decrypted by a corresponding private key on the mobile device 101, and a code based on the decrypted data may be returned to the remote server as being indicative of proof of access to the private key (e.g., by virtue of user authentication on the mobile device, such as via the authentication application, to utilize the private key to decrypt the encrypted data). Accordingly, similar to authentication of the user prior to utilization of a key to generate a signature verifiable by the remote server with the public key, a key may be utilized to decrypt data that is encrypted by the public key.

The authentication application 120 may receive credentials 116 (e.g., public keys and representations of credentials) like those described above from the TEE 103 for out-of-band authentication operations. Those credentials 116 received by the authentication application 120 may be stored in memory 117 within the CEE 113 and transmitted to a server without divulging actual credential values, as they are representative of credential values protected within the TEE (or by a cryptographic process). The authentication application 120 may verify they originated from the TEE (e.g., verification of signed data output by the TEE), and pass the credentials to a server, like the authentication server 155. One or more of the credentials may be passed in a registration process with a server, like authentication server 155, or in response to a received notification. For example, in a registration process, the authentication application 120 may be configured to pass signature information to the server such that received data can be verified as originating from the TEE 103 and one or more representations of credentials for different credential input options may also be passed. During an authentication process, such as in response to receipt of a notification requesting the user to authenticate via one or more different credential input options, the authentication application 120 may pass data and signed data received from the TEE 103 to the server for verification. In some example authentication processes, such as in response to obtaining notification data including an encrypted portion of data, the authentication application 120 may request the user to authenticate via one or more different credentials input options. In turn, based on the authentication result, a key by which the encrypted portion of data may be decrypted may be accessed to decrypt the encrypted portion of data and determine a result in response to the notification. The result may be based on information included in the encrypted portion of data, and optionally other data, and subsequently passed to the remote server for verification (e.g., in some cases by the authentication application 120 or in some cases by the client device 135, depending on the embodiment).

In some embodiments, the authentication application 120 may request the TEE 103 output signed data with a timestamp and/or include identifying information associated with a particular notification such that signed data may be considered valid for a particular notification and/or at a particular point in time to prohibit reuse. In other words, the server may check that 1) a timestamp or other identifying information associated with a notification matches a transmitted notification, 2) a representation of a credential in output data matches a stored representation (e.g., one stored by the server during a registration process), and 3) signed data, which may be a signature of an output data string of (1) and (2), e.g., {representation, notification ID and/or timestamp}, is verifiable by a public key provided by the TEE during a registration process. The verification process indicating that (1) and (2) were provided by the TEE 103 as only the TEE stores the private key operable to generate signed data verifiable by the data, organized into the string, and the corresponding public key. In some embodiments, the identifying information for a particular notification may include a particular location or address (e.g., IP address and port number, identifier on a notification service, etc.) to which the authentication application 120 should transmit output data and signed data. In some embodiments, the location and/or address may be specific to the notification and the authentication application 120 may request signed output data including the location and/or address specified by the notification to further inhibit possible reuse.

In some embodiments, a session received by the authentication application 120 from the TEE 103 may be in a state that requires registration, such as upon initially executing the authentication application as described above, or a state to continue communications. In the state to continue communications, establishment of the secure channel may be predicated upon the user (and optionally the authentication application itself) successfully authenticating based upon past credentials and/or deterministic values.

In the registration state, the authentication application 120 may be configured to execute a key exchange process with the TEE 103 to initialize a session. For example, the authentication application 120 may provide an identifier to the TEE 103, and the TEE may return a shared key by which the authentication application 120 and TEE 103 can securely exchange data over a channel for the duration of the session. In some embodiments, the shared key generated by the TEE 103 is based on the identifier. The authentication application 120 may be configured to verify that the shared key was generated within the TEE 103, such as by verifying a signature of the TEE. In another example, the authentication application 120 may request a public key of a key pair from the TEE 103. The authentication application 120 may be configured to verify that the public key was generated within the TEE 103, such as by verifying a signature provided by the TEE. In turn, the authentication application 120 may encrypt information with the public key for transmission to the TEE 103. For example, the authentication application 120 may provide the identifier encrypted with the public key in a transmission to the TEE 103, and the identifier may serve as a shared key for encrypted data transmitted during the session. In some embodiments, the identifier may be a public key of a key pair, and the TEE 103 may return a shared key to the authentication application 120, encrypted with the identifier (public key), and the authentication application may decrypt the shared key with the corresponding private key of the key pair to determine the shared key value. The authentication application 120 may determine that any keys or other data received from the TEE 103 were generated within the TEE by the verification of a signature of the data received from the TEE 103. With a shared key established, the authentication application 120 may transmit data to the TEE 103 either by encryption with a public key provided by the TEE 103 or by a shared key.

In some embodiments, the authentication application 120 is configured to interface with the TEE 103 to establish one or more valid credentials 109 for the user within the TEE. The process may occur subsequent to the establishment of a secure channel with the TEE. Some of those credentials 109 may already exist within the TEE 103, such as those previously established by the user, and which the TEE may store for authentication of the user when utilizing the authentication application 120. Those credentials stored for utilization with the authentication application 120 may be encrypted and/or cryptographically hashed to produce representative values. The representations may even differ for different relying parties utilizing the authentication system. For example, the authentication application 120 may be configured to register for different ones of the relying parties or with an authentication server by a process similar to the registration process described above, such as by using different identifiers, and notifications may indicate to which relying party they pertain such that corresponding representations may be requested from the TEE 103 as output, or in instances where different keys 108 or key-pairs are established for respective relying parties, a corresponding key may be identified and utilized to decrypt or sign data with respect to a given relying party. A user may authenticate via input of one or more of the credentials to configure those credentials for use with the authentication application 120. As described previously, the TEE 103 may encrypt representations of those credentials 109 for use in association with the authentication application 120. In some embodiments, different ones of the credentials selected for use in association with the authentication application 120 may be checked against a policy. Credentials not conforming to the policy, whether by strength, length, or security, may be rejected and the use optionally permitted to resubmit credentials for storage within the TEE as applicable. In addition, with a secure channel established with the TEE 103, a user may update one or more credentials. In some embodiments, any updating or establishing of credentials is subject to authentication of the user, such by the user providing one or more input credentials that match valid representations of credentials 109 stored within the TEE 103. For example, in order for the authentication application 120 to instruct the TEE co-processor 105 to execute one or more tasks within the TEE, such as read/write operations within the TEE memory 107, via the API 104, authentication of the user may be required.

In some embodiments, the authentication application 120 is configured to increment a counter associated with communications received from the TEE 103. Specifically, the TEE 103 may provide a counter value that the authentication application 120 must increment and include in a response to or a next communication with the TEE 103 for the TEE to consider the response valid. The TEE 103 may consider the response valid when the incremented count value returned by the authentication application 120 matches an expected value. In addition, for each valid response, the TEE 103 may compare the counter value to a threshold. If the counter value (or a tracked number of increments) exceeds a threshold, the TEE 103 may request the authentication application 120 repeat the previously described key-exchange process to refresh the secure channel and reset the count. In some embodiments, the TEE 103 may refresh the secure channel dependent on whether the user can provide a requested credential that matches a valid representation of credential 109 stored within the TEE, as described above.

The counter value (or values) may be a numerical value or alphanumerical value, like a hash of a numerical value, or some other value. Examples of other values may be a value output by a linear shift register, an identifier of a linear shift register to increment, a location in memory, or other value that may be incremented by the authentication application 120 for a comparison to an expected value, and by which the TEE 103 can track a number of increments performed (e.g., a count). In some embodiments, the incrementing is performed deterministically, for example, the authentication application 120 may increment a counter value provided by the TEE 103 based on a value output from incrementing a given linear shift register or from a provided location in memory. TEE 103 may determine a count from a number of increments (e.g., inputs) provided to a liner shift register or to another functional component (or function) and verify the output value provided by the authentication application 120. Regardless of the specific implementation, verification of the incremented value with an expected value within the TEE 103 ensures that the communication from the authentication application 120 is legitimate and without any attempted injection by an outside actor.

An example client device 135 is illustrated in FIG. 1 and may include access to the network 121. In many instances the network 121 includes public and/or private networks and may include the Internet, telephonic data communications, etc., and the example client device 135 may be a computing device like a laptop, desktop, or workstation operated with network access in a home, office, and/or field environment. In some embodiments, an example client device 135 may be a terminal device or otherwise configured to provide a user interface for terminal access to one or more computing devices and/or virtual machines that may include or provide access to a secure asset and/or be a secure asset themselves. In some cases, the client device 135 may operate on an internal network (not shown) and may or may not have public network access (e.g., network 121) but include a connection on the internal network to one or more of servers 145, 155 or other server that may have and/or afford public network access. Some configurations may allow tunneling into an internal network from another network (e.g., a public network) via secure connection such as VPN or other encrypted communication protocol.

In some cases, an example internal network may be wholly internal, such as a private network within a corporation, and supports communications between the client device 135 and server 145 and/or server 155. Example implementations of the client device 135 in such instances may be a terminal or workstation within a secure environment (e.g., a server room). In such cases, the mobile device 101 may only gain access to that example network while on site (e.g., within range of a wireless connection or while coupled to a wired connection of the internal network) and notifications may be forced to flow through the internal network to afford enhanced security.

Different example client devices 135 may be configured to access different secured assets in a variety of different ways. For example, a client device 135 may attempt to access a secured asset such as an online resource 147 on or via one or more servers 145. In some embodiments, the client device 135 may attempt to access the online resource 147 on or via one or more servers 145 using an application 110 installed to the client device 135. In another example, a client device 135 may attempt to access a secured asset such as an application 110 executed on the client device. In some embodiments, the application 110 may also be configured to access an online resource 147 on or via one or more servers 145.

In association with a given access attempt of a secure asset, like an online resource 147 via an application or an application that utilizes online resources 147, a user of the client device 135 may supply credentials 111 for accessing the secured asset. Those credentials 111 may be supplied in different ways, several examples of which are outlined below. In one example, the secure asset is an online resource 147, like a web-service, hosted on or accessible via one or more servers 145. The online resource 147 may be a server hosted application, application programming interface, user account, virtual machine, or other data or interface accessible by the client device 135 via the server 145. In some embodiments, the client device 135 may include an application 110 configured to access the online resource 147. For example, the application 110 may be a web browser configured to request data on and receive data from the server 145 for presentation on a display of the client device 135. Accordingly, the application 110 may be configured to retrieve data from the server 145 and present the data received from the server to the user. In some cases, the server 145 may redirect the application 110 to retrieve some or all data from one or more other servers, like server 155. The retrieved data, when executed or processed, may cause the application 110 to present on the display of the client device 135 a log-in page or other user interface including one or more fields or other user interface elements configured to receive user credential 111 input for accessing the online resource 147. In some examples, credential 111 information, like a username, account identifier, device identifier, or other information, optionally in combination with a password, may be resident on the client device 135. In turn, the application 110 may transmit data corresponding to the credentials 111 (e.g., input by the user or associated with the client device 135, online resource or relying party, etc.), which may be a username, password, and/or selection of one of more user interface elements, to a given server (e.g., at least one of server 145 and/or server 155) specified in the retrieved data for authentication. In some embodiments, the application 110 may transmit data corresponding to the credentials 111 without direct user input of the credentials, such as where the user has configured the application 110 to populate fields with and/or automatically submit stored credentials. For example, the application 110 may identify to the remote server information about a user account or the client device 135 by which the remote server may identify a mobile device 101 of the user for authentication of the user for the access attempt by the client device 135 in an out-of-band authentication process. In some embodiments, when executed or processed, the retrieved data may cause the application 110 to automatically collect and/or transmit other identifying data corresponding to the user and/or client device 135 with the credentials 111. For example, the application 110 may collect and/or generate identifying data about the user-client device 135 combination in the form of cookie, log, token, or other data. In addition, or alternatively, the application 110 may collect identifying data about the user-client device combination, such as by querying the runtime environment on the client device. All or a subset of the above information may be transmitted to one or more of servers 145 and/or 155. In some embodiments, the application 110 may receive information from one or more of the servers based on the access attempt, such as notification data for offline out-of-band authentication or indication of physical presence. For example, the application 110 may receive a redirect to a webpage, an HTML response, or API response including notification data, as is explained in more detail below.

In another example, the secure asset may be an application 110 executed by the client device 135 and configured to prompt the user to supply credentials 111 when the user attempts to utilize the application or a feature thereof. Similarly, in another example, the secure asset may be an online resource 147 accessible by the application 110 and the application may be configured to prompt the user to supply credentials 111 in response to the user attempting to utilize the application 110 to access the protected asset via the server 145. The application 110 may transmit received credentials to the server 145 and/or server 155 for authentication. In some embodiments, the application 110 and online resource 147 may both be secure assets, and the user may be prompted to provide same or different credentials when attempting to access different secure assets. In some embodiments, the application 110 may be configured to automatically collect and/or store previously supplied credentials and automatically transmit the collected or previously supplied credentials to the server 145 and/or server 155 without prompting the user. The application 110 may similarly collect identifying data about the user-client device combination as described previously for transmission to a server. Additionally, the application 110 may receive information from one or more of the servers based on the access attempt, such as notification data for offline out-of-band authentication or indication of physical presence. For example, the application 110 may receive a redirect to a webpage, an HTML response, or API response including notification data, as is explained in more detail below.

In some embodiments, a secure session is established between the client device 135 and one or more of server 145 and/or 155 for the transmitting of credentials and/or the exchange of user-client device data. The secure session may be HTTP over TLS/SSL, SSH or other secure connection type by which the client device 135 (or applications thereon) can exchange data with a server (or application applications thereon). The secure session may be held open by the server for a pre-configured amount of time (e.g., 1-180 seconds or 1-5 minutes or other duration of time) before timing out to allow enough time for a user to authenticate, such as via their mobile device 101 with the authentication server 155, or process notification data (e.g., received by the client device 135 over the session that may be obtained) on the mobile device to determine a response to the notification that is then transmitted over the session via the client device 135. Once the access attempt is authenticated, the client device 135 may be permitted to access the secure asset. In some embodiments, based on the credentials 111 and/or user-client device information, a server may generate a token tied to that information and transmit that token to the client device 135. In turn, the client device 135 may present the token within a set period of time (e.g., 10-9999 ms or 1-180 seconds or 1-5 minutes) after authentication to access the secure asset.

Tokening of the client may occur in addition to or separate from the secure session. For example, when attempting to access a secure asset on server 145, the client may 135 may be redirected (e.g., via HTTP request) to establish a secure session with server 155 and provide credentials 111 and/or user-client device information to the server 155. When the server 155 authenticates the client device 135, it may pass a token in a redirect (e.g., via HTTP request) that directs the client device 135 back to the server 145 to access the asset.

Some embodiments may include a relying party server 145, which may host or otherwise include a secure asset, like an online resource 147, accessible by devices over a network, such as by the client device 135 over the network 121. Thus, for example, the online resource 147 may be a web-based service utilized by the client device 135 or application of the client device 135. Examples of online resources 147 may include a user account, various web-services, web applications, and other secure assets as described herein. The relying party server 145 may be configured to provide access to such resources 147 for client devices 135 authenticated to access them, such as based on authentication of a given user of a client device requesting access to the resource that is permitted to access the resource from the client device.

In some embodiments of the relying party 145 may include a user identification repository 160, which may store information about users and clients. For example, the UID repository 160 may store identifying information including one or more of user identifiers, device identifiers, identifying tokens for user and/or devices, locations of devices on a network, and the like. The UID repository 160 may also store associations between one or more identifiers, for example, a user identifier may be associated with one or more device identifiers to which that user is permitted access or otherwise uses to access the server, or by which the user may authenticate an access attempt by another computing device. In some embodiments, the UID repository 160 may further store credentials associated with the identifying information for users and clients, though it need not be required to (e.g., server 145 may rely on server 155 for authentication results).

In response to an attempt by a client device 135 to access the relying party server 145 or a web-service provided by the relying party server, such as the example online resource 147, the relying party sever 145 may respond in variety of ways. For example, the server 145 may request credential information from the client device 135, such as by directing an application 110 on the client device 135 to a log-in page or other interface for the submission of credentials, requesting the application direct the user to input credentials, requesting the application provide credential information already input by the user, and/or requesting the application provide identifying information about the client device and/or user (e.g., cookies, logs, tokens, etc. or values thereof). In some embodiments, the replaying party server 145 may collect information about the user and/or client device 135, such as a network address, location associated with the network address, information about the application 110 and/or client device such as version, runtime environment, etc. and/or other information. Credential information may include a user identifier, such as an email, employee ID, active user account, user name, etc., hash thereof or other identifying information about the user and optionally a password. Information about the client device 135 and/or application 110 may include a device identifier, which may be a combination or hash of information determined about the client device and/or application. An example device identifier may account for information such as a MAC address, EMEI number, identifiers of one or more other hardware components of the device, etc., and/or may include information indicative of the runtime environment like operating system version and type, application version, screen size or resolution, or other factor or combination of factors relatively unique to a given device. Accordingly, the device identifier may serve to accurately identify a given client device from other client devices at least for a relatively long period of time (e.g., hours, days, months, or even the lifetime of the device).

In some embodiments, the relying party server 145 may compare information about and/or received from the client device 135 with information stored in the UID repository 160 to determine which user and/or device is attempting to access a given secure asset, such as the online resource 147. For example, the relying party server 145 may identify a user identifier and/or a device identifier stored within the UID repository 160 corresponding to the access attempt. In response to determining which user and/or device is attempting to access the secure asset, such as by determining one or more identifiers stored within the UID repository 160 corresponding to the access attempt, the relying party server 145 may transmit information about access attempt to the authentication server 155. The forwarded information may include the one or more identifiers determined from the UID repository 160 to correspond to the access attempt, in addition to information received from, or determined about, the client device 135. In turn, the relying party server 145 may receive an authentication result from the authentication server 155. The authentication result indicates whether the user of the client device 135 successfully authenticated with the authentication server 155 (e.g., via the mobile device 101). In some embodiments, the replying party server 145 may play a further role in the authentication process, such as by conveying notification data to the client device 135, receiving a notification response from the client device 135, and conveying the notification response to the authentication server 155. The authentication server 155, in turn, may determine the authentication result based on part on the notification response and convey the result back to the relying party server 145. In either instance, based on the authentication result received from the authentication server 155, the relying party server 145 grants (in response to successful authentication) or denies (in response to unsuccessful authentication) the access attempt by the client device 135. If a result is not received within a threshold period of time, the server 145 may deny the access attempt (e.g., by timing out a connection).

In some embodiments, the relying party server 145 performs one or more preliminary verification tasks prior to passing information about the access attempt to the authentication server 155. For example, the server 145 may determine whether the user and/or client device is permitted to access the given secure asset. In such cases, the UID repository 160 may store associations between user and/or device identifiers and different assets to which a user and/or device is permitted access. In some embodiments, the relying party server 145 may also determine whether a password or other credential received from the client device 135 matches a corresponding credential stored in association with a user identifier and/or device identifier within the UID repository 160. In some embodiments, the relying party server 145 may incorporate operations of the authentication server 155 or vice versa, or the operations may be distributed differently.

Accordingly, as described above, in response to an attempt by a client device 135 to access the relying party server 145 and thus the example online resource 147, the relying party sever 145 may respond in variety of ways. For example, in some embodiments, the server 145 may pass information received from the client device 135 to the authorization server 155 without performing some or all of the previously described operations within the UID repository 160. In turn, the server 145 may wait for an authentication result from the authentication server 155 and grant or deny the client device access based on the received result or time out the access attempt if not result is received within a threshold amount of time. In other words, the server 145 may hand off authentication operations to the authentication server 155 and wait for a result. In other cases, the server 145 may participate in authentication operations, such as by conveying data between the client device 135 and authentication server 155 or may perform such operations by incorporating functionality of the authentication server 155.

In some embodiments, the server 145 may redirect the client device 135 to the authentication server 155. In turn, the server 145 may wait for an authentication result from the authentication server 155 and grant or deny the client device access based on the received result or time out the access attempt if not result is received within a threshold amount of time. In some embodiments, the authentication result may be a token for one or more associated identifiers, and the server 145 may store the token within the UID repository 160 in association with one or more identifiers. One example might be a token and a device identifier for a given device and optionally a user account to which that device identifier corresponds. The token may include an associated time-stamp or time-stamps that indicate when the token was created and/or when it expires. In either instance, the server 145 may determine from a time stamp whether a token associated with a given identifier is inactive or active. In accordance with the above example, the server 145 may receive from the client device 135 in association with an access attempt, a token, in addition to information previously described (or instead, such as in the case of the client presenting a token in some cases). The server 145 may determine, from information stored within the UID repository 160 in response to receiving a token from the client device 135, whether the received token matches a valid token received from the authentication server 155. The server 145 may also determine, from an association between the valid token and an identifier within the UID repository 160, whether information received from and/or determined about the client device corresponds to the identifier stored within the UID repository 160. For example, the authentication server 155 may be configured to cryptographically hash a specific set (and optionally order) of determinable information received from and/or about the client device 135 to create an identifier. Similarly, the relying party server 145 may be configured to execute a process in a similar manner to determine an identifier for a client device attempting to access a secured asset. As the identifier can uniquely identify the client device 135 from other client devices, the relying party server 145 may determine to grant the client device 135 access if the token presented by the client device matches a valid token in the repository 160 and an identifier determined for the client device matches the identifier associated with the valid token in the repository 160.

The set of determinable data and order of the determinable data utilized to create an identifier may be held secret by the relying party 155 and the authentication server 155 and optionally may change over time and/or be based on a function dependent on one or more determinable factors. Accordingly, the authorization server 155 may push information about valid tokens and associated identifiers to the relying party server 145 for authenticated clients such that the relying party server 145 may quickly determine whether a client device is permitted to access a given secure asset. For example, a function in a process for creating an identifier may utilize one or more token values as input to determine the set and order of data of determinable data to cryptographically hash for an identifier.

Thus, as described above, the relying party 145 may rely on the authentication server 155 to perform one or more operations in the authentication process, and permits or denies a client device 135 access to a secure asset, such as online resource 147, in response to authentication results received from the authentication server 155. Operations of the authentication server 155 are described in more detail below. Some embodiments, however, contemplate the relying party server 145 performing all or some of those operations described with reference to the authentication server 155.

The authentication server 155 performs operations to authenticate users and provides authentication results that indicate whether a user was authenticated. The authentication results may be utilized by other parties, such as a relying party 145, to determine whether a given client device 135 should be granted or denied access to a secure asset. User authentication operations performed by the authentication server 155 may include one or more operations performed out-of-band from attempts by client devices 135 to access secure assets. Namely, user authentication operations may involve a device different from the client device 135, such as a mobile device 101. In some example embodiments, such as those involving offline out-of-band authentication or indication of physical presence processes may rely, at least in part, on the client device 135 to convey notification data that is obtained by the mobile device 101 for out-of-band processing. Such processes may still be considered out-of-band by virtue of involvement of a secondary device, like the mobile device 101, for authentication of a user that differs from the primary device, like the client device 135, requesting access to a secured asset, like an online resource 147 of a relying party 147.

The mobile device 101, as described previously, is typically a device under control of the user that the authentication server 155 seeks to authenticate and is operable to store credentials specific to that user. The mobile device 101 may store such credentials in a secure fashion or may process credentials in a secure fashion. In some embodiments, a process may involve user input of credentials to utilize, determine, or otherwise access secure values by which the user of the mobile device 101 may be authenticated. Different devices may involve different processes, however, in many cases, a trusted execution environment or secure component is utilized to protect credential values. For example, the mobile device 101 may include a TEE 103 to store credentials 109 in a secure fashion. Further, the TEE 103 may be operable to generate representations of credential values such that those representations can be passed by the TEE to the CEE 113, and by the CEE 113 to the authentication server 155 without divulging actual credential values. Moreover, keys 108 may be stored within the TEE 103, which may be utilized in knowledge proofs, like a challenge, to assert an identity, whether by signature and subsequent signature verification or decryption of data encrypted by a key for which a key operable to decrypt the data is maintained or operable to be obtained on mobile device 101 (e.g., by decryption of an encrypted version of the key based on user input). In some embodiments, representations of credential values may be refreshed or updated within the TEE 103 without requiring a change in credential values. For example, representations of credential values may be dependent on one or more key values or function values used as input in a cryptographic hashing function or encryption algorithm to generate the representations. In turn, the key values and/or function values may be updated within the TEE 103 to generated refreshed representations, rather than requiring a user to provide a new credential values, which is particularly beneficial in instances where a user may be unable to change a credential value (e.g., for a specific biometric input). As a result, the authentication server 155 receives and stores only the representations of credential values and any data breach cannot disclose user specific credential values. The authentication server 155 may also store one or more keys by which signed data may be verified or by which notification data, like a challenge to a mobile device 101 to prove access to a key operable to decrypt data encrypted by the authentication server may be asserted. Moreover, in response to any data breach, divulged representations of credential values may simply be discarded and replaced with refreshed or updated representations of credential values, and likewise, keys may be refreshed. Thus, attackers are limited to targeting individual users. However, in order to ascertain credential values for an individual user, an attacker would need to breach the TEE 103 of the mobile device 101 storing those values. Such a process is time consuming, rarely successful, and would require physical access to a device of the individual storing credential values. Furthermore, because representations are used for user authentication, even if an attacker was successful in obtaining credential values from the TEE of a device, they would only be operable if the attacker knew the current schema for generating a representation thereof after a user reports the device missing or stolen. Moreover, rotation and reformulation of challenges which may be dependent on policies which may be updated over the air may substantially decrease viability of stolen credentials. The end result in view of these mounting difficulties for would be attackers is a highly secure authentication system that mitigates the effectiveness of both specific user targeted and wide scale attacks.

The authentication server 155 may store data for authentication operations in an authorization repository 165. The authorization repository 165 may include a vast number of UID Records 151. A UID Record 151 may include information associated with a particular user and the devices associated with that user. In some embodiments, a UID Record 151 for a particular user may be created for a particular relying party or utilized across multiple relying parties. For example, a given user may have a different UID Record 151 associated with the different relying parties utilizing the authentication system and which the user engages. One relying party may be an employer of the user, another relying party may be a financial institution utilized by the user, and yet another relying party may be an application developer from which the user has purchased an application for personal use. The different UID Records for a same user may have some same information, such as if the user utilizes the same mobile device 101 for authentication with each party, device information for the mobile device 101 may remain the same across the different UID Records. However, the different UID Records for different relying parties may be segmented within the repository 165 for a variety of different reasons, such as compliance with relying party requirements, government regulations, or user privacy in general. Moreover, these different UID Records may include different credential information, like different keys, or representations of credentials, by which authentication in a segmented manner for the respective parties on those respective UID records.

Information associated with a particular user in a UID Record 151 may include one or more user identifiers that user utilizes with a relying party, such as a username, email address, employee ID, etc. The user identifiers may also be representations of user identifies, such as cryptographic hashes of user identifiers, and the cryptographic hashing function may be specific to a given relying party. UID Records 151 may be created by the authorization server 155 when a given user elects to utilize an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

The UID Record 151 may include a plurality of constituent device records for devices associated with that user that may be utilized for authentication or accessing a secure asset. For example, a user having UID record 151 may utilize a device A for user authentication and a device B for accessing secure assets of a relying party.

By way of example, Device A record may be mobile device 101 registered with the authorization server 155 for user authentication to access secure assets of the relying party. During a registration process, such as one performed through an authentication application 120, initial information about the mobile device 101 may be collected and stored within the device A record. The initial information may include information operable to identify the device and transmit notifications to the device, or generate notification data (e.g., which may be specific to that device). In some cases, that identifier may be utilized by the authentication server 155 to transmit notifications. In some cases, that identifier may be utilized by the authentication server 155 to generate device specific notification data, like a challenge, which can be processed by (e.g., only) that device. Some of the information about the mobile device 101 may also be updated over time based on information about the device provided to the authentication server 155 by the authentication application 120 on the mobile device. The Device A record for the mobile device 101 may also contain the out-of-band credentials A for authentication of a user of the mobile device. For example, the OoB Credentials A may include representations of various different credentials provided in a registration process of Device A and a public key for verifying signed data received from Device A. Further, the public key, or another key, stored for Credentials A may be utilized to generate notification data, like a challenge, for processing by Device A (e.g., which accesses a corresponding private key or other key by which a valid response predicated on processing of the notification data based at least in part on that key may be determined by Device A)

Device B record may correspond to a client device 135 utilized by the user. Depending on the relying party, there may be multiple device records corresponding to different client devices utilized by the user over time. Client devices need not be registered, and records for client devices may be created over time as a user utilizes different client devices to access secure assets. However, in some cases, the client device 135 may optionally be registered with the authorization server 155 for use by a particular user or to access secure assets of the relying party. A Device B record for a client device like client device 135 may contain an identifier and/or other identifying information for the device and optionally credentials B, where those credentials may be in-band credentials (e.g., account/password/token, etc.) for applicable embodiments. Some of those in-band credentials may alternatively be stored under the UID Record 151 for client devices 135 in general rather than for a specific client device. However, some credentials may be preferable to store in a device specific fashion, such as which device is currently using a given license (e.g., a product key) for some secure asset.

In some embodiments, permissions may be specified for a UID Record 151 and/or for a given device. Permissions for a UID Record 151, generally, may define which assets the user (associated with the UID Record) may access and how the user may access those assets. Permission for a client device (e.g., one registered by an administrator associated with the relying party), generally, may define which users may access the device and optionally what assets that device is permitted to access, which may differ from assets the user (associated with the UID Record 151 of the user utilizing the device) is permitted to access.

For example, in a business environment context, the client device 135 may be assigned to a particular employee by an administrator of the relying party and Device B record may be stored under the UID Record of the employee. In some embodiments, an administrator may register the client device with specific permissions to restrict use to a specified subset of users or such that only registered devices may access secure assets.

In another example context, the relying party (e.g., globally or per secure asset) may specify permissions governing amounts and/or types of devices allowed under a UID Record 151. As described above, the UID Record 151 may contain a user identifier tied to a particular user/account. When a given client device (e.g., client device 135) attempts to access a secure asset in association with that user identifier, the authentication server 155 may create a device record (e.g., Device B) corresponding to the given client device under the UID Record 151 for that user identifier. Permissions may specify a number of client devices which may be active under a given UID Record 151, such as to restrict use of a secure asset to a given number of devices overall, or to restrict use of a secure asset to a given number of devices at a particular time. For example, if the protected asset is a web application, permissions may be a license agreement that prohibits the use of multiple client devices (or over a threshold number of client devices) at the same time under a same UID Record 151. Similarly, if the protected asset is an application installed to a client device, permissions may be a license agreement restricting use and installation of the application to a single client. Tracking client devices in this manner may also be used for security purposes, such as to detect when an unknown or new client device attempts to access an asset or if multiple unknown or new client devices attempt to access an asset, and whether or not those access attempts are successful. For example, which devices are authenticated by which credential provided by the mobile device 101 may be tracked and additional and/or multiple credentials may be requested for new and/or additional client devices attempting to access a same asset.

Some or all of the information stored within the UID repository 160 or representations thereof may be stored within the authorization repository 165 in UID Records 151. In some embodiments, the auth repository 165 is also configured to store data to perform one or more of the functions ascribed the UID repository 160. For example, rather than the relying party server 145 utilize the UID repository 160, it may instead utilize the auth repository 165. In such a configuration, the auth repository 165 may be configured to respond to queries to return, store, or otherwise provide data in a similar fashion as the UID repository 160. The data structure of the auth repository 165 may differ from that of the UID repository 160, but one or more queries received at the auth repository 165 from the relying party server 145 may be operable to return and store similar data from the data structure of the auth repository 165. Benefits of such configurations may reduce overhead for relying parties 145 as they can significantly offload authentication burden and reduce storage of user specific data in addition to increasing security. For example, in the previously described example utilizing tokens, the process may continue in much of the same fashion, but rather than the relying party server 145 determining whether the token-identifier combination corresponds to an authenticated client, the relying party server 145 need only query the auth repository 165 or the authentication server 155 with the token, identifier, and/or information on used for the identifier. In an example embodiment, the relying party server 145 may query the auth repository 165 with a token and an identifier determined for the client device that presented the token and the auth repository may provide an authentication result. In some example embodiments, the queries may flow through the authentication server 155 such that, for example, the authentication server 155 may process the information to determine the identifier (e.g., such that only the authentication server 155 houses the logic for the determination) and return a result.

Figure 2:
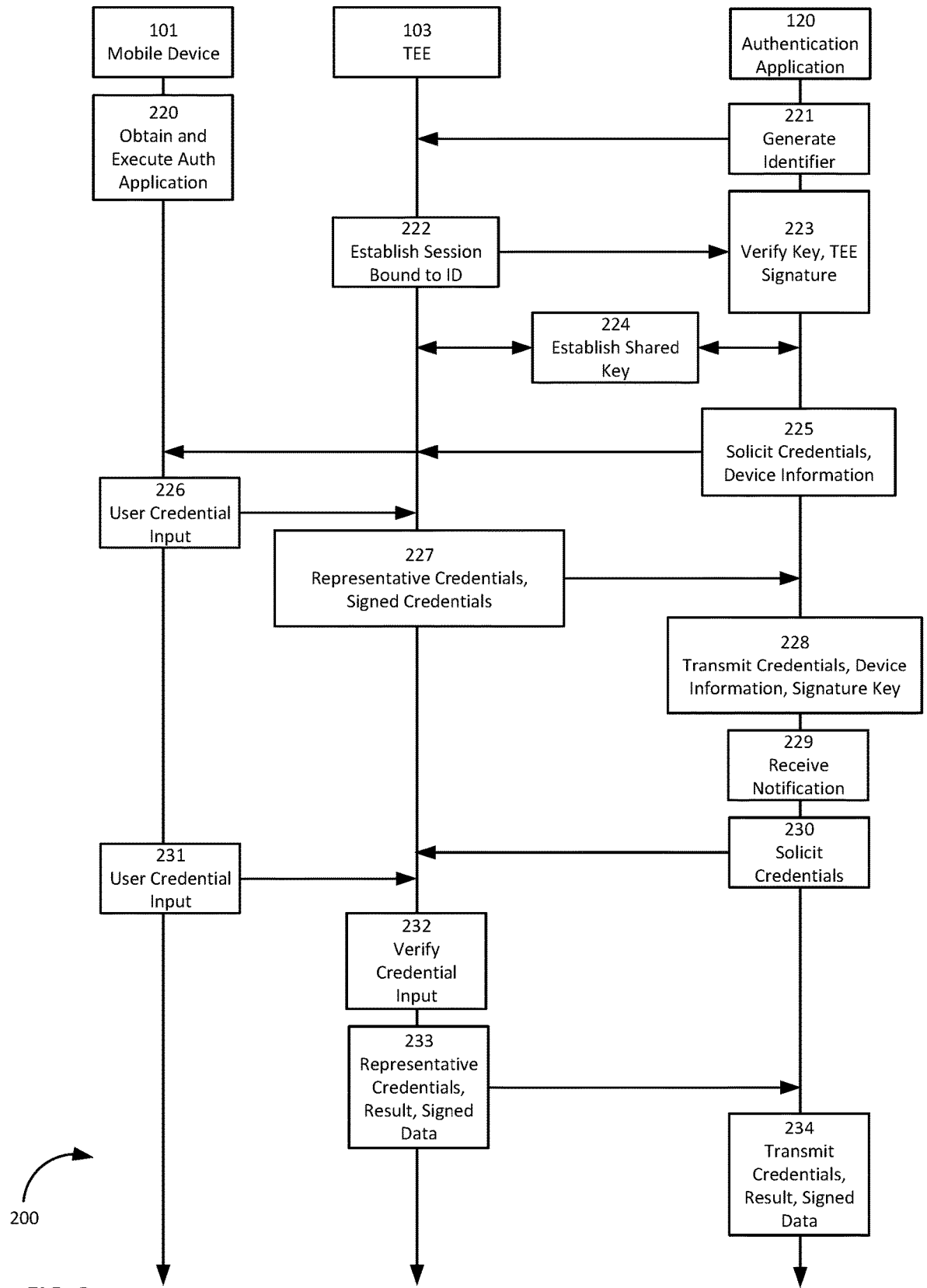
FIG. 2 is a diagram showing an example of a process for authentication of a user within the example computing environment, in accordance with some disclosed embodiments.

FIG. 2 is a diagram showing an example of a process 200 for authentication of a user. The process 200 may be executed within an example computing environment, such as the example computing environment 100 illustrated in FIG. 1. The process 200 of FIG. 2 illustrates operations performed by a device, such as a mobile device 101 including a trusted execution environment 103 and authentication application 120, according to at least one embodiment described herein. As described previously, example mobile devices 101 may include a trusted execution environment 103 and execute an authentication application 120. As such, the separation of the blocks 101, 103, 120 may be considered illustrative as each of the operations may be performed on a mobile device 101.

The process 200 may begin with the obtaining 220 of an authentication application on the mobile device 101. Examples of obtaining the authentication application on the mobile device may include a preloading of the authentication application on the mobile device 101 or downloading of the authentication application to the mobile device from an application repository. Further, step 220 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment 103 (TEE) of the mobile device. The TEE 103 may include a secure memory and co-processor not accessible by applications within the CEE.

The authentication application 120 may be configured to interface with the TEE 103 of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application 120 within the CEE, the authentication application 120 is configured to establish a secure session, e.g., a secure channel of communications, with the TEE 103. The secure session may be considered secure by way of encryption of data communicated between the authentication application 120 and the TEE 103.

Once executed, such as within the CEE, the authentication application 120 perform one or more operations in a registration process, which may correspond to steps 221-228. Starting with operation 221, the authentication application 120 may generate an identifier and pass the identifier to the TEE 103. For example, the authentication application 120 may pass the identifier to the TEE 103 in association with one or more requests for establishing a secure session.

The TEE 103 may also perform operations to establish a secure session. The TEE 103 may also bind a secure session to an identifier received from the authentication application. For example, the TEE 103 may generate one or more keys, and one or more of those keys may be bound to a received identifier. The TEE 103 may generate a public key and a private key of a key pair, which may be bound to the received identifier. Additionally, the TEE 103 may generate a shared key, which may be bound to the received identifier. The binding may be logical, such as by an association in memory, or one or more of those keys may be generated based on the identifier. For example, in response to a request for a secure session, the TEE 103 may generate a private and public key, and pass the public key to the authentication application 120 by which the application 120 may encrypt a generated identifier 221 to pass to the TEE 103. In turn, a shared key may be bound to or based on the generated identifier. Alternatively, the TEE 103 may sign the identifier or other data with a private signature key and pass the signed identifier or other data with the public signature key to the TEE 103 for verification. In either instance, a public key may be provided in a response to the authentication application 120, by which the authentication application may verify 223 that data was generated by the TEE.

Thus, the TEE 103 may establish 222 a session bound to the identifier generated by the authentication application 120 and output data for establishing the session to the authentication application. In addition, the TEE 103 may sign data corresponding to output data in the response, and provide a key (e.g., a public key) of the TEE 103, in association with the response. The signed data and the signature may be provided in a same response as a key or by one or more different responses.

The authentication application 120 receives responses from the TEE 103. The responses may include data, signed data, and/or a key for verifying signed data. The key may be a public key for verifying 223 a signature of the TEE 103 using a corresponding private key, such that the data may be verified as being generated by the TEE 103 based on the signed data and signature key. For example, a verification function may take as input the data, signed data, and signature key, and return a result indicating that the data corresponds to the signed data. In some embodiments, the data may be organized in a string for signing and verification. Example string values may correspond to data values or hashes of data values.

Once the authentication application 120 verifies that the TEE 103 generated data, the authentication application 120 and TEE 103 may establish a shared key 224. For example, the authentication application 120 may encrypt data (e.g., identifier or other data) corresponding to a shared key using a public key provided by the TEE 103. In turn, using a private key, the TEE 103 may decrypt the data to obtain the shared key. Alternatively, the process may occur in the other direction with the authentication application 120 providing a public key to the TEE 103, by which the TEE 103 can encrypt and return a shared key. The shared key may be utilized by the TEE 103 and the authentication application 120 to exchange data using symmetric encryption. In either instance, the shared key may be bound to an identifier generated by the authentication application 120.

In some embodiments, establishment 222 of the secure session further comprises an initialization of a count within the TEE 103. The TEE 103 may also provide a current count in responses to the TEE 103. The TEE 103 may respond to only those requests received from the authentication application 120 which increment the count. As such, the authentication application 120 may be configured to, in generating a request to the TEE 103, increment a current count last received from the TEE 103 in an immediately prior response to the generated request. Thus, in receiving a request from the authentication application 120, the TEE 103 may verify whether the incremented count was incremented in an appropriate manner (various examples of which are described within reference to FIG. 1). The TEE 103 may also verify whether the number of increments or a value of the count exceeds a threshold representative of a number of requests allowed for a given session. Upon determining the threshold has been reached, the TEE 103 may request the authentication application 120 refresh the sessions, such as by performing one or more of steps 221-224, which may include authentication of the use according to one or more credentials stored within the trusted execution environment 103.

With the shared key established, the authentication application 120 may solicit 225 credentials and device information from the TEE 103 and/or mobile device 101. Device information may include a device identifier solicited from the TEE 103 and/or mobile device 101 that is operable to receive a notification for authentication of the user of the mobile device. User input credentials 226 via the mobile device 101 may be obtained with the TEE 103. The TEE 103 may generate 227 representations of those credentials for transmission outside of the TEE without divulging actual credential values. The TEE 103 may sign output data corresponding to the representations and output the representations and the signed data. The TEE 103 may also output a public key corresponding to the private key utilized to generate signed data if different than a prior key provided to the authentication application 120.

The authentication application 120 receives data output from the TEE 103, which may include representations of credentials, signed data corresponding to those representations, and signature key for verifying signed data output by the TEE 103. As described above, the authentication application 120 may verify data was generated by the TEE 103 based on the signed data, key, and data. The authentication application 120 transmits 228 data, including the data output from the TEE 103, and device information of the mobile device 101, to a server to complete a registration. The data transmitted to the server many further include user account information (e.g., for a given relying party) to which the registration pertains. The server stores the information for later use to authenticate a user to access secure assets of the relying party.

After registration of the mobile device 101 by the authentication application 120, the authentication application may receive a notification 229 corresponding to an access attempt to access a secure asset of a relying party. The notification 229 may request solicitation of one or more user credential inputs, such as one or more of the different credentials established during the registration process. In response to the notification, the authentication 120 interfaces with the TEE 103 to solicit 230 the credentials requested by the notification.

The user may be prompted or otherwise request to input 231 one or more credentials. The input credentials are obtained within the TEE 103, and the TEE 103 may verify 232 credential input. Representations of the input credentials may be generated, or stored representations of the input credentials the TEE 103 verified 232 according to the input credentials may be output by the TEE 103. In some embodiments, the TEE 103 also provides a result of the verification. In some embodiments, the TEE 103 generates signed data corresponding to one or more of the output data and outputs the signed data. The signed data may also include inputs such as one or more timestamps or other identifying information describing when and/or what the signed data was generated for. For example, the signed data may take as input a representation of a credential and other information, such as a timestamp or other identification information for the notification. The other inputs may be included in the output data or selected from information also known to a server based on the last notification transmitted to the mobile device (which may select same other data in a verification of signed data). The data and signed data are provided to the authentication application 120, which transmits the data and signed data to a server for authentication. A signature key previously provided to the server in a registration process can be used to verify the signed data in accordance with the data (and optionally other data, such as notification information).

Figure 3:
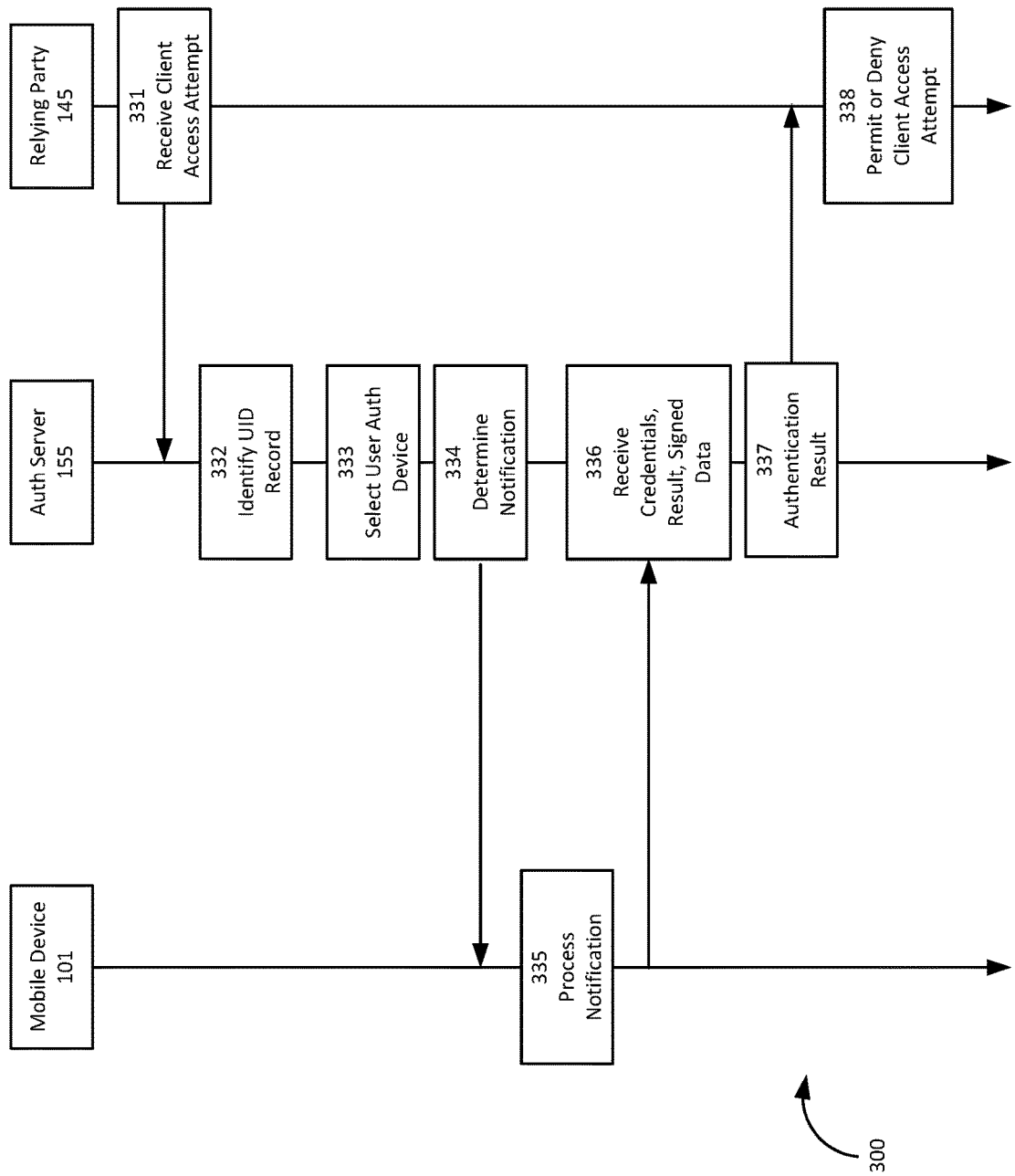
FIG. 3 is a diagram showing an example of a process for authentication of a device within the example computing environment, in accordance with some disclosed embodiments.

FIG. 3 is a diagram showing an example of a process 300 for authentication of a device with another device in an out-of-band authentication process. The process 300 may occur within an example computing environment, such as the example computing environment 100 illustrated in FIG. 1. The process 300 of FIG. 3 illustrates example operations performed by various devices, such as a mobile device 101 including a trusted execution environment 103, an authorization server 115, and a relying party server 145 according to at least one embodiment described herein.

As shown, the process 300 begins with an access attempt by a client device at the relying party 145. The access attempt may be to a secure asset of the relying party 145, such as an online resource accessible by client devices over a network. The relying party 145 may pass information about the access attempt to the authentication server 155. The information passed to the authentication server 155 may include information such as user account information and/or device information associated with the access attempt. For example, the relying party 145 may receive a user account identifier at block 331 and pass the user account identifier to the authentication server 155.

The authentication server 155, based on the user account identifier, may identify a UID Record 332, such as within a repository storing various UID Records corresponding to different users and/or accounts. The UID record may be associated with or otherwise include the user account identifier for identification by the authentication server 155 based on information about an access attempt by a client device. The UID record identified by the authentication server 155 may include records or a listing of one or more devices registered with the authentication server 155 for user authentication. The authentication server 155 may select 333 a device according to a device record stored for the different ones of the registered devices. In some embodiments, the authentication server 155 selects a device different from the device attempting to access the asset when multiple devices are registered with the authentication server 155 under the UID Record. The selected device may also be determined by the authentication server 155 to have a trusted execution environment, such as by the registration of the device using an authentication application in accordance with various steps described with reference to FIG. 2. The registration of the device and creation of the device record may further include the receipt of credential information for the user from the device.

With a device selected based on the device record, the authentication server 155 may determine 334 a notification for transmission to the device. The notification may be determined responsive to information stored in the device record. For example, the device record may include a device identifier applicable to transmit the notification to the selected device. Similarly, the device record may store information about the different credentials which a user of the device may provide to authenticate with the authorization server using that device. The notification 334 determined by the authentication server 155 may identify one or more of the different credentials the user must provide.

The device, which may be a mobile device 101 having a trusted execution environment and previously registered with the authentication server 155, may receive the notification from the authentication server 155. In turn, such as by various steps described with reference to FIG. 2, the mobile device 101 may process 335 the notification within the trusted execution environment. The result of the processing 335 by the mobile device 101 may include various data transmitted to the authentication server 155 for authentication of the user of the mobile device.

For example, the authentication server 155 may receive a response to the notification from the mobile device that includes data corresponding to representations of requested credentials input by the user and/or results of any verifications performed within the TEE. The response may also include signed data for verification of the data. For example, the authentication server 155 may utilize a public key for signature verification previously received from the mobile device 101 in a registration process to verify the data was generated by the mobile device having the corresponding private key. In turn, the authentication server 155 may also verify whether the data (e.g., determined to have originated from the mobile device based on the signature) matches stored data. For example, the authentication server 155 may determine whether a received representation of the credential matches a previously stored representation of the credential. Further, the authentication server 155 may determine whether the received data corresponds to a notification 334 requesting that data. For example, the received data and/or verification process (e.g., using signed data) may include a timestamp or other identifying information for a notification (e.g., the notification from step 334) such that authentication server 155 can determine that the response was generated for a specific notification that requested it.

Based on the processing of the data and signed data received from the mobile device 110 for the notification transmitted to the mobile device at step 334, the authentication server 155 determines an authentication result. For example, if the data can verified as originating from the mobile device 101 the data was requested from based on the signed data and a stored key for the verifying, which may include verification of whether the data is responsive to the particular notification from step 334, and the received representation of a credential matches the stored representation of the credential that was requested, the authentication server 155 determines the user successfully authenticated. Alternatively, the authentication server 155 may determine that the user did not successfully authenticate, such as if one of the verification steps fails due to a lack of a match, credential different than that requested, or unable to verify data based on signed data, etc. The authentication server 155 transmits an authentication result to the relying party, for example the authentication result may indicate that the user was authenticated and the access attempt by the client should be granted or indicate that the user was not authenticated and the access attempt should be denied. In some embodiments, the result includes identifying information for the client device attempting to access the relying party based on the information previously received from the relying party 145 in association with the access attempt such that the attempt is granted or denied only for that particular device.

The relying party 145 receives the authentication result for the access attempt of step 331 from the authentication server 155. In turn, the relying party permits or denies 338 the access attempt by the client device based, at least in part, on the result. Accordingly, the access attempt by the client device from step 331 may be authenticated, at least in part, by involvement of a different device including a trusted execution environment, such as mobile device 101, that is operable to authenticate a user permitted to access the secure asset by additional factors for increased security of the asset.

Figure 4:
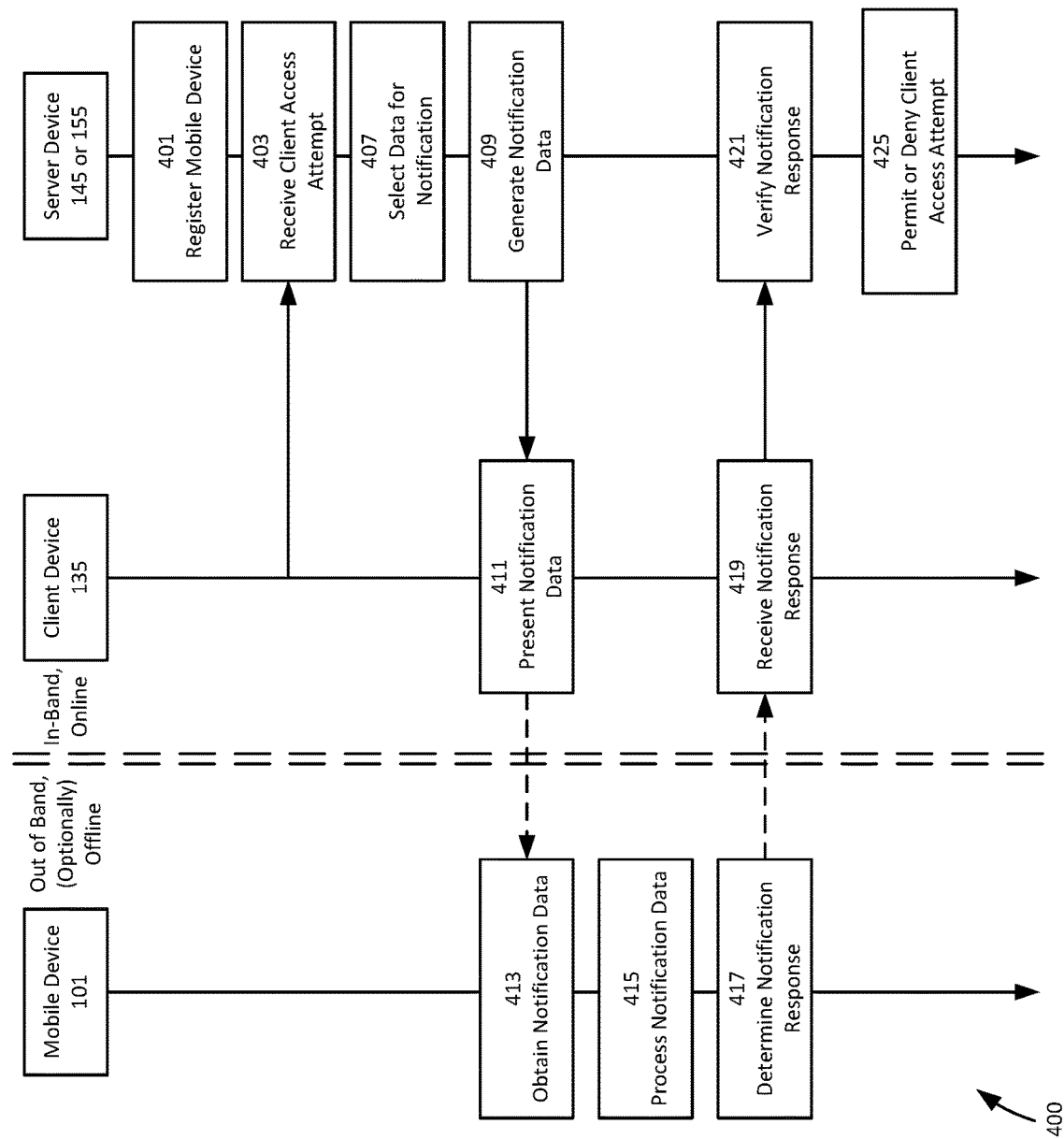
FIG. 4 is a diagram showing an example of a process for offline or physical presence confirmation in out-of-band notification processing for authentication of a device within the example computing environment, in accordance with some disclosed embodiments.

FIG. 4 is a diagram showing an example of a process 400 for offline or physical presence confirmation in out-of-band notification processing for authentication of a device. The process 400 may occur within an example computing environment, such as the example computing environment illustrated in FIG. 1. The process 400 of FIG. 4 illustrates example operations performed by various devices, such as a mobile device 101, client device 135, and a server device 145 or 155, according to at least one embodiment described herein.

As shown, the process 400 begins with registration 401 of a mobile device, like mobile device 101. The registration step 401 may include all or some of the operations described with reference to FIG. 2, or additional steps. In various example embodiments, registration step 401 may include the exchange of data like that described in reference to FIG. 2, but may also utilize a more limited or more extensive data set, such as depending on the use case. A relying party or other entity utilizing or implementing authentication processes described herein may utilize all or a subset of such authentication processes, some of which may be utilized in some cases but not others. Embodiments disclosed with reference to FIGS. 4-6 may implemented as standalone processes, in connection with processes of FIGS. 2-3, or selectively based on other factors, whether policy based or rule based. For example, access to a subset of online assets by a client device 135 may be predicated upon confirmation of physical presence while other online assets may be accessed without such confirmation. Additionally, offline out-of-band processes may be implemented instead of online processes in instances where network access is unavailable to a mobile device but not in instances where such access is available.

Figure 5:
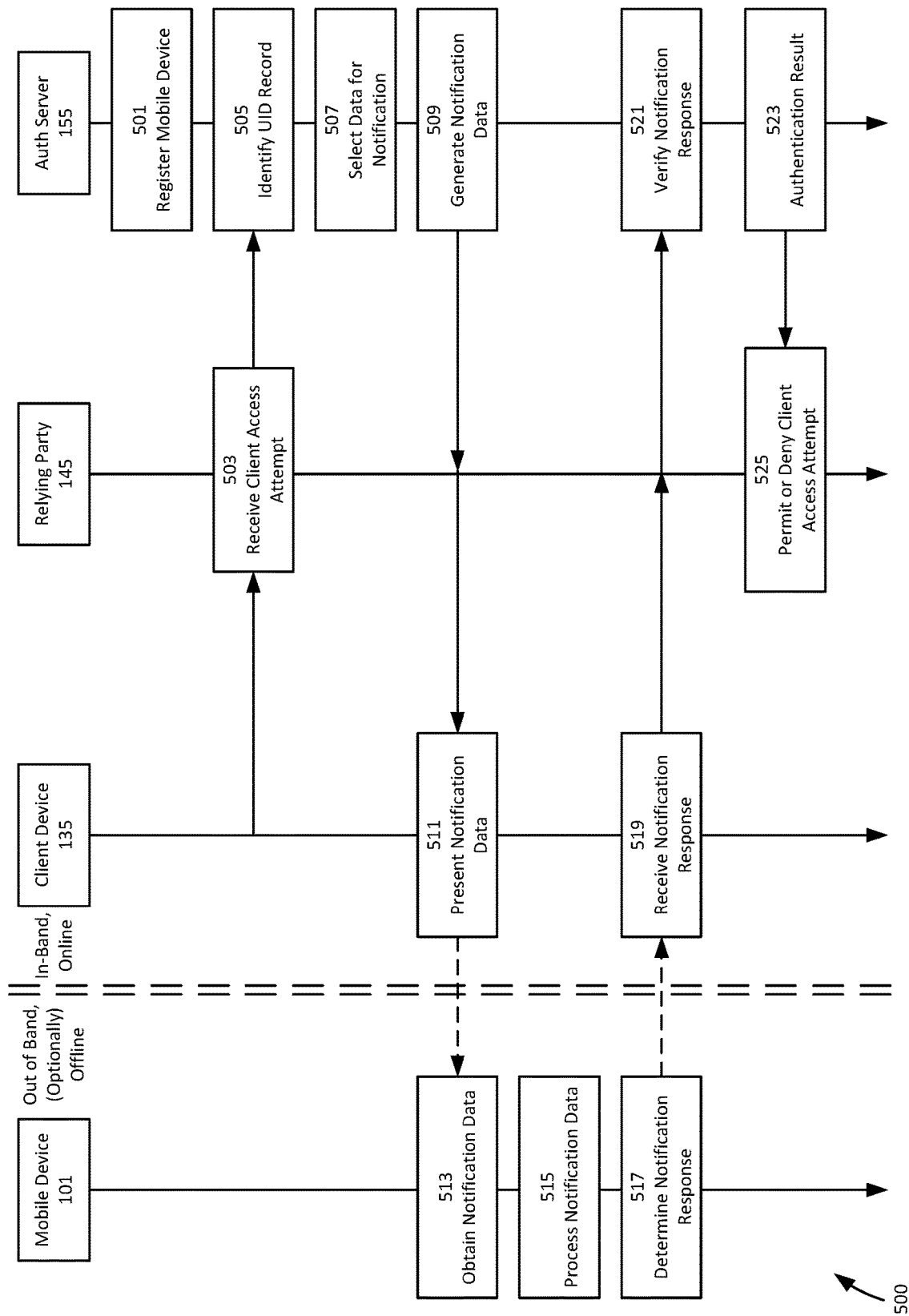
FIG. 5 is a diagram showing an example of a process for offline or physical presence confirmation in out-of-band notification processing for authentication of a device within the example computing environment, in accordance with some disclosed embodiments.
Figure 6:
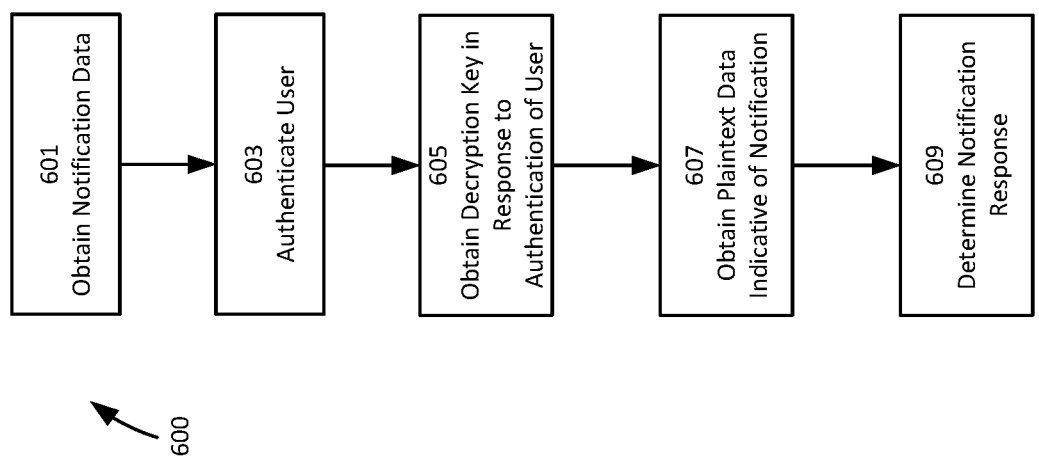
FIG. 6 is a flow-chart showing an example of a process for out-of-band notification processing for authentication of a device within the example computing environment, in accordance with some disclosed embodiments.

In the interest of brevity, the registration step 401 is not reiterated in detail, but rather examples of data utilized in the context of FIGS. 4-6 is discussed. As explained above, a registration step 401 for registering a mobile device for out-of-band authentication operations may include the transmission of various credentials to the server device. For example, the server device may receive a public key, representations of credentials, and signed data which may be verified based on the public key. Thus, the server device may verify data as being generated by the mobile device 101 of a user. In some cases, such operations may be based on data pushed to the mobile device 101, like a user certificate, or other token, like in a corporate environment. The service device may receive the aforementioned public key, or one or more other keys, which may be shared keys of an asymmetric key protocol, for which the mobile device 101 has access to the corresponding secret key. Asymmetric keys, like of a key pair, may include a secret/private key, like a first key, maintained in confidence by the owner, and a shared/public key, like a second key, which the owner may share with other entities for a variety of purposes. In some examples, the private key may be utilized to sign data, which may then be verified based on the public key, to verify that the owner generated the signed data. Alternatively, the public key may be utilized to encrypt data which the private key is operable to decrypt. In turn, the private key owner may present a result of the decryption (or a result based on the decryption) as a proof of knowledge of the private key, like an assertion of identity. While a shared key may be relatively suitably utilized in this latter manner, each party must retain the key in confidence. Accordingly, while embodiments are discussed with reference to asymmetric protocols involving key-pairs, like those including a public key and a private key, they should not be considered limited to only such protocols.

In step 401, the server device (e.g., which may include operations of one or more of a relying party server 145 or authentication server 155) may receive registration information corresponding to the mobile device 101, such as a public key, or other encryption key, by which the server device may encrypt data that can be decrypted by the mobile device 101, such as with a corresponding private key of a key-pair, or other decryption key. The encryption key and decryption key may be keys of a key-pair generated by an asymmetric encryption protocol, examples of which include a public key and a private key of key-pair in a public-key cryptography system and are referred to as such below for ease of explanation. The registration information may also include some or all of the information described with reference to FIG. 2, such as various other credentials, like representations of credentials maintained on the mobile device 101. As previously noted, a representation may be based on a credential (or a combination of credentials) by which a user may authenticate on their mobile device 101, like a deterministic value based on a credential that does not reveal the credential value.

The server device may store a record containing registration information received from the mobile device 101. The record may be associated with an identifier (e.g., of an identity) associated with the user, like an account (or multiple accounts) of the user. For example, the user may authenticate to the identity or the account with the server device and register the mobile device 101 with the server device for authenticating attempts by a client device 135 to access the account, such as via an authentication application. In various embodiments, the user may also create a user account during the registration process, such as via an authentication application. The mobile device 101 may execute the authentication application to perform one or more of the aforementioned operations, such as establishing a key-pair on the device, conveying the public key to the server device, establishing other credentials, and conveying representation of those other credentials to the server device. Thus, the server device may establish the record to associate an identifier (e.g., corresponding to a user account, identity, application, client device, or the like as described herein) with registration information received form the mobile device. In subsequent operations, the server device may receive an identifier from a client device, such as example client device 135, as in indication of which user is attempting to access a secure asset, and thus identify the record based on the identifier. In turn, the server device may generate notification data based on registration information received from the mobile device and included in or otherwise associated with the record for authentication operations. Specifically, the server device may generate notification data which may be processed by mobile device 101 after authentication of the user, such as to determine a notification response, which the server device may verify to determine an authentication result for the user.

The authentication application on the mobile device 101, or a policy conveyed to authentication application or mobile device, or configuration of a TEE on the mobile device, may govern access to utilize the private key retained on the mobile device. For example, access to the private key may be governed by authentication of the user in accordance with supplying one or more of the aforementioned credentials. In other words, the user may be required to authenticate on the mobile device 101 by supplying one or more of a PIN, password, faceprint, fingerprint, or other biometric or user identifying means (e.g., that comply with security requirements of a policy) prior to being permitted to utilize the private key. Utilization of the private key may also be governed based on other factors, such as one or more rules, like an assertion of identity by the server device (e.g., to prevent the private key from being utilized for operations other than those pertaining to authentication requests). In some embodiments, those rules may be enforced by the TEE or other secure component of the mobile device 101, such as by restricting utilization of the private key in accordance with rules which may be stored or verified (e.g., cryptographically, such as by cryptographic signature or hash) by the TEE (e.g., based on data stored securely within the TEE). Accordingly, utilization of the private key, in some embodiments, may be restricted to the TEE or other secure component of the mobile device 101 such that a CEE of the mobile device cannot access the private key (e.g., in plaintext) or otherwise utilized the private key for unauthorized operations. In other words, divulgence of values of the private key may be restricted, thus affording a high degree of security. Moreover, access restrictions based on one or more rules, which may be based on proof of identify by the server device, may prevent unauthorized use of the private key.

In step 403, an access attempt may be received by the server device from a client device. In some embodiments, the access attempt may include an indication that the user desires to authenticate via an offline out-of-band process. For example, an interface of an application on the client device 135, login prompt on the client device 135, or an interface of a website or web application or other interface may include in association with a login interface, or otherwise for selection by the user, an option to indicate whether the user desires to authenticate via an offline out-of-band authentication process. As shown in FIG. 4, the mobile device 101 may be offline, e.g., does not have access (or is not otherwise connected to) a network by which the user may authenticate via an online out-of-band process (e.g., as described with reference to FIG. 3). In some example embodiments, selection of such an option may prompt the user to select an indication of device by which the user wishes to authenticate under the offline process, or to provide an indication of the device (e.g., information about the device, like a phone number for a mobile device or other information about the device supplied during the registration process), such as in cases where multiple devices applicable to authenticate the user offline have been registered in association with a record of the user. In some embodiments, the server device may determine whether to request authentication of the user via offline out-of-band authentication process, or to implement one or more aspects of the process for indication of physical presence, as explained in detail below in relation to step 407.

The access attempt 403 may be to a secure asset to which access thereto by the client device 135 is governed by the server device, such as an online resource accessible by client devices from the server device over a network. The server device may receive information from the client device 135 in association with the access attempt, like an identifier, such as one of the above noted identifiers by which a record associated with registration information corresponding to a mobile device of a user may be obtained. Thus, for example, information received by the service device in association with the access attempt may include information such as user account information and/or device information associated with the access attempt. For example, the server device may receive a user account identifier, or identifying information about the client device 135, or other identifying information described herein by which a record may be identified. In some cases, a combination of such identifying information may be received. In some embodiments, an identifier-password combination may be received and authenticated prior to access of the record corresponding to the identifier. In some example embodiments, an identifier of a mobile device may be received, or in combination with other identifiers, such as where the user has registered multiple such devices. In some example embodiments, an identifier of a mobile device (e.g., like a mobile telephone number) may be received in lieu of other identifiers. Embodiments may support receipt of a single unique identifier, like a username, phone number of a mobile device, email, or the like, but may utilize multiple such identifiers or identifier-password combination (where the password may be a PIN, like a 4, 6, or 8 digit PIN), to mitigate ability of a nefarious party (e.g., by DDOS type attack) to cause record lookup for inauthentic access attempts. Such attempts may be thwarted by establishment of information corresponding to known client devices, or multiple identifier requirements, like a username in combination with a PIN that impose minimal friction (and oftentimes even less than traditional username-password schemes) on users while increasing difficulty of a nefarious party to supply a valid set of inputs by which a record may be identified (even if identification of such in does not yield unauthorized access).

In some examples, the server device may store UID Records corresponding to different users and/or accounts which may be associated with one or more other records of devices which the user utilizes to access secure assets or has registered for authentication processes. Based on an identifier received in association with the access attempt by the client device 135, like a user account identifier, the server device may identify a UID Record, such as within a repository storing various UID Records corresponding to different users and/or accounts. The UID record may be associated with or otherwise include the user account identifier for identification by the server device based on information about an access attempt by a client device. The UID record identified by the server device may include records or a listing of one or more devices registered with the server device for user authentication. Accordingly, the server device may select a record comprising information corresponding to a device registered by the user and associated with the UID record corresponding to the identity or the account of the user. For example, the server device may select from device records stored for the different ones of the registered devices, such as for a mobile device 101 registered by the user in step 401. Thus, in response to an access attempt 402 by client device 135, the server device may obtain information about a device different from the device attempting to access a secure asset for authentication of the user. In instances where multiple mobile devices are registered with the server device, a response to the client device 135 prompting selection of one of the devices, or information indicative of one of the devices may be received in association with the access attempt. If only one such mobile device or an indication of a first preferred such mobile device is indicated, the server device may automatically select corresponding device information. The selected device may be selected based on a determination by the server device as having a trusted execution environment, such as based on information received during the registration of the device using an authentication application in accordance with various steps described with reference to FIG. 2 and step 401. The registration of the device and creation of the device record may further include the receipt of credential information for the user from the device and a public key as explained above, which may be identified by the server device based on information received in association with the access attempt 403 by the client device 135.

In step 407, the server device may select data for generating a notification corresponding to the access attempt. For example, the server device may select device-specific data corresponding to a mobile device (e.g., mobile device 101 of the user) for generating notification data corresponding to the access attempt. The mobile device 101 may be selected based on its registration in association the user of the client device 135 as indicated by one or more identifiers in association with the access attempt, such as for identification of a record having associated device information corresponding to the registered mobile device. In some examples, a UID record may be identified and an associated device record corresponding to the registered mobile device may be access to selected data for generating a notification. In some embodiments, the server device may receive an indication that the mobile device 101 is not available for participation in an online out-of-band authentication process (e.g., like that described with reference to FIG. 3). For example, the user of the client device 135 may indicate by an option to (e.g., request to) authenticate via offline out-of-band authentication in association with a client access attempt 403. The server device may optionally receive an indication of the mobile device 101 which the user desires to utilize for the offline out-of-band authentication process, such as where multiple such devices are registered for utilization by the user, or the server device may select the mobile device 101 (e.g., indicated as a preferred device for offline authentication or as being the only suitable device being registered).

In some embodiments, the server device may attempt an online authentication process, such as via transmission of a push notification to the mobile device, prior to permitting an offline authentication process. After detecting a failure of delivery of the notification, or failure of a response to the notification (e.g., after a threshold period of time, like 30-90 seconds or 1-3 minutes, the server device may determine to authenticate the user via offline authentication. Embodiments of the server device may transmit a response to the client device 135 requesting user confirmation to authenticate offline, optionally providing a selection of registered mobile devices (or other devices) having been registered and by which the user my authenticate via an offline out-of-band authentication process. In turn, the server device may select data for generating a notification corresponding to the access attempt based on a selection of the mobile device 101 by the user of the client device 135. Some embodiments of an authentication application may implement a heartbeat signaling mechanism to indicate availability for online authentication process to the server device. For example, the authentication application may transmit a heartbeat, like a request, or a response, such as over a network to an API of the server device at periodic intervals (e.g., every 2, 5, 10 minutes or other value) to indicate network availability. Heartbeats received from the mobile device 101 may be logged by the server device and the log consulted to determine when (e.g., based on timestamp relative to server device time) the last heartbeat signal was received. In some embodiments, the server device may determine to authenticate the user of the client device 135 via offline out-of-band authentication in response to detecting a lack of a heartbeat signal within the log within a threshold period of time (e.g., corresponding to the heartbeat interval) but not exceeding another threshold period of time (e.g., like 5-24 hours or 1-2 days). In some embodiments, a policy governing the asset being requested may include one or more rules defining whether a user may request via the client device 135 to authenticate offline or based on what factors the server device may permit the user to authenticate offline. Other rules of a policy may specify permitted devices and the like by which users may authenticate offline, how many times a user may authenticate offline, which client devices the user may authenticate offline, and the like.

In some embodiments, the server device may, such as based on a policy governing the asset the client device 135 is attempting to access, whether to obtain confirmation of physical presence of the user at the client device. In such cases, the server device may implement one or more of the below described operations in connection with, or instead of, one or more aspects of the online authentication process described with reference to FIG. 3. Here, as the mobile device 101 may be determined to have network access (e.g., as described above) or required to have network access (e.g., forcing both aspects of the process of FIG. 3 and those described below), some additional operations, referred to below in association with confirmation of physical presence, may include one or more operations of the mobile device 101 that utilize a network connection (e.g., in contrast to the offline process). The principles of operation of physical confirmation, while permitting exchange of data by the mobile device 101 and the server device, may rely on all (or a subset) of operations consistent with offline authentication.

As noted above, in step 407 the server device may select data for generating a notification corresponding to access attempt 403 by the client device 135, and that selected data may be device-specific data corresponding to a registered mobile device (e.g., mobile device 101 of the user). The device-specific data corresponding to the mobile device 101 may be stored in association with a record of an identity of the user, like an account, or UID record, of the user that is identified based on information (e.g., like an identifier associated with the record) received by the server device from the client device 135 in association with the access attempt. The device-specific data may include a public key corresponding to a private key maintained by the mobile device 101 (applicants note that the mobile device 101 need not maintain the private key in plaintext to maintain the private key, or in an encrypted form for which the mobile device retains a decryption key, but rather the mobile device may store an encrypted value by which the private key may be obtained (e.g., to process data) based on other data, like a PIN or password or other user suppliable credential values, which may constitute a decryption key or basis for one). The device-specific data may also include one or more representations of credentials or other data maintained on the mobile device 101.

In step 409, the server device may generate notification data for transmission to the client device 135 for offline authentication by the mobile device or confirmation of physical presence. For example, the server device may generate a random string, like an alphanumeric string, which may have a configurable number of a characters, like 4, 6, or 8 or other number, and encrypt the string by the public key associated with the mobile device 101 (e.g., the public key received during the registration process). As the string is encrypted by a public key of a key-pair for which a corresponding private key of that key-pair is operable to decrypt that data, and that private key is maintained on the mobile device 101 (e.g., in a secure fashion) having previously registered with the server device, the user is required to utilize that mobile device to determine a valid notification response (e.g., based on decryption of the string). The server device may temporarily store the string for later verification, such as upon receipt of a notification response. In some examples, a selection of values from the string are stored in accordance with a schema, and the mobile device 101 may similarly perform a selection of values after decryption of the string in accordance with the schema (e.g., to reduce friction on users where long strings (e.g., 8, 16, or more characters) are utilized). Embodiments are not so limited, however. For example, the server device may cryptographically hash (e.g., via a given schema, like SHA 256 or other hashing function) the string and store the hash value, or a selection of values from the hash (e.g., in accordance with a schema). In another example, the server device may concatenate the string with one or more other values, like one or more representations or other data maintained on the client device (e.g., in accordance with a given schema), and cryptographically hash that data and store a corresponding hash value or a selection of values from the hash (e.g., in accordance with a schema). In such examples, the mobile device may decrypt the string, generate a cryptographic hash (e.g., based on the same data, such as the string and optionally one or more other values), and perform a selection of values from the hash in accordance with the schema(s) by which the server device performed the operations. Thus, for example, verification of a notification response may be performed based on a match of the selection of values from a cryptographic hash generated by the mobile device to the selection of values from a cryptographic hash generated by the server device. The length of the string or number of values selected from a hash for return in a notification response may be configurable. In various example embodiments, the notification response may have a length of 4 characters (e.g., 4 values selected from the hash), but may be 6, 8 or another amount.

Generated notification data may include other information in addition to an encrypted string. For example, the notification data may indicate information about a schema by which a notification response is to be generated. The schema information may indicate an order for concatenating other data with the string to generate a hash or otherwise indicate how to generate a hash (or set of values) for determining a notification response. In some cases, the schema information may also be encrypted (e.g., by the public key). The notification data may indicate information about which credentials the user is to authenticate on, such as to utilize the private key, or to process in accordance with a schema for determining a notification response (or both). In some cases, the mobile device 101 may store schema information, like a set of rules, for generating a notification response, which may be received in association with registration, like in a policy, or by execution of the authentication application. Stored schema information may be updated over time to that consistent with the schema implemented by the server device. In such examples, information about other data to concatenate with the string may be communicated by a command string, like a vector, which may indicate different credentials, an order thereof, or other information by which the mobile device may generate a notification response. Such information may also be encrypted (e.g., by the public key). In various example embodiments, however, it may be desirable not to encrypt a portion of data by the public key, such as a portion of data indicating which credentials the user is to authenticate on with the mobile device (e.g., to authenticate the user by one or more credential types to authorize utilization of the private key to decrypt an encrypted portion of the notification data).

In some embodiments, the server device may generate encoded notification data. For example, the server device may generate an optical code, such as a QR code, or other optical code, encoding notification data like that described above. Other information may also be included in the optical code, such an identifier associated with an authentication application, which a mobile device may read to prompt the launch of the authentication application to process the optical code. Further, in some embodiments, the optical code may include a signed data, like a signed certificate, or other data by which the identity of the entity that generated the optical code may be verified, and the mobile device may store corresponding data by which the verification may be performed (e.g., like a public key of the server and the certificate or data that is signed). The data signed by the public server may be included in the optical code or previously stored by the mobile device and verified by signature verification based on a public key of the server device received by the client device during registration. Thus, for example, processing of the optical code (e.g., decryption of the encrypted portion) may be dependent on verification of the server device, in addition to authentication of user. Accordingly, a robust authentication protocol may be enforced on participant registered devices even when a device lacks a data connection by which notifications on a notification service are received. Thus, similar to the online authentication process, the server device may request user authentication on the mobile device by a given credential or set of credentials, even where the mobile device does not have an active network connection, and authenticity of the request may be verified prior to processing. The server may generate encoded notification in other ways, such as for transmission via NFC device or Bluetooth connection or other means by which a mobile device 101 may obtain the notification data from the client device 135 (e.g., encoding may be dependent on the capabilities of the client device). The server device may transmit notification data, such as a QR code or instructions for presenting a QR code, or other encoding of notification data to the client device. For example, the server device may return generated notification data to the client device 135 in response to the received access attempt 403. Examples of which may be a HTML response or redirect to a webpage or URL or API by which the client device 135 receives or obtained the notification data. Similarly, one or more fields, like one or more user interface elements for receipt of user input may be conveyed in association with the notification data. The one or more interface elements may be configured to receive user input like a set of characters or a respective character via the client device 135 corresponding a notification response. Other means for input of a notification response are also contemplated, like a notification response encoded in an optical code which may be captured by the client device from a screen of the mobile device, or NFC or Bluetooth signal which may be obtained by the client device from the mobile device.

In step 411, the client device 135 presents notification data received or otherwise obtained from the server device. For example, the client device 135 may display a received optical code, render an optical code based on received instructions, or otherwise present notification data. In some cases, the client device 135 may present instructions by which the user may utilize the mobile device 101 to obtain the notification data, such as via NFC, Bluetooth, or other signal. In the example of the optical code, like a QR code, the client device 135 may present the QR code coincident with instructions to the user to capture or scan the code with a sensor, like an image sensor, of their mobile device 101. The client device 135 may present instructions for return of the notification response, such as return via one or more interface elements, capture via image sensor, or receipt via signal, depending on the embodiment.

In step 413, the user may utilize the mobile device 101 to obtain notification data from the client device 135. For example, the user may open a camera application to utilize an image sensor or other optical sensor of the mobile device, or authentication application which may interface with such sensors, and orient the sensor to capture or read data, like an optical code, from a screen of the client device 135 on which the optical code is presented. Other sensors or communication means, like a NFC sensor, or Bluetooth chip may be activated to obtain notification data from the client device 135 depending on the embodiment. In each case, obtaining of the notification data by the mobile device 101 may be dependent on relative proximity of the mobile device 101 to the client device 135, like within inches, a few feet, or a few yards. Thus, obtaining of the notification data by the client device 101 may be indicative of physical presence of the user of the mobile device within physical proximity of the client device 135 requesting access to the secured asset. Moreover, in each case, the notification data may be obtained by the mobile device 101 from the client device 135 absent a requirement of active network access (e.g., like a data enabled connection to the internet) on the mobile device.

In step 415, the mobile device 101 may process notification data. As noted above, the notification data may include an identifier corresponding to the authentication application, which may prompt the launch of the authentication application. In other examples, the notification data may be obtained by the authentication application such as by the user launching the authentication application to obtain the notification data. The authentication application may decode an optical code or signal to obtain notification data for processing. The notification data, as described above, may include an encrypted portion of data and an unencrypted portion of data. The authentication application may process an unencrypted portion of data indicating one or more credentials by which the user is to authenticate and effectuate one or more operations in the response to the data, such as by prompting the user to authenticate with the mobile device by one or more corresponding credential inputs. The mobile device 101 may authenticate user input corresponding to the requested credentials, such as based on established credential values corresponding to the user. For example, the mobile device 101 may verify that user input corresponding to a requested credential matches an established credential value to authenticate the user. In some embodiments, upon authentication of the user, the mobile device 101 may permit utilization of a private key maintained on the mobile device to process the encrypted portion of the notification data, such as by decrypting that data based on the private key.

In some embodiments, the authentication application may process an unencrypted portion of data including identifying information corresponding to the server device that generated the code and effectuate one or more operations in response to the data, such as by verification of the authenticity of the identifying information. For example, a signature verification function may be executed based on a signature (e.g., included as identifying information), data (either included in the identifying information or otherwise stored or obtainable by the mobile device) that was signed (e.g., by a private key) to generate the signature, and a public key associated with the server device (e.g., previously stored on the mobile device) utilizing the private key. In some embodiments, upon verification of the server device, the mobile device 101 may permit utilization of a private key maintained on the mobile device to process the encrypted portion of the notification data, such as by decrypting that data based on the private key.

In some embodiments, the private key may be protected by a passphrase, or one or more credential values, such as by being maintained on the mobile device in an encrypted form based on the passphrase or one or more credentials values. Receipt of the passphrase or one or more credentials values, either as a user authentication step, or an additional user authentication step to those discussed above, may be operable to, or processed by the mobile device, to obtain an encryption key by which the private key may be decrypted for utilization by the mobile device. In turn, upon receipt of the passphrase or one or more credentials values by which a decryption key operable to decrypt a private key may be obtained, the mobile device 101 may decrypt the encrypted private key to permit utilization of the private key maintained on the mobile device to process the encrypted portion of the notification data, such as by decrypting that data based on the private key.

In step 417, the mobile device 101 may determine a notification response. For example, the mobile device 101 may determine a notification response based on the notification data after the decryption of that data based on the private key. In some embodiments, for example, the notification data may include a string of values, like a string of random values, by which successful decryption of encrypted notification data may be verified by the server device. Determination of the notification response may include determining the string of values, or a subset of the values selected based on a schema, which may be conveyed back to the client device 135 for return to the server device. In some embodiments, the mobile device 101 may determine the notification response by hashing the string of values and selecting a subset of the values of the hash in accordance with the schema, which may be conveyed back to the client device 135 for return to the server device. In some embodiments, the mobile device 101 may concatenate the string and one or more other values, such as in accordance with a schema, and obtain a hash of the result from which a subset of the values may be selected. Which other values are selected for concatenation, like one or more representation of credentials, or other values, and the order of concatenation with the string, may be specified by a schema received in the notification data or stored on the mobile device, or selected in accordance with the schema and based on indications of which values to include and their order (e.g., by the notification data). Regardless of the specific implementation, a notification response based on successful decryption of the encrypted portion of notification data by the private key may be determined, and the notification response may include a selection of values for conveyance to the client device 135, like a selection of 4, 6, 8 or other number of values based on the string or a hash determined based at least in part on the string. As noted above, a schema, in some embodiments, may specify which values (e.g., like positions thereof within a string or hash) to select to form a subset of values for the notification response, and the mobile device 101 may perform such a selection from a string or hash having a greater number of values to generate the notification response for conveyance to the client device 135, such as where a user inputs the subset of values on the client device. For example, the mobile device 101 may display within a user interface of the device the determined set of values of the notification response which the user may view and then input (e.g., within a user interface) to the client device, such as via user input means of the client device for selection of values corresponding to those displayed on the screen of the mobile device. The notification response may be conveyed to the client device 135 in other ways, such as via generation of an optical code, or transmission of the notification response over NFC or Bluetooth or other means for receipt by the client device 135.

In some embodiments, such as those for confirming physical presence, obtaining of the notification data by the mobile device 101 (e.g., from the client device 135) may afford sufficient indication of confirmation of physical user access to both devices. In such cases, as the mobile device 101 may comprise (or be required to have) an available network connection, the mobile device may convey a determined notification response to the server device, which may include signing the notification response or other data by the private key (or another key), optionally in association with data like that described with reference to FIG. 3 in response to processing of a notification received on a notification service, and transmitting such data in response to the notification to the server device. However, the notification response for physical access may be returned in the manner described with reference to offline authentication, such as by conveyance to the client device 135, and such operations may be performed in parallel to (or instead of) operation described with reference to FIG. 3 for processing of notifications received by the mobile device 101 on a notification service.

In step 419, the client device 135 may receive a notification response, such as via the mobile device 101, or via user input, which is then transmitted to the server device for verification. For example, the client device 135 may receive user input values within one or more interface elements associated with the presentation of notification data 411 and transmit the values input by the user to the server device for verification.

In step 421, the server device may receive the notification response, such as from the client device 135. Thus, network communications need not be established by the server device to the mobile device in at least some embodiments. In some cases, however, such as in some embodiments of physical access confirmation, the server device may receive the notification response from the mobile device 101 (e.g., over a network). In either instance, the service device may verify received notification response information based on separately determined information indicative of a valid notification response. For example, the server device may generate, in accordance with a schema similarly implemented by the mobile device to determine the notification response, a set of values by which a corresponding set of values of the notification response may be verified. Thus, for example, the server device may determine whether the received notification response matches an expected valid notification response. Embodiments may also determine whether a client access attempt for which a notification response is received in active, such as based on a threshold of time permitted from the access attempt to receipt of the notification response for validation. Other example policy measures or authentication steps may also be implemented depending on the embodiment.

In step 425, the server device permits or denies the access attempt by the client device based, at least in part, on the result of verification of the received notification response. Accordingly, the access attempt by the client device from step 403 may be authenticated, at least in part, by involvement of a different device for out-of-band authentication, regardless of whether that device has network access, such as mobile device 101 that is operable to authenticate a user permitted to access the secure asset by additional factors for increased security of the asset. Moreover, such techniques applicable in offline out-of-band authentication by involvement of that different device may be utilized for confirmation of physical access (e.g., physical proximity) of the user to both devices.

FIG. 5 is a diagram showing an example of a process 500 for offline or physical presence confirmation in out-of-band notification processing for authentication of a device. The process 500 may occur within an example computing environment, such as the example computing environment illustrated in FIG. 1. The process 500 of FIG. 5 illustrates example operations performed by various devices, such as a mobile device 101, client device 135, a relying party server 145, and an authentication server 155, according to at least one embodiment described herein. Over the example embodiment of FIG. 4, FIG. 5 illustrates the relying party 145 and authentication server 155 as separate entities. While not all steps of FIG. 4 that are relevant to the process of FIG. 5 are reiterated in detail for brevity, aspects of steps discussed with reference to FIG. 4 may be incorporated in similar steps or distributed among operations of the additional entities shown in FIG. 5 unless otherwise noted.

As shown, the process 500 begins with registration 501 of a mobile device, like mobile device 101. The registration step 501 may include all or some of the operations described with reference to FIG. 2, or FIG. 4, or additional steps. For example, in some example, registration may correspond to a specific relying party, like relying party 145, which relies on the authentication server 155 for at least some authentication operations. In various example embodiments, registration step 501 may include the exchange of data like that described in reference to FIG. 2, but may also utilize a more limited or more extensive data set, such as depending on the use case, and may be consistent with embodiments discussed with reference to FIG. 4. For example, a relying party or other entity utilizing authentication processes provided by an authentication server 155 as described herein may utilize all or a subset of such authentication processes, some of which may be utilized in some cases but not others. Embodiments disclosed with reference to FIGS. 4-6 may implemented as standalone processes, in connection with processes of FIGS. 2-3, or selectively based on other factors, whether policy based or rule based. For example, access to a subset of online assets associated with relying party 145 by a client device 135 may be predicated upon confirmation of physical presence while other online assets may be accessed without such confirmation. Additionally, offline out-of-band processes may be implemented instead of online processes in instances where network access is unavailable to a mobile device but not in instances where such access is available.

In the interest of brevity, the registration step 501 is not reiterated in detail, but rather examples of data utilized in the context of FIGS. 4-6 is discussed. Step 501 for registering a mobile device for out-of-band authentication operations may include the transmission of various credentials to the authentication server 155 (one or more of which may be passed to the authentication server 155 by the relying party server 145). The authentication server 155 may receive and store data corresponding to the mobile device 101 (and user of the mobile device), such as a public key, representations of credentials, and signed data which may be verified based on the public key. The mobile device 101 may maintain credential values by which representations are generated and a private key of a key-pair including the public key received by the authentication server 155.

Thus, in step 501, authentication server 155 may receive registration information corresponding to the mobile device 101, such as a public key, or other encryption key, by which the authentication server may encrypt data that can be decrypted by the mobile device 101, such as with a corresponding private key of a key-pair, or other decryption key. The encryption key and decryption key may be keys of a key-pair generated by an asymmetric encryption protocol, examples of which include a public key and a private key of key-pair in a public-key cryptography system and are referred to as such below for ease of explanation. The registration information may also include some or all of the information described with reference to FIG. 2 or FIG. 4, such as various other credentials, like representations of credentials maintained on the mobile device 101. As previously noted, a representation may be based on a credential (or a combination of credentials) by which a user may authenticate on their mobile device 101, like a deterministic value based on a credential that does not reveal the credential value.

The authentication server 155 may store a record, like a UID record, containing registration information received from the mobile device 101. The UID record may be associated with an identifier (e.g., like of an identity) associated with the user, like an account of the user. For example, the user may authenticate to the identity or the account with the relying party server 145 and then register the mobile device 101 with the authentication server 155 for authenticating attempts by a client device 135 to access the account or other information under or utilizing the identity or account, such as via an authentication application. In various embodiments, the user may also create a user account for utilization with the relying party 145 during the registration process, such as via an authentication application, or otherwise with the relying party or authentication server. The mobile device 101 may execute the authentication application to perform one or more of the aforementioned operations, such as establishing a key-pair on the device, conveying the public key to the server device, establishing other credentials, and conveying representation of those other credentials to authentication server 155. Thus, the authentication server 155 may establish the UID record to associate an identifier (e.g., corresponding to a user account, identity, application, client device, or the like as described herein) with registration information received form the mobile device, which may be stored in a device record of the mobile device and associated with the UID record.

In step 503, an access attempt may be received by the relying party server 145 from a client device. In some embodiments, the access attempt may include an indication that the user desires to authenticate via an offline out-of-band process utilizing a device the user registered for authentication operations in which the relying party relies on the authentication server 155. As shown in FIG. 5, the mobile device 101 may be offline, e.g., does not have access (or is not otherwise connected to) a network by which the user may authenticate via an online out-of-band process (e.g., as described with reference to FIG. 3). For example, an interface of an application on the client device 135, login prompt on the client device 135, or an interface of a website or web application or other interface provided to the client device or generated by the relying party server 145 may include in association with a login interface, or otherwise for selection by the user, an option to indicate whether the user desires to authenticate via an offline out-of-band authentication process. In some example embodiments, selection of such an option may prompt the user to select an indication of device by which the user wishes to authenticate under the offline process, or to provide an indication of the device (e.g., information about the device, like a phone number for a mobile device or other information about the device supplied during the registration process), such as in cases where multiple devices applicable to authenticate the user offline have been registered in association with a record of the user, or to mitigate abuse.

The access attempt 503 may be to a secure asset available from the relying party 145 to which access thereto by the client device 135 (or other client devices) is governed based on an authentication results received from the authentication server 155. The secure asset may be an online resource, like a web site, web application, or web service hosted by the relying party 145 and accessible by authorized client devices, such as under an identity or account of an authorized user, application, or the like. Thus, example secure assets can include various online resources made available by various different relying parties 145 to client devices and accessible by such client device over a network. The relying party 145 may receive information from the client device 135 in association with the access attempt, like an identifier, such as one of the above noted identifiers. The relying party 145 may convert the identifier, such as by cryptographic hash, or otherwise, to a format expected by the authentication server 155 for identification of UID records corresponding to users of the relying party server 145. The relying party 145 may transmit information, such as an identifier by which a UID record may be identified, and other identifying information about the client device 135 that may be received in association with the access attempt to the authentication server 155. In some example, an indication of a user selection requesting offline authentication for the access attempt may be conveyed to the authentication server 155. In some examples, the relying party 145 may request confirmation of physical access in association with the client access attempt, although such determinations to confirm physical access may also be implemented by the authentication server based on a policy associated with the relying party.

In step 505, the authentication server 155 may receive information about an access attempt of a client device 135 from the relying party 145 and identify a UID record for authentication operations upon which an authentication result for the access attempt returned to the relying party are based. The received information may include an identifier by which the authentication server 155 identifies a UID record. The received information may indicate a request by the user of the client device 135 to authenticate via an offline out-of-band authentication process. The received information may indicate a request by the relying party 145 to confirm physical presence for determination of an authentication result. In some cases, such as based on policy governing the requested asset or relying party, or client device, or user associated with the UID record, the authentication server 155 may determine to confirm physical presence for determination of an authentication result. The UID record may be associated with or otherwise include the user account identifier for identification by the authentication server 155 based on information (e.g., which may include such an identifier) about the access attempt received from the relying party server 145. The UID record identified by the authentication server 155 may include records or a listing of one or more registered devices of the user for authentication of the user in offline out-of-band authentications or for confirmation of physical presence. Records of registered devices associated with the UID record may include information about the respective devices received during a prior registration process. Thus, the authentication server 155 may select a device by which the user is to authenticate, such as by selecting a device record corresponding to the device that is associated with the identified UID record.

In step 507, the authentication server 155 may select data for generating a notification corresponding to the access attempt. For example, the server device may select device-specific data corresponding to a mobile device (e.g., mobile device 101 of the user) for generating notification data corresponding to the access attempt. The device-specific data corresponding to the mobile device 101 may be received during the registration step and stored in a device record associated with the UID record. The device-specific data may include a public key, which corresponds to a private key maintained by the mobile device 101, and may also include one or more representations of credentials or other data maintained on the mobile device 101.

In step 509, the authentication server 155 may generate notification data and a request identifier for transmission to the relying party server 145. In some embodiments, the authentication server 155 may transmit all or some of the information to the client device 135, in addition to the relying party server 145, such as in examples where the relying party 145 may redirect the client device 135 to the authentication server 155 for one or more authentication operations. The request identifier may distinguish data corresponding to access attempts by different client devices 135. The generated notification data may include generation of notification data like that discussed with reference to FIG. 4. For ease of explanation, the optical code example is reiterated here, but other embodiments may incorporate or utilized other notification data examples discussed herein. For example, the authentication server 155 may generate a random string, like an alphanumeric string, which may have a configurable number of a characters, like 4, 6, or 8 or other number, and encrypt the string by the public key associated with the mobile device 101 (e.g., the public key received during the registration process). As the string is encrypted by a public key of a key-pair for which a corresponding private key of that key-pair is operable to decrypt that data, and that private key is maintained on the mobile device 101, the user can be required to utilize that mobile device to determine a valid notification response (e.g., based on decryption of the string). The string can also be a deterministic value, but which is preferably altered for different access attempts to prevent re-assertion of prior valid response. The string may be hashed or concatenated with one or more other values and hashed in some example embodiments. The server device may temporarily store the string for later verification, such as upon receipt of a notification response, or a hash upon which verification is based, or a selection of values from the string or a hash upon which verification is based (e.g., a schema may specify positions of values to select from a string or hash such that the entire value need not be received for verification, but the mobile device may similarly be required to generate the entire value to perform the selection). Thus, for example, verification of a notification response may be performed based on a match of the selection of values from a cryptographic hash generated by the mobile device to the selection of values from a cryptographic hash generated by the authentication server 155 (e.g., under a shared schema). As such, the length of the string or number of values selected from a hash for return in a notification response may be configurable. In various example embodiments, the notification response may have a length of 4 characters (e.g., 4 values selected from the hash), but may be 6, 8 or another amount. Generated notification data may include other information as described herein, examples of which may include information for verification generation of notification data by the authentication server, indications of which credentials by which a user is to authenticate on the mobile device, schema information for generating of a notification response, and the like.

The authentication server 155 may generate encoded notification data, such as by encoding notification data within an optical code, like a QR code, which a mobile device 101 may read to obtain the notification data. The notification data (e.g., which may be encoded) may include an encrypted portion which the mobile device 101 can access subsequent to utilization of the private key maintained on the mobile device to decrypt the data and may also include an unencrypted portion contained other data for authentication operations on the mobile device.

In step 509, the authentication server 155 may transmit notification data to the relying party 145 which may then be provided to the client device 135. The authentication server 155 may associate a request identifier with information by which a response to the notification may be verified and provide the request identifier to the relying party 145 for return in association with notification response information received by the relying party 145 from the client device 135. In some examples, the authentication server 155 may provide the request identifier to the relying party and transmit the notification data to the client device 135, and request/verification of the client device 135 may later be matched based on request identifier in instance where the client device 135 is redirected by the relying party 145 to authenticate with the authentication server 155. In turn, upon successful authentication, the authentication server may generate a token that is transmitted to the client device 135 and indicative of the authenticate result, or successful verification, and the relying party 145 server may verify the token to permit access by the client device (where verification of the token may optionally be based on information received for the authentication server indicative of its issuance, such as for a given client device).

In step 511, the client device 135 presents notification data received or otherwise obtained from the relying party 145 or authentication server 155. For example, the client device 135 may display a received optical code, render an optical code based on received instructions, or otherwise present notification data. In the example of the optical code, like a QR code, the client device 135 may present the QR code coincident with instructions to the user to capture or scan the code with a sensor, like an image sensor, of their mobile device 101. The client device 135 may present instructions for return of the notification response, such as return of user input for one or more interface elements, like a user interface element accepting one or more values from a set of values corresponding to a notification response determined by the mobile device 101 based on processing of obtained notification data.

Steps 513 through 517 may include operations consistent with corresponding steps described with reference to FIG. 4, and additional examples are discussed with reference to FIG. 6.

In step 519, the client device 135 may receive a notification response, such as via the mobile device 101, or via user input, which is then transmitted to the relying party 145 and conveyed by the relying party to the authentication server 155 (or which may be transmitted by the client device 135 to the authentication server 155 in some embodiments) for verification. As shown, the relying party 145 may receive the notification response, which it may associate with a request identifier (e.g., received from the authentication server 155 in association with notification data for transmission to the client device 135), and provide the notification response and request identifier to the authentication server 155 for verification.

In step 521, the authentication server 155 may receive the notification response, which may be associated with a request identifier. The authentication server 155 may identify values for verifying the notification response based on the request identifier. For example, a valid response as determined by the authentication server 155 in association with generation of notification data may be stored in association with the request identifier (e.g., identifying an access attempt). Accordingly, the authentication server 155 may identify values for determining whether a notification response received for a given outstanding request identifier is valid for authentication of an access attempt. Thus, for example, the authentication server 155 may determine whether the received notification response matches an expected valid notification response for the request identifier. In response to a matching of the expected values of a notification response and received values in a notification response the authentication server 155 may determine to authenticate the access attempt by the client device for the request identifier. Embodiments may also determine whether a client access attempt for which a notification response is received in active, such as based on a threshold of time permitted from the access attempt to receipt of the notification response for validation. In some embodiments, timestamps may be associated with request identifiers to purge (or consider invalid) the request identifier (and thus the information for validating a notification response for the request identifier) that remain outstanding after a threshold period of time.

In step 523, the authentication server 155 may transmit an authentication result, such as in association with a request identifier to which the result pertains, to the relying party 145 server to indicate whether the corresponding access attempt by the client device 135 should be permitted or denied. In some embodiments, the authentication server 155 may convey a token to the client device 135 that the client device 135 may presented to the relying party 145 as indication of an authentication result. Token values may be signed by the authentication server, and may be based on device information of the client device such that relying party may verify the client device was genuinely issued to the token presented as the authentication result. In some cases, the authentication server may transmit information by which a token may be verified as an authentication result or other data to the relying party 145 by which an authenticated user utilizing the client device may be permitted to access the asset requested by the client device.

In step 525, the relying party 145 may receive the authentication result for the access attempt of step 503 from the authentication server 155, such as in association with the corresponding request identifier. In turn, the relying party permits or denies 525 the access attempt by the client device based, at least in part, on the result. Accordingly, the access attempt by the client device from step 503 may be authenticated, at least in part, by involvement of a different device for out-of-band authentication, regardless of whether that device has network access, such as mobile device 101 that is operable to authenticate a user permitted to access the secure asset by additional factors for increased security of the asset. Moreover, such techniques applicable in offline out-of-band authentication by involvement of that different device may be utilized for confirmation of physical access (e.g., physical proximity) of the user to both devices.

FIG. 6 is a flow-chart showing an example of a process 600 for out-of-band notification processing for authentication of a device. The process 400 may occur within an example computing environment, and executed by a mobile computing device, such as the example computing environment illustrated in FIG. 1. The process 600 of FIG. 6 illustrates example operations performed by a computing device, like a mobile computing device, which may execute the process in an offline out-band-authentication process or as a confirmation of physical presence of the user for permitting a client computing device to access an online resource. Example mobile computing devices may perform operations like those illustrated in FIG. 6 according to at least one embodiment described herein.

The process 600 may be executed by a mobile computing device after that device has been registered with a remote server for utilization in offline out-of-band authentications or confirmation of physical presence of a user. Accordingly, steps of process 600 may be executed by the mobile computing device during periods in which the device lacks access to a network connection, like the internet, by which data might otherwise be exchanged with a remote server over the network for authentication of an access attempt by a client device different from the mobile computing device to access an online resource, or for confirmation of the user of the mobile device as having access to the mobile computing device and the client device when the client device attempts to access an online resource.

The registration process may include obtaining, on the mobile computing device of a user, a decryption key of an asymmetric cryptographic key-pair associated with the mobile computing device. For example, the mobile computing device may generate the key-pair, which comprises the decryption key and a corresponding encryption key. Embodiments may comprise establishing a set of credentials indicative of, or corresponding to, the user of the mobile computing device by which utilization of the decryption key by the mobile computing device is governed. For example, the user may authenticate with the mobile computing device by providing input corresponding to one of more of the credentials for verification based on the respective established credential. Once the user is authenticated by the mobile computing device, the mobile computing device may utilize the decryption key to process data based on the decryption key, such as to decrypt data that has been encrypted based on the decryption key of the key pair. In other words, the mobile computing device may utilize the decryption key of the key-pair to transform ciphertext output by an encryption function taking input data to encrypt and the encryption key of the key-pair back into the input data (e.g., plaintext, but which is not to suggest that the input data cannot be otherwise encrypted).

In some embodiments, the decryption key of the key-pair may be generated by and maintained within a trusted execution environment of the mobile computing device. For example, the decryption key may be stored within a secure memory or region of secure memory (e.g., by cryptographic isolation) by a co-processor of the trusted execution environment. In some embodiments, the decryption key may be stored in an encrypted format, such as stored as ciphertext, that is decryptable by a key based on one or more user supplied values, such as credential values corresponding to the user, but may also be a separate user supplied value, like a passphrase. A policy may govern utilization of the decryption key within the trusted execution environment, thereby preventing leakage of the decryption key, and may ensure authentication of the user in accordance with the policy prior to utilize of the decryption key. Accordingly, decryption of encrypted notification data comprising an authentication string may represent an indication that the user of the mobile device successfully authenticated on the mobile device to utilize the decryption key. One or both of the authentication string (e.g., in plaintext) or the encrypted ciphertext of the authentication string may be high entropy value (e.g., having a length of 64, 128, 256 values). The values may be integer values, alphanumeric values, case sensitive alphanumeric values, and some embodiments may utilize other or different sets of possible characters. Notification responses may include a set of values for verification, like a verification code, which be of shorter length (e.g., 4, 8, 12, 16 values) to facilitate ease of manual user entry in some instances. However, some embodiments may support conveyance of longer verification codes where supported, such as via return optical code or signal (whether NFC, Bluetooth, or audio-based but which may be ultrasonic) that supports transmission of a string with higher entropy (e.g., like a greater number of values). A notification response may thus be based on the authentication string which may be obtained within the TEE as plaintext. Embodiments, as previously outlined, may incorporate concatenation of other data with the authentication string to determine a notification response. That other data may be data known to a server, like a remote server, which generates the authentication string and may also perform the concatenation to determine values by which the notification response can be verified. In some cases, those other values may be representations of credentials which are supplied to the remote server. Thus, the remote server may specify which credentials a user is to authenticate on with the mobile device such that representations of respective credentials may be concatenated with the authentication string. The authentication string, or a result of concatenation of the authentication string with one or more other values may be cryptographically hashed by the mobile computing device, such as within the TEE, to prevent release of the authentication string itself outside of the TEE. As noted above, the remote server may also perform the operations to determine the hash, e.g., by hashing an expected result that that mobile device would reach through successful processing of notification data and authentication of the user.

The registration process may include transmitting, by the mobile computing device, registration information to cause a remote server to associate the encryption key of the key-pair with a record of an identity or an account of the user for accessing an online resource on a network. The registration information may also include representations of established credentials or other data. An example of a representation may be a cryptographic hash of an established credential that does not reveal the established credential. Thus, for example, the remote server may indicate on which credentials a user to is authenticate with the mobile computing device to utilize the decryption key to decrypt an authentication string that is encrypted based on the encryption key. In some embodiments, the decryption key may be operable to generate signed data by a signature algorithm, and the signed data may be verified in accordance with the signature verification algorithm based on the encryption key. Thus, for example, the remote server may verify possession of the decryption key by the mobile device and validity thereof in addition to other data. In some embodiments, data may be signed within the TEE or by a component of the TEE, to indicate that the decryption key is securely maintained with the TEE and utilization thereof is governed in accordance with a policy. In some embodiments, the mobile computing device may receive identifying data corresponding to a server, like the remote server, by which received notification data may be verified prior to processing, e.g., to prevent the processing of inauthentic notification data which may be configured to probe for values utilized within the TEE. To that end, in some embodiments, the TEE may receive a signature verification key (e.g., like a public key) which may verify data included within notification data that is signed by the remote server. The signed data, for example, may be a timestamp, which the TEE may evaluate relative a system time, or a counter value, which may be known to the TEE (or provided in association with the notification data for verification) by which authenticity of received notification data may be verified by the mobile device (e.g., prior to acting on encrypted notification data).

In step 601, the mobile computing device may obtain notification data corresponding to an access attempt by a client device to access an online resource, such as by the client device asserting the identity of the user (which may include one or more accounts of the user). The client device may receive, in response to the access attempt, the notification data from a server, like the remote server, that the mobile computing device may then obtain for processing. For example, the mobile computing device may obtain the notification data via a sensor of the mobile device, such as by reading notification data based on an optical code displayed by the client computing device attempting to access the online resource on the network under the identity or account of the user. In some examples, an image sensor of the mobile computing device may be utilized to read the optical code encoding notification information for processing by the mobile computing device. Other examples may include obtaining the notification data by a signal, like a peer-to-peer wireless signal or near field signal generated by the client computing device. The notification data may comprise an encrypted portion generated by a server, like a remote server, based on the encryption key of the key-pair and an authentication string for verification of the client computing device attempt to access the online resource.

In step 603, the mobile computing device may authenticate a user in response to obtaining the notification data. For example, the mobile computing device may request input corresponding to, or indicative of, the user of the mobile device and verify received inputs based on one or more established credentials indicative of, or corresponding to, the user (e.g., for which the credentials were established) by which utilization of the decryption key to decrypt data is governed. Input corresponding to requested credentials may be securely processed within the TEE to authenticate the user on established credential values prior to utilization of the decryption key.

In step 605, the mobile computing device may obtain the decryption key in response to authentication of the user. For example, after authentication of the user, the mobile device may access the decryption key to decrypt a portion of encrypted notification data. In some embodiments, the TEE may access the decryption key within a secure memory of the TEE, or decrypt ciphertext corresponding to decryption key (e.g., the TEE may securely store a key by which the ciphertext which may be stored in a CEE accessible memory region, but which is cryptographically isolated, may be decrypted). In some embodiments, ciphertext corresponding to the decryption key may be based at least in part on a user supplied input, which may be requested from the user to permit decryption of the ciphertext to obtain the decryption key.

In step 607, the mobile computing device obtains plaintext data indicative of notification data, like the encrypted portion of notification data, which may comprise an authentication string. For example, the mobile computing device may utilize the decryption key to decrypt the encrypted portion of notification data to obtain the authentication string. The encrypted portion of notification data may also include other data, such as rules or instructions for determining a valid notification response. For example, the rules or instructions may indicate which other values to concatenate with the authentication sting, order of concatenation, and the like as outlined herein. In addition, the rules or instructions may indicate how to select a set of values, like a subset of values, from the authentication string, hash of the authentication string, or hash of a concatenation.

In step 609, the mobile computing device may determine, based on values of the authentication string in plaintext, a notification response comprising a set of values based on the authentication string. The set of values is thus indicative of the successful decryption of the encryption portion of the notification data based on utilization of the decryption key upon the authentication of the user. The subset of values may include 4, 6, 8, or other number of values selected from a much larger authentication string or cryptographic hash, which may be determined in accordance with one or more rules or instructions (e.g., a schema) as described above. In some alternative example embodiments, the authentication string may specify a selection scheme for a subset of values from a representation of a credential (which may then be hashed and reselected from again for a final selection of a subset of values). The subset of values may be of reduced length, like 4-16 values, selected from a string of 128, 256, or more values to facilitate ease of user input on the client computing device by which the subset of values is returned to the remote server for verification. In turn, the mobile computing device may present (e.g., via a display, signal, or other means) the notification response for conveyance to the remote server to permit the client computing device to access the online resource on the network under the identity or account of the user. In example offline out-of-band authentication use cases (and optionally in physical presence confirmation use cases), the notification response is received by the client computing device, such as by user input, capture of an optical code, or via a peer-to-peer wireless or near field communication signal (e.g., not over a network by which the client computing device communicates with the remote server) and subsequently transmits the received notification response data to the remote server. In some example physical presence confirmation use cases, the client computing device may transmit the notification response data to the remote server (e.g., as physical presence may be considered confirmed by virtue of the mobile device obtaining the notification data from the client computing device). In turn, the remote server may verify received notification response data to permit the attempt by the client computing device to access the online resource, like an identity or account of the user, upon successful verification (or alternatively deny the attempt if verification fails, e.g., notification response values fail to match expect response values).

Figure 7:
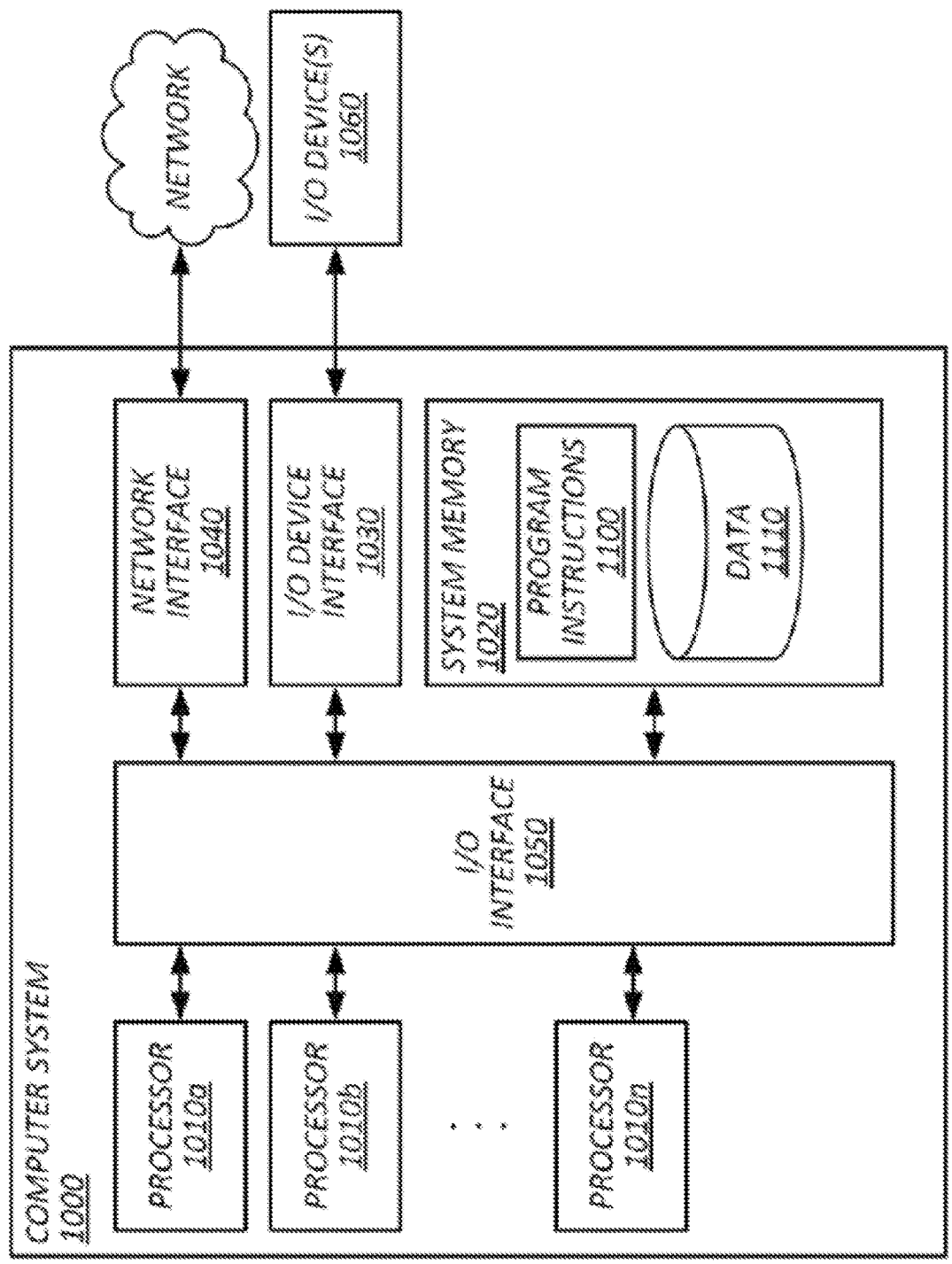
FIG. 7 is a block diagram showing an example of a computing device by which the present techniques may be implemented.

FIG. 7 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. An embodiment comprising a tangible, non-transitory, machine readable medium storing instructions that when executed by a mobile computing device effectuate operations comprising: obtaining, on a mobile computing device of a user, a decryption key of an asymmetric cryptographic key-pair associated with the mobile computing device, the key-pair comprising an encryption key corresponding to the decryption key; transmitting, by the mobile computing device, registration information to cause a remote server to associate the encryption key of the key-pair with a record of an identity of the user for accessing an online resource on a network; obtaining, by the mobile computing device, notification data from an optical code displayed by a client computing device attempting to access the online resource on the network under the identity of the user, the client computing device being different from the mobile computing device and the notification data comprising an encrypted portion generated by the remote server based on the encryption key of the key-pair and an authentication string for verification of the client computing device attempt to access the online resource; authenticating, by the mobile computing device in response to obtaining the notification data, the user of the mobile device based on one or more established credentials indicative of, or corresponding to, the user by which utilization of the decryption key to decrypt data is governed; decrypting, by the mobile computing device after the authentication of the user by the mobile computing device, the encrypted portion of the notification data based on the decryption key to obtain the authentication string in plaintext; determining, by the mobile computing device based on values of the authentication string in plaintext, a notification response comprising a set of values based on the authentication string, the set of values being indicative of the decryption of the encryption portion of the notification data based on utilization of the decryption key upon the authentication of the user; and presenting, by the mobile computing device, the notification response for conveyance to the remote server to permit the client computing device to access the online resource on the network under the identity of the user.

2. The medium of embodiment 1, wherein the mobile computing device obtains the notification data from the client computing device during a period when the mobile computing device does not have an active network connection.

3. The medium of embodiment 1, wherein presenting the notification response for conveyance to the remote server comprises: displaying, by the mobile computing device, the set of values for user input via the client computing device, the client computing device transmitting the set of value to the remote server; displaying, by the mobile computing device, a second optical code comprising the set of values, the client computing device obtaining the set of values via the second optical code and transmitting the set of values to the remote server; or transmitting, by the mobile computing device, the set of values to the client computing device via a peer-to-peer wireless or near field communication protocol dependent on physical proximity of the devices to communicate data, the client computing device transmitting the set of value to the remote server.

4. The medium of embodiment 1, wherein the mobile computing device presents the notification response for conveyance to the remote server during a period when the mobile computing device does not have an active network connection, the notification response being received by the client computing devices for transmission to the remote server.

5. The medium of embodiment 1, wherein obtaining, on the mobile computing device of a user, a decryption key of an asymmetric cryptographic key-pair associated with the mobile computing device comprises: establishing a set of credentials indicative of, or corresponding to, the user of the mobile computing device; and generating the asymmetric cryptographic key-pair, wherein utilization of the decryption key by the mobile computing device is dependent on authentication of the user with the mobile computing device on one or more of the credentials in the set of credentials.

6. The medium of embodiment 1, wherein the transmitted registration information comprises: the encryption key; an indication of the user account; and representations of at least some credentials by which the user authenticates on the mobile device.

7. The medium of embodiment 6, further comprising accessing, by the mobile computing device, the identity of the user or conveying valid credentials associated with the identity of the user.

8. The medium of embodiment 1, wherein obtaining, by the mobile computing device via a sensor of the mobile device, notification data from an optical code displayed by a client computing device comprises: detecting the optical code within image data captured by the sensor; and decoding the optical code to obtain the notification data.

9. The medium of embodiment 8, wherein the notification data is generated by the remote server in response to receiving information indicative of the client computing device attempt to access the online resource under the identity of the user, the received information including an identifier associated with the identity to retrieve the record comprising the encryption key.

10. The medium of embodiment 1, wherein authenticating, by the mobile computing device in response to obtaining the notification data, the user of the mobile device based on one or more established credentials indicative of, or corresponding to, the user comprises: requesting input by the user corresponding to an established credential; validating received user input values based on values of the established credential to obtain a result of user authentication; and accessing the decryption key based on the result of user authentication.

11. The medium of embodiment 10, wherein a trusted execution environment of the client computing device permits access to the decryption key and decryption of the encrypted portion of notification data based on the result of user authentication.

12. The medium of embodiment 1, wherein decrypting, by the mobile computing device after the authentication of the user, the encrypted portion of the notification data based on the decryption key to obtain the authentication string in plaintext comprises: decrypting ciphertext corresponding to the notification data to obtain plaintext notification data; and obtaining the authentication string in plaintext from the plaintext notification data.

13. The medium of embodiment 1, wherein determining, by the mobile computing device based on values of the authentication string in plaintext, a notification response comprising a set of values based on the authentication string comprises: selecting the set of values from the authentication string; or generating a cryptographic hash based in part on the authentication string and selecting the set of values from the cryptographic hash.

14. The medium of embodiment 1, wherein determining, by the mobile computing device based on values of the authentication string in plaintext, a notification response comprising a set of values based on the authentication string comprises: selecting the authentication string; selecting a subset of values from the authentication string; or generating a cryptographic hash based in part on the authentication string and selecting a subset of values from the cryptographic hash.

15. The medium of embodiment 1, wherein determining, by the mobile computing device based on values of the authentication string in plaintext, a notification response comprising a set of values based on the authentication string comprises: accessing one or more rules of a schema for selecting the set of values; and selecting the set of values based on the schema for the notification response, wherein the remote server selects a set of verification values based on the schema for verifying the notification response.

16. The medium of embodiment 1, further comprising: verifying, by the mobile computing device, authenticity of the optical code, wherein utilization of the decryption key to decrypt data is governed in part by successful verification of authenticity of the optical code.

17. The medium of embodiment 16, wherein verifying authenticity of the optical code comprises: obtaining a signature verification key corresponding to the remote server in response to transmitting the registration information; obtaining signed data from an unencrypted portion of notification data; and verifying signed data as being generated by the remote server based in part on the signature verification key.

18. The medium of embodiment 1, wherein the mobile computing device comprises means for providing a trusted execution environment.

19. An embodiment of computer-implemented method executed by one or more processors of a mobile computing device that supports a client-side role in out-of-band authentication, the method comprising: obtaining, on the mobile computing device of a user, a decryption key of an asymmetric cryptographic key-pair associated with the mobile computing device, the key-pair comprising an encryption key corresponding to the decryption key; transmitting, by the mobile computing device, registration information to cause a remote server to associate the encryption key of the key-pair with a record of an identity of the user for accessing an online resource on a network; obtaining, by the mobile computing device via a sensor of the mobile device, notification data from an optical code displayed by a client computing device attempting to access the online resource on the network under the identity of the user, the client computing device different from the mobile computing device and the notification data comprising an encrypted portion generated by the remote server based on the encryption key of the key-pair and an authentication string for verification of the client computing device attempt to access the online resource; authenticating, by the mobile computing device in response to obtaining the notification data, the user of the mobile device based on one or more established credentials indicative of, or corresponding to, the user by which utilization of the decryption key to decrypt data is governed; decrypting, by the mobile computing device after the authentication of the user, the encrypted portion of the notification data based on the decryption key to obtain the authentication string in plaintext; determining, by the mobile computing device based on values of the authentication string in plaintext, a notification response comprising a set of values based on the authentication string, the set of values being indicative of the decryption of the encryption portion of the notification data based on utilization of the decryption key upon the authentication of the user; and presenting, by the mobile computing device, the notification response for conveyance to the remote server to permit the client computing device to access the online resource on the network under the identity of the user.

20. A embodiment of a computer-implemented method, executed by a server-side computing system that supports a client-side role in out-of-band authentication on a first device different from a second device requesting access to a secure asset, the method comprising: establishing a user record associated with a user permitted to access the secure asset, the user record comprising a user identifier associated with the user; and establishing, in association with the user record, a device record for the first device in response to receiving, from the first device, an encryption key of an asymmetric key-pair, the first device retaining the decryption key of the asymmetric key-pair; receiving information corresponding to attempt to access the secure asset from the second device, the information comprising the user identifier; identifying the user record responsive to the user identifier; selecting the device record for the first device associated with the user record to access the encryption key; generating notification data comprising a portion of data encrypted based on the encryption key and operable to be decrypted by the encryption key retained by the first device; determining a set of verification values based on the portion of data in unencrypted form; transmitting, to the second device, the notification data; receiving a notification response comprising a set of values; verifying the set of values based on the set of verification values, the verifying being indicative of the first device successfully decrypting the encrypted portion of notification data based on the decryption key retained by the first device; and transmitting, based on the verifying, an authentication result to grant the access attempt by the second device.

21. The method of embodiment 20, wherein the notification response comprising the set of values is received from the second computing device.

22. An embodiment of a tangible, non-transitory, machine readable medium storing instructions that when executed by a mobile computing device effectuate operations comprising: obtaining, on a mobile computing device of a user, a private key of a key-pair associated with the mobile computing device, the key-pair comprising a public key distributed to at least one remote server for association with an identity of the user; obtaining, by the mobile computing device, and in some embodiments wirelessly by the mobile computing device without utilizing an internet connection, notification data from a client computing device attempting to access an online resource on a network under the identity of the user, the client computing device being different from the mobile computing device and the notification data comprising a code generated by the remote server, for conveyance to the remote server via the client computing device and/or based in part on the public key of the key-pair, for verification of the client computing device attempt to access the online resource; obtaining, by the mobile computing device, at least one input credential value corresponding to an established credential indicative of, or corresponding to, the user by which utilization of the private key is governed; authenticating, by the mobile computing device, the user of the mobile device based on the input credential value matching the established credential; processing, by the mobile computing device after the authentication of the user by the mobile computing device, the code based on the private key to determine a resulting authentication value; generating, by the mobile computing device, a notification response based on the resulting authentication value, the notification response being indicative of utilization of the private key by the mobile computing device; and presenting, by the mobile computing device, the notification response for conveyance to the remote server to permit the client computing device to access the online resource on the network under the identity of the user.

23. The medium of embodiment 22, wherein: the code comprises 64 or more symbols; the resulting authentication value comprises 64 or more symbols; and the notification response comprises a selection of a set of symbols from, or based on, the authentication value, the set of symbols comprising less than 16 symbols.

24. The medium of embodiment 23, wherein: the code is ciphertext comprising 64 or more symbols; the resulting authentication value is plaintext comprising 64 or more symbols based on the ciphertext; and the notification response comprises a selection of a set of symbols from, or based on, the authentication value, the set of symbols comprising less than 16 symbols.

25. The medium of embodiment 22, wherein: the remote server generates the code based on an authentication value, the authentication value comprising 64 or more symbols; the remote server determines a selection of a set of verification symbols based in part on the authentication value and a selection schema, the set of verification symbols comprising less than 16 symbols; and the remote server receives the notification response, the notification response comprising a set of symbols of 16 or less symbols and being verified in response to a match based on the set of verification symbols.

22. Embodiments of a tangible, non-transitory, machine readable medium storing instructions that when executed effectuate operations comprising: operations of any one of embodiments 19-20.

23. Embodiments of a computer implemented method comprising: operations of any one of embodiments 1-19 or 22-25.

24. Embodiments of a system, comprising: a plurality of processors; and memory storing instructions that when executed by at least some of the processors effectuate operations comprising: the operations of any one of embodiments 1-25.

What is claimed is:

1. A tangible, non-transitory, machine readable medium storing instructions that when executed by a mobile computing device effectuate operations comprising:
obtaining, on a mobile computing device of a user, a decryption key of an asymmetric cryptographic key-pair associated with the mobile computing device, the key-pair comprising an encryption key corresponding to the decryption key;
transmitting, by the mobile computing device, registration information to cause a remote server to associate the encryption key of the key-pair with a record of an identity of the user for accessing an online resource on a network;
obtaining, by the mobile computing device, notification data from an optical code displayed by a client computing device attempting to access the online resource on the network under the identity of the user, the client computing device being different from the mobile computing device and the notification data comprising an encrypted portion generated by the remote server based on the encryption key of the key-pair and an authentication string for verification of the client computing device attempt to access the online resource;
authenticating, by the mobile computing device in response to obtaining the notification data, the user of the mobile device based on one or more established credentials indicative of, or corresponding to, the user by which utilization of the decryption key to decrypt data is governed;
decrypting, by the mobile computing device after the authentication of the user by the mobile computing device, the encrypted portion of the notification data based on the decryption key to obtain the authentication string in plaintext;
determining, by the mobile computing device based on values of the authentication string in plaintext, a notification response comprising a set of values based on the authentication string, the set of values being indicative of the decryption of the encryption portion of the notification data based on utilization of the decryption key upon the authentication of the user; and
presenting, by the mobile computing device, the notification response for conveyance to the remote server to permit the client computing device to access the online resource on the network under the identity of the user.

2. The medium of claim 1, wherein the mobile computing device obtains the notification data from the client computing device during a period when the mobile computing device does not have an active network connection.

3. The medium of claim 1, wherein presenting the notification response for conveyance to the remote server comprises:
displaying, by the mobile computing device, the set of values for user input via the client computing device, the client computing device transmitting the set of value to the remote server;
displaying, by the mobile computing device, a second optical code comprising the set of values, the client computing device obtaining the set of values via the second optical code and transmitting the set of values to the remote server; or
transmitting, by the mobile computing device, the set of values to the client computing device via a peer-to-peer wireless or near field communication protocol dependent on physical proximity of the devices to communicate data, the client computing device transmitting the set of value to the remote server.

4. The medium of claim 1, wherein the mobile computing device presents the notification response for conveyance to the remote server during a period when the mobile computing device does not have an active network connection, the notification response being received by the client computing devices for transmission to the remote server.

5. The medium of claim 1, wherein obtaining, on the mobile computing device of a user, a decryption key of an asymmetric cryptographic key-pair associated with the mobile computing device comprises:

establishing a set of credentials indicative of, or corresponding to, the user of the mobile computing device; and generating the asymmetric cryptographic key-pair, wherein utilization of the decryption key by the mobile computing device is dependent on authentication of the user with the mobile computing device on one or more of the credentials in the set of credentials.

6. The medium of claim 1, wherein the transmitted registration information comprises:
the encryption key;
an indication of the user account; and
representations of at least some credentials by which the user authenticates on the mobile device.

7. The medium of claim 6, further comprising accessing, by the mobile computing device, the identity of the user or conveying valid credentials associated with the identity of the user.

8. The medium of claim 1, wherein obtaining, by the mobile computing device, notification data from an optical code displayed by a client computing device comprises:
detecting the optical code within image data captured by a sensor of the mobile computing device; and
decoding the optical code to obtain the notification data.

9. The medium of claim 8, wherein the notification data is generated by the remote server in response to receiving information indicative of the client computing device attempting to access the online resource on the network under the identity of the user, the received information including an identifier associated with the identity to retrieve the record comprising the encryption key.

10. The medium of claim 1, wherein authenticating, by the mobile computing device in response to obtaining the notification data, the user of the mobile device based on one or more established credentials indicative of, or corresponding to, the user comprises:
requesting input by the user corresponding to an established credential;
validating received user input values based on values of the established credential to obtain a result of user authentication; and
accessing the decryption key based on the result of user authentication.

11. The medium of claim 10, wherein a trusted execution environment of the client computing device permits access to the decryption key and decryption of the encrypted portion of notification data based on the result of user authentication.

12. The medium of claim 1, wherein decrypting, by the mobile computing device after the authentication of the user, the encrypted portion of the notification data based on the decryption key to obtain the authentication string in plaintext comprises:
decrypting ciphertext corresponding to the notification data to obtain plaintext notification data; and
obtaining the authentication string in plaintext from the plaintext notification data.

13. The medium of claim 1, wherein determining, by the mobile computing device based on values of the authentication string in plaintext, a notification response comprising a set of values based on the authentication string comprises:
selecting the set of values from the authentication string; or
generating a cryptographic hash based in part on the authentication string and selecting the set of values from the cryptographic hash.

14. The medium of claim 1, wherein determining, by the mobile computing device based on values of the authentication string in plaintext, a notification response comprising a set of values based on the authentication string comprises:
selecting the authentication string;
selecting a subset of values from the authentication string; or
generating a cryptographic hash based in part on the authentication string and selecting a subset of values from the cryptographic hash.

15. The medium of claim 1, wherein determining, by the mobile computing device based on values of the authentication string in plaintext, a notification response comprising a set of values based on the authentication string comprises:
accessing one or more rules of a schema for selecting the set of values; and
selecting the set of values based on the schema for the notification response, wherein the remote server selects a set of verification values based on the schema for verifying the notification response.

16. The medium of claim 1, further comprising:
verifying, by the mobile computing device, authenticity of the optical code, wherein utilization of the decryption key to decrypt data is governed in part by successful verification of authenticity of the optical code.

17. The medium of claim 16, wherein verifying authenticity of the optical code comprises:
obtaining a signature verification key corresponding to the remote server in response to transmitting the registration information;
obtaining signed data from an unencrypted portion of notification data; and
verifying signed data as being generated by the remote server based in part on the signature verification key.

18. The medium of claim 1, wherein the mobile computing device comprises means for providing a trusted execution environment.

19. A computer-implemented method executed by one or more processors of a mobile computing device that supports a client-side role in out-of-band authentication, the method comprising:
obtaining, on the mobile computing device of a user, a decryption key of an asymmetric cryptographic key-pair associated with the mobile computing device, the key-pair comprising an encryption key corresponding to the decryption key;
transmitting, by the mobile computing device, registration information to cause a remote server to associate the encryption key of the key-pair with a record of an identity of the user for accessing an online resource on a network;
obtaining, by the mobile computing device via a sensor of the mobile device, notification data from an optical code displayed by a client computing device attempting to access the online resource on the network under the identity of the user, the client computing device different from the mobile computing device and the notification data comprising an encrypted portion generated by the remote server based on the encryption key of the key-pair and an authentication string for verification of the client computing device attempt to access the online resource;
authenticating, by the mobile computing device in response to obtaining the notification data, the user of the mobile device based on one or more established credentials indicative of, or corresponding to, the user by which utilization of the decryption key to decrypt data is governed;

decrypting, by the mobile computing device after the authentication of the user, the encrypted portion of the notification data based on the decryption key to obtain the authentication string in plaintext;

determining, by the mobile computing device based on values of the authentication string in plaintext, a notification response comprising a set of values based on the authentication string, the set of values being indicative of the decryption of the encryption portion of the notification data based on utilization of the decryption key upon the authentication of the user; and presenting, by the mobile computing device, the notification response for conveyance to the remote server to permit the client computing device to access the online resource on the network under the identity of the user.

20. The method of claim 19, wherein the mobile computing device obtains the notification data from the client computing device during a period when the mobile computing device does not have an active network connection.

21. The method of claim 19, wherein presenting the notification response for conveyance to the remote server comprises:

displaying, by the mobile computing device, the set of values for user input via the client computing device, the client computing device transmitting the set of value to the remote server;

displaying, by the mobile computing device, a second optical code comprising the set of values, the client computing device obtaining the set of values via the second optical code and transmitting the set of values to the remote server; or transmitting, by the mobile computing device, the set of values to the client computing device via a peer-to-peer wireless or near field communication protocol dependent on physical proximity of the devices to communicate data, the client computing device transmitting the set of value to the remote server.

22. The method of claim 19, wherein the mobile computing device presents the notification response for conveyance to the remote server during a period when the mobile computing device does not have an active network connection, the notification response being received by the client computing devices for transmission to the remote server.

23. The method of claim 19, wherein obtaining, by the mobile computing device via a sensor of the mobile device, notification data from an optical code displayed by a client computing device comprises:

detecting the optical code within image data captured by the sensor; and decoding the optical code to obtain the notification data.

24. The method of claim 19, wherein authenticating, by the mobile computing device in response to obtaining the notification data, the user of the mobile device based on one or more established credentials indicative of, or corresponding to, the user comprises:

requesting input by the user corresponding to an established credential;

validating received user input values based on values of the established credential to obtain a result of user authentication; and accessing the decryption key based on the result of user authentication.

25. The method of claim 19, wherein decrypting, by the mobile computing device after the authentication of the user, the encrypted portion of the notification data based on the decryption key to obtain the authentication string in plaintext comprises:

decrypting ciphertext corresponding to the notification data to obtain plaintext notification data; and obtaining the authentication string in plaintext from the plaintext notification data.

26. The method of claim 19, wherein determining, by the mobile computing device based on values of the authentication string in plaintext, a notification response comprising a set of values based on the authentication string comprises:

selecting the set of values from the authentication string; or generating a cryptographic hash based in part on the authentication string and selecting the set of values from the cryptographic hash.

27. The method of claim 19, wherein determining, by the mobile computing device based on values of the authentication string in plaintext, a notification response comprising a set of values based on the authentication string comprises:

selecting the authentication string;

selecting a subset of values from the authentication string; or generating a cryptographic hash based in part on the authentication string and selecting a subset of values from the cryptographic hash.

28. The method of claim 19, wherein determining, by the mobile computing device based on values of the authentication string in plaintext, a notification response comprising a set of values based on the authentication string comprises:

accessing one or more rules of a schema for selecting the set of values; and selecting the set of values based on the schema for the notification response, wherein the remote server selects a set of verification values based on the schema for verifying the notification response.

29. The method of claim 19, further comprising:

verifying, by the mobile computing device, authenticity of the optical code, wherein utilization of the decryption key to decrypt data is governed in part by successful verification of authenticity of the optical code.

30. The method of claim 29, wherein verifying authenticity of the optical code comprises:

obtaining a signature verification key corresponding to the remote server in response to transmitting the registration information;

obtaining signed data from an unencrypted portion of notification data; and verifying signed data as being generated by the remote server based in part on the signature verification key.

* * * * *